US009958653B2

(12) United States Patent
Ichikawa

(10) Patent No.: US 9,958,653 B2
(45) Date of Patent: May 1, 2018

(54) IMAGING OPTICAL SYSTEM AND OPTICAL APPARATUS INCLUDING THE SAME

(71) Applicant: OLYMPUS CORPORATION, Hachioji-shi, Tokyo (JP)

(72) Inventor: Keisuke Ichikawa, Tama (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days. days.

(21) Appl. No.: 15/391,941

(22) Filed: Dec. 28, 2016

(65) Prior Publication Data

US 2017/0108675 A1 Apr. 20, 2017

Related U.S. Application Data

(63) Continuation of application No. PCT/JP2015/056308, filed on Mar. 4, 2015.

(30) Foreign Application Priority Data

Aug. 5, 2014 (JP) .................................. 2014-159874

(51) Int. Cl.
G02B 9/34 (2006.01)
G02B 13/18 (2006.01)
(Continued)

(52) U.S. Cl.
CPC ............... *G02B 13/18* (2013.01); *G02B 9/64* (2013.01); *G02B 27/005* (2013.01); *H04N 5/2254* (2013.01); *H04N 5/23293* (2013.01)

(58) Field of Classification Search
None
See application file for complete search history.

(56) References Cited

U.S. PATENT DOCUMENTS 8,179,617 B2 * 5/2012 Sugita .................. G02B 13/04 359/749
2009/0109551 A1 4/2009 Hatada
(Continued)

FOREIGN PATENT DOCUMENTS

JP 2004101880 A 4/2004
JP 2004177435 A 6/2004
(Continued)

OTHER PUBLICATIONS

International Search Report (ISR) and Written Opinion dated May 26, 2015 issued in International Application No. PCT/JP2015/056308.
(Continued)

*Primary Examiner* — Joseph P Martinez
(74) *Attorney, Agent, or Firm* — Holtz, Holtz & Volek PC

(57) ABSTRACT

An imaging optical system includes, a first lens unit having a negative refractive power, a second lens unit having a positive refractive power, a third lens unit having a negative refractive power, and a fourth lens unit having a positive refractive power, the first lens unit includes a first negative lens and a first cemented lens, the second lens unit G2 includes a second cemented lens, one or more positive lens components, and a third cemented lens, and the first cemented lens includes a negative lens and has a surface having a concave surface facing toward the reduction side, the second cemented lens has a positive refractive power and has a surface having a concave surface facing toward the enlargement side, and the third cemented lens has a positive refractive power and includes a negative lens on the reduction side.

37 Claims, 25 Drawing Sheets

(51) Int. Cl.
  *G02B 27/00* (2006.01)
  *G02B 9/64* (2006.01)
  *H04N 5/225* (2006.01)
  *H04N 5/232* (2006.01)

(56) References Cited

U.S. PATENT DOCUMENTS

2010/0033848 A1   2/2010   Hatada
2011/0090574 A1   4/2011   Harada et al.
2012/0257100 A1   10/2012  Imaoka et al.
2013/0293767 A1   11/2013  Imaoka et al.

FOREIGN PATENT DOCUMENTS

| JP | 2005107261 A | 4/2005 |
| JP | 2009109723 A | 5/2009 |
| JP | 2010039340 A | 2/2010 |
| JP | 2010097207 A | 4/2010 |
| JP | 2010191077 A | 9/2010 |
| JP | 2011059290 A | 3/2011 |
| JP | 2012226309 A | 11/2012 |

OTHER PUBLICATIONS

International Preliminary Report on Patentability including Written Opinion (and English translation thereof) dated Feb. 16, 2017 issued in counterpart International Application No. PCT/JP2015/056308.

\* cited by examiner

FIG. 3A
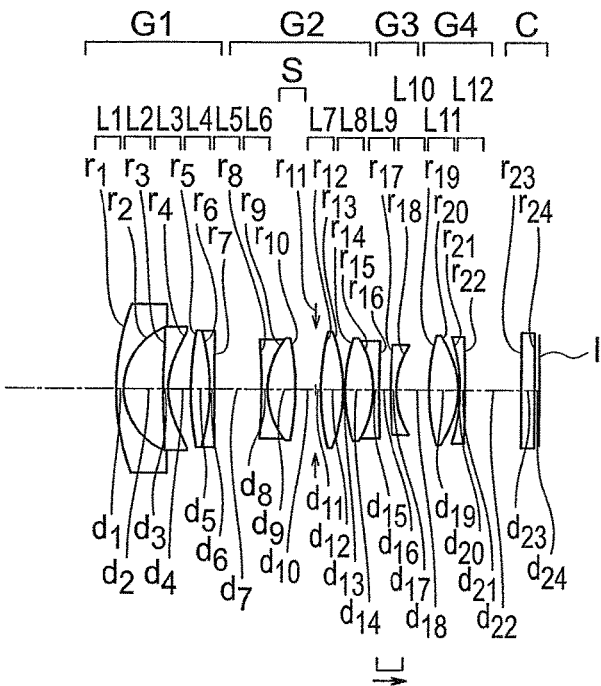
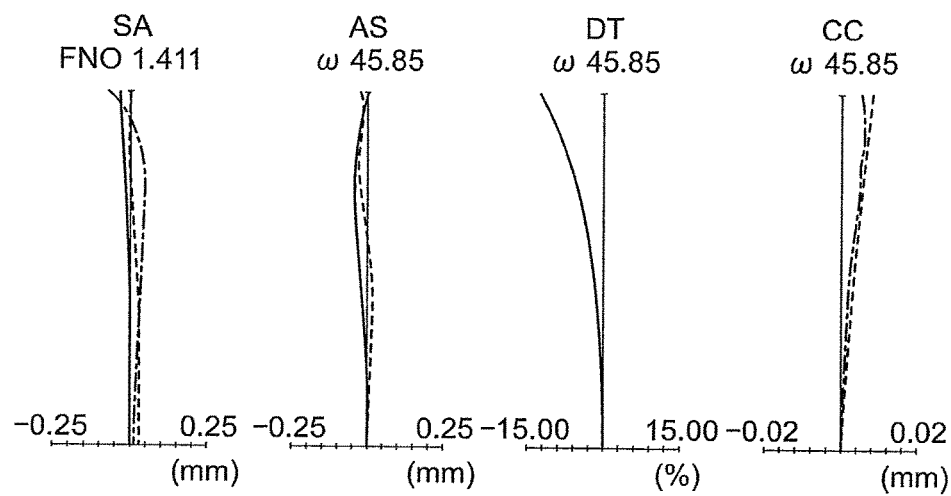
FIG. 3B  FIG. 3C  FIG. 3D  FIG. 3E

FIG. 4A
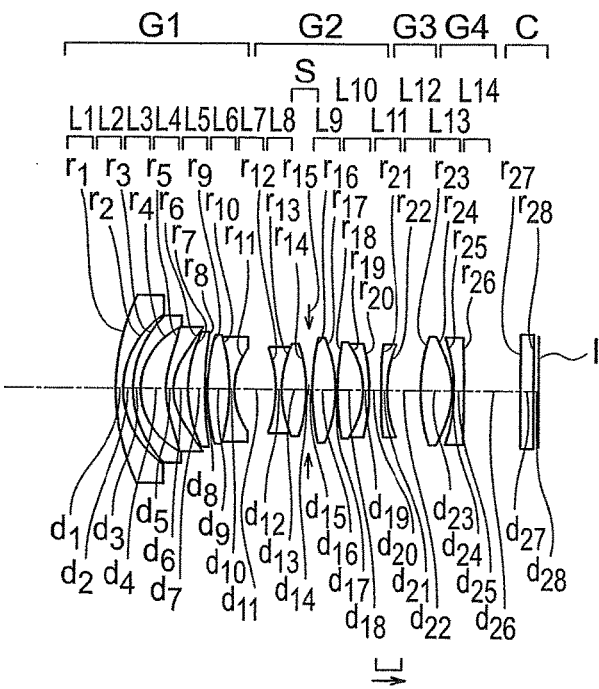
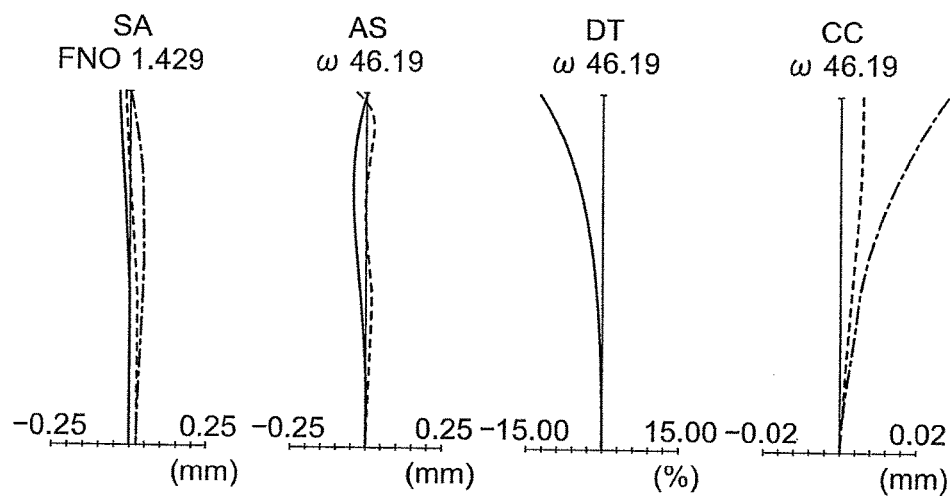
FIG. 4B  FIG. 4C  FIG. 4D  FIG. 4E

FIG. 5A
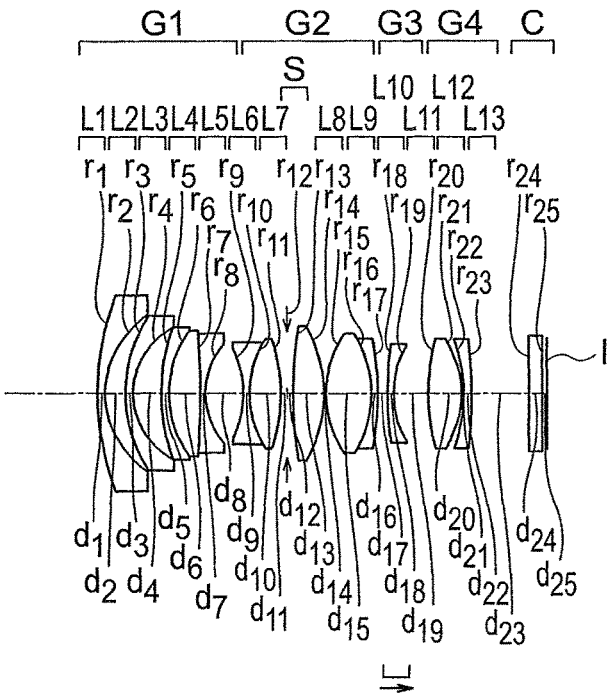
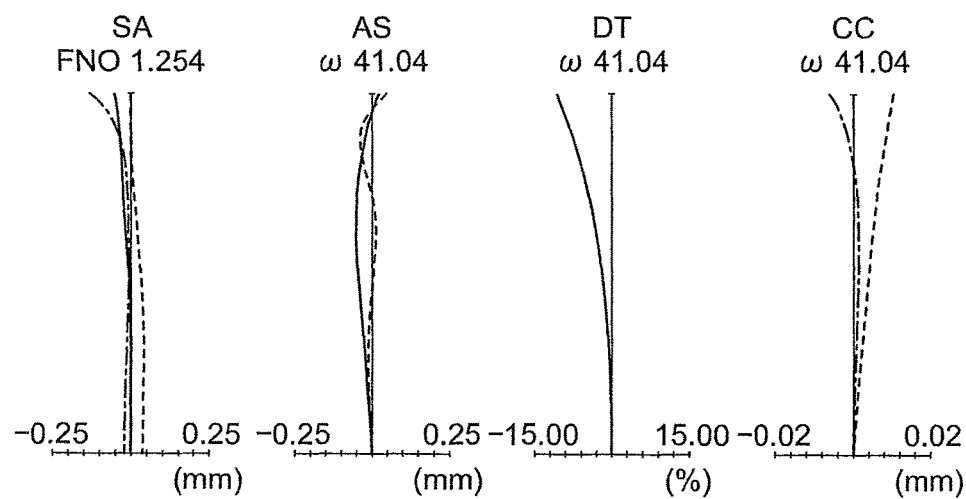
FIG. 5B   FIG. 5C   FIG. 5D   FIG. 5E

FIG. 6A
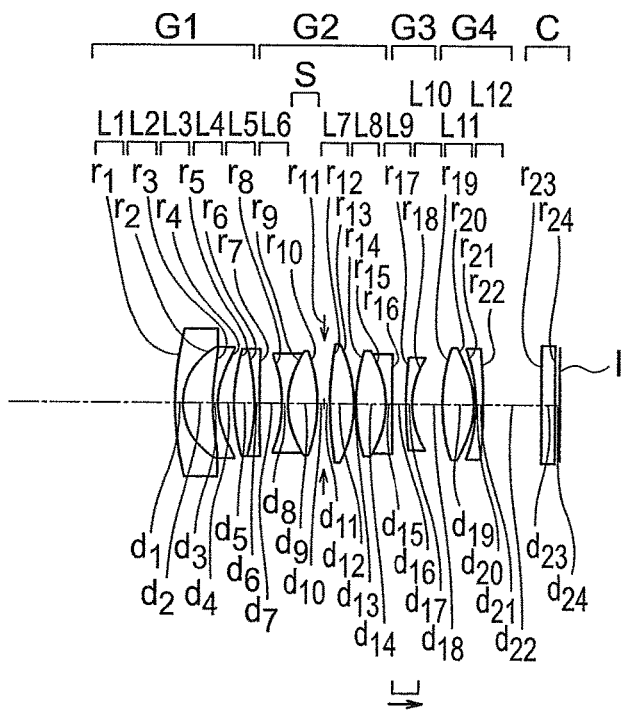
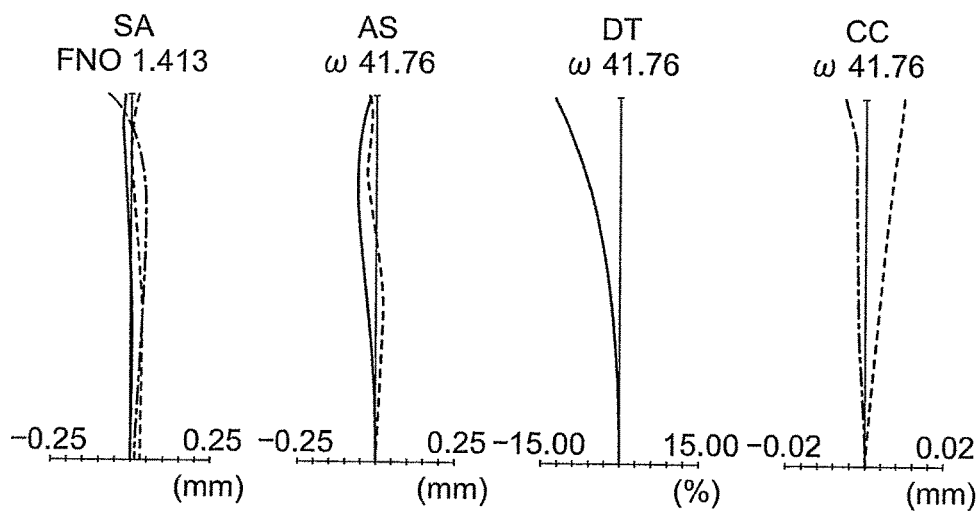
FIG. 6B  FIG. 6C  FIG. 6D  FIG. 6E

FIG. 8A
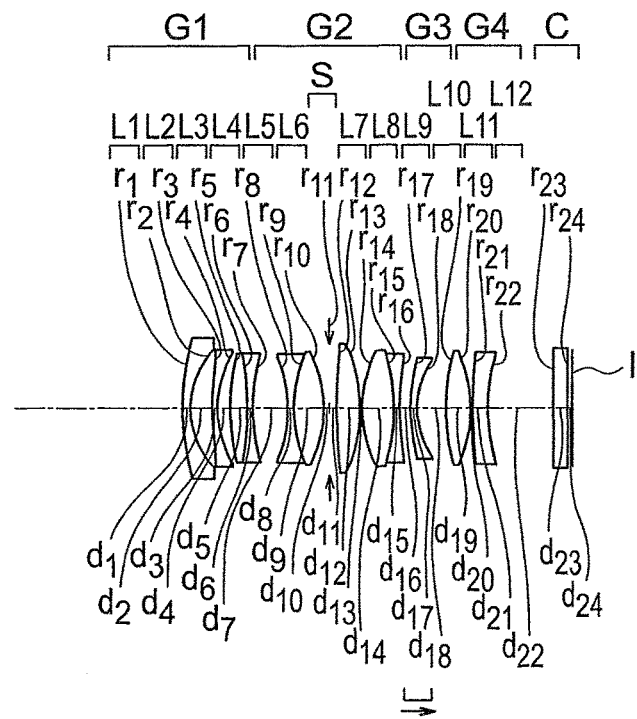
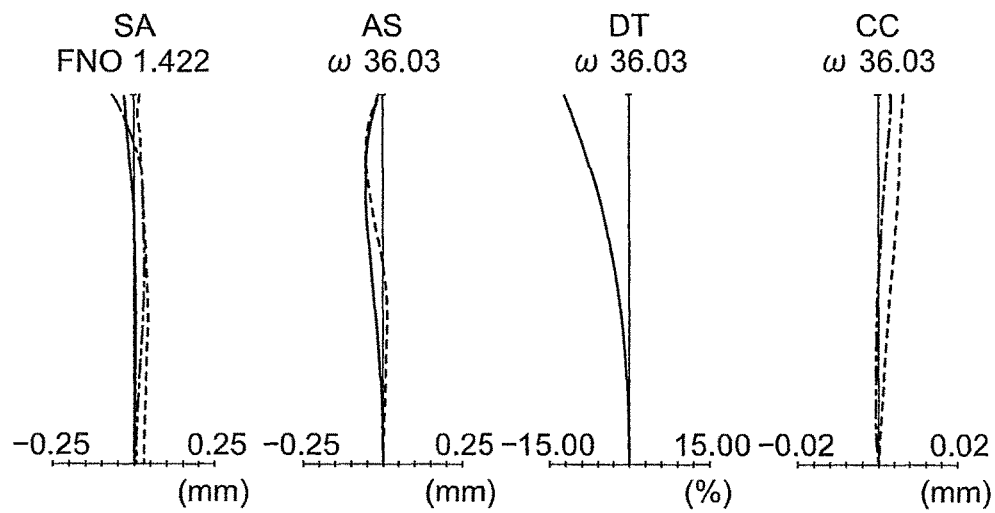
FIG. 8B    FIG. 8C    FIG. 8D    FIG. 8E
SA         AS         DT         CC
FNO 1.422  ω 36.03    ω 36.03    ω 36.03

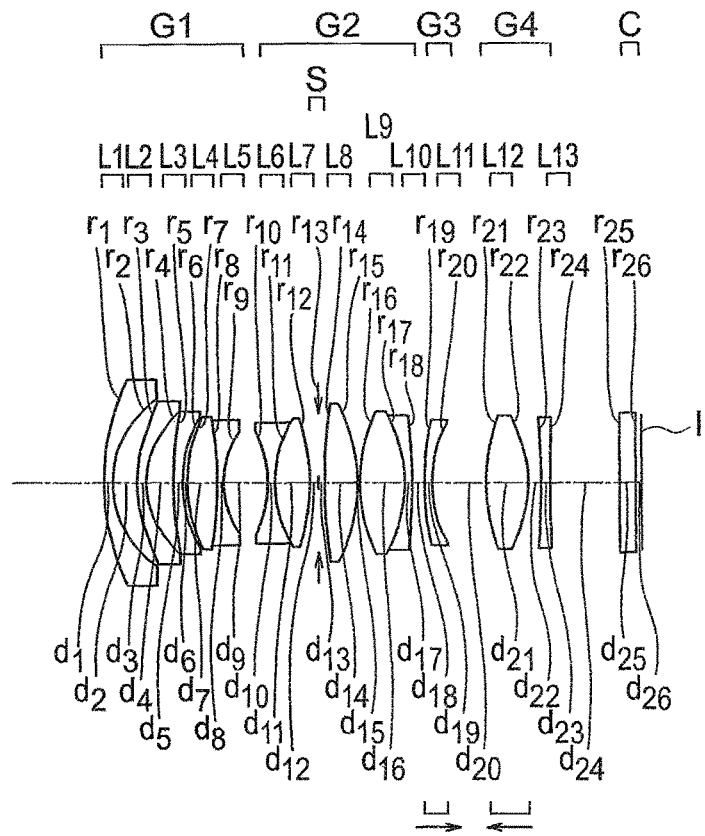
FIG. 15A
FIG. 15B  FIG. 15C  FIG. 15D  FIG. 15E
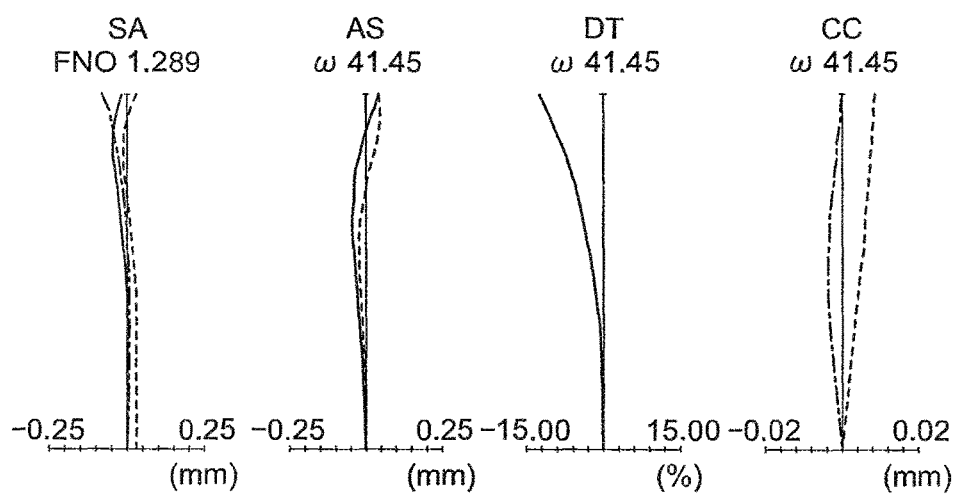

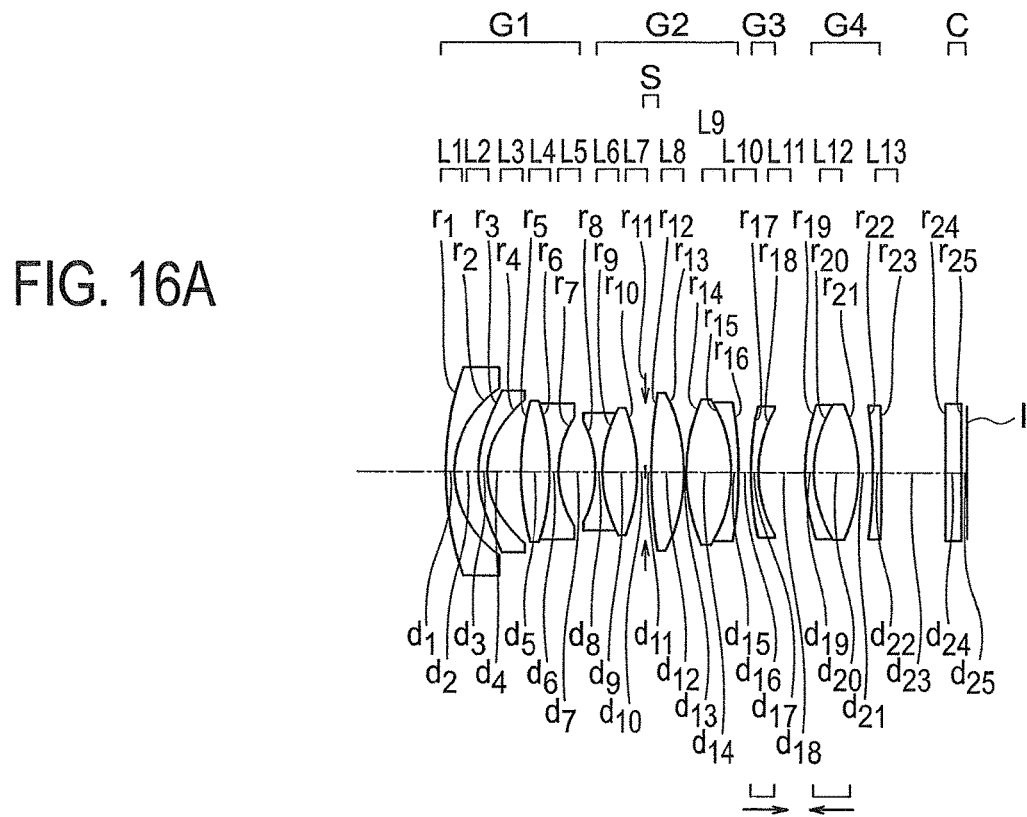
FIG. 16A
FIG. 16B  FIG. 16C  FIG. 16D  FIG. 16E
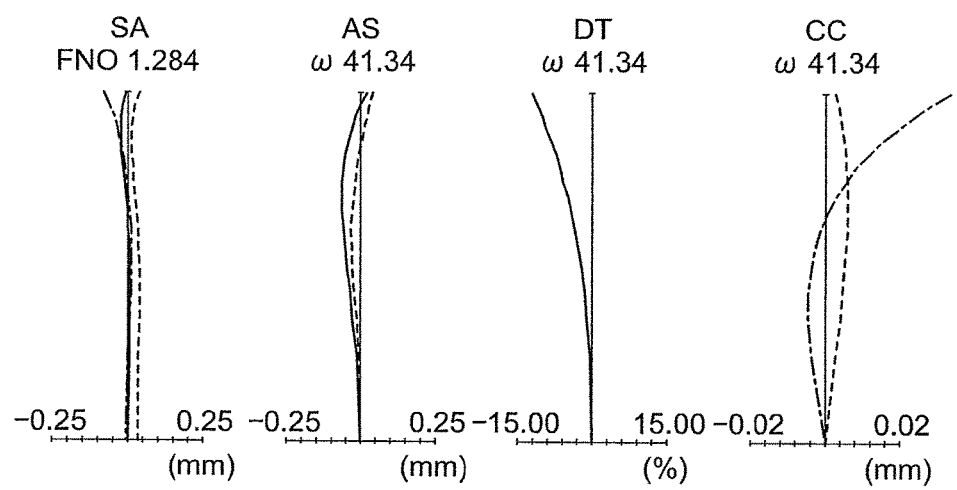

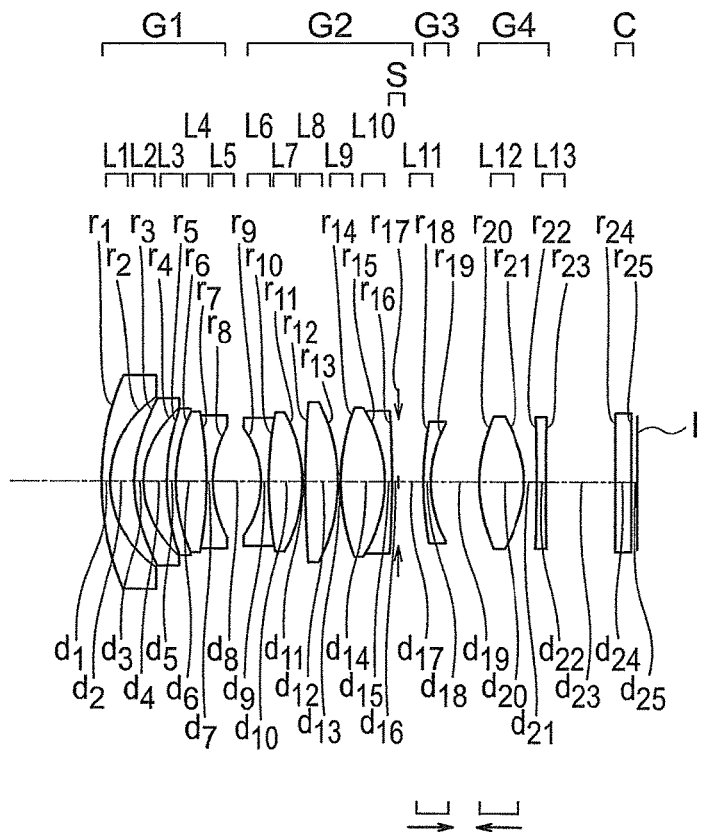
FIG. 20A
FIG. 20B  FIG. 20C  FIG. 20D  FIG. 20E
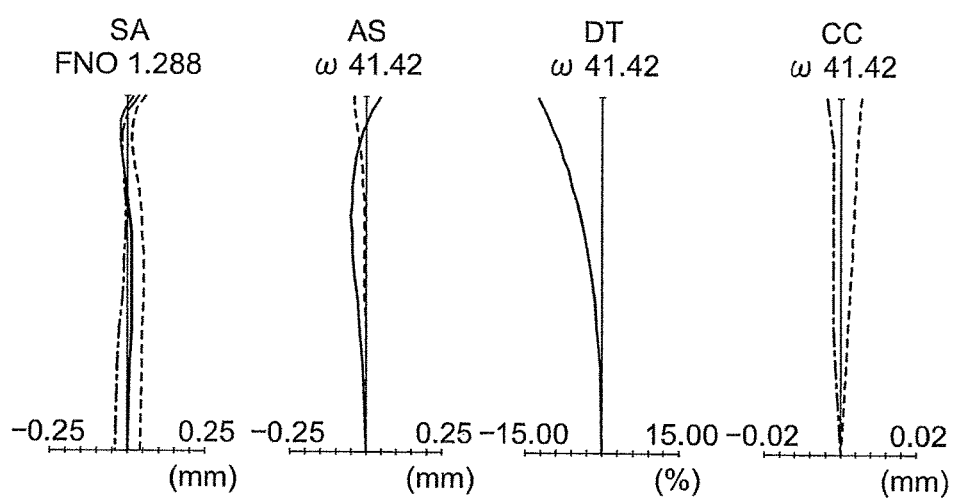

IMAGING OPTICAL SYSTEM AND OPTICAL APPARATUS INCLUDING THE SAME

CROSS-REFERENCE TO RELATED APPLICATION

The present application is a continuation application of PCT/JP2015/056308 filed on Mar. 4, 2015 which is based upon and claims the benefit of priority from Japanese Patent Application No. 2014-159874 filed on Aug. 5, 2014; the entire contents of which are incorporated herein by reference.

BACKGROUND OF THE INVENTION

Field of the Invention

The present invention relates to an imaging optical system and an optical apparatus including the same.

Description of the Related Art

Photographic lenses having angle of views from about 60° to about 50° include wide-angle lenses and standard lenses (hereinafter referred to as "wide-angle photographic lenses"). For optical systems with wide-angle photographic lenses, conventionally, retrofocus-type optical systems or Gauss-type optical systems have been widely used.

The retrofocus-type optical system is constructed with a front unit having a negative refractive power and a rear unit having a positive refractive power. The retrofocus-type optical system is characterized in that it can ensure a sufficiently long back focus.

On the other hand, the Gauss-type optical system has a characteristic pair of cemented lenses. One of the cemented lenses has a negative lens closest to the image side and has a surface closest to the image having a concave surface facing the image side. The other cemented lens has a surface closest to the object having a concave surface facing the object side.

When the Gauss-type optical system is divided into two units, it can be divided into a unit on the object side from one cemented lens (hereinafter referred to as "object-side unit") and a unit on the image side from the other cemented lens (hereinafter referred to as "image-side unit").

In the Gauss-type optical system, the center of refractive power is closer to the image side of the optical system. That is, in the Gauss-type optical system, the refractive power of the object-side unit and the refractive power of the image-side unit are both positive refractive power, but the refractive power is larger in the image-side unit than in the object-side unit.

In conventional optical systems with wide-angle photographic lenses, the tendency for the refractive power arrangement to be asymmetric becomes stronger with increase in angle of view. Therefore, in conventional optical systems with wide-angle photographic lenses, coma, astigmatism, and chromatic aberration of magnification are more likely to deteriorate with increase in angle of view. The refractive power arrangement refers to how positive refractive power and negative refractive power are arranged.

Moreover, in conventional optical systems with wide-angle photographic lenses, the curvature of the lens surface becomes relatively larger with decrease in F-number. Therefore, in conventional optical systems with wide-angle photographic lenses, spherical aberration, coma, and longitudinal chromatic aberration tend to occur more frequently with decrease in F-number.

Moreover, in conventional optical systems with wide-angle photographic lenses, the effective aperture of the rear unit having a positive refractive power tends to increase in size.

A variety of wide-angle photographic lenses have been proposed. In the proposed wide-angle photographic lenses, the F-number is about 1.4. Examples of the optical system with a wide-angle photographic lens having a wide angle of view and a small F-number include the optical systems disclosed in Japanese Patent Application Laid-open Nos. 2012-226309, 2004-101880, 2009-109723, 2010-039340, 2010-097207, and 2011-059290.

SUMMARY OF THE INVENTION

An imaging optical system of the present invention forms a conjugate relation between a conjugate point on an enlargement side having a long distance and a conjugate point on a reduction side having a short distance, the imaging optical system comprises:

in order from the enlargement side,
a first lens unit having a negative refractive power;
a second lens unit having a positive refractive power;
a third lens unit having a negative refractive power; and
a fourth lens unit having a positive refractive power,
wherein
the first lens unit includes a first negative lens positioned closest to the enlargement side and a first cemented lens positioned closest to the reduction side,
the second lens unit includes, in order from the enlargement side, a second cemented lens, one or more positive lens components, and a third cemented lens,
the lens components form a lens block in which only an enlargement-side surface and a reduction-side surface are in contact with air in an optical path,
the first cemented lens includes a negative lens closest to the reduction side and has a surface closest to the reduction side having a concave surface facing toward the reduction side,
the second cemented lens has a positive refractive power and has a surface closest to the enlargement side having a concave surface facing toward the enlargement side, and
the third cemented lens has a positive refractive power and includes a negative lens on the reduction side.

Furthermore, an optical apparatus of the present invention comprises:

an optical system; and
an image pickup element disposed on the reduction side, wherein
the image pickup element has an image pickup surface and converts an image formed on the image pickup surface by the optical system into an electrical signal, and
the optical system is the aforementioned imaging optical system.

Furthermore, an optical apparatus of the present invention comprises:

an optical system; and
a display element disposed on the reduction side, wherein
the display element has a display surface,
an image displayed on the display surface is projected toward the enlargement side by the optical system, and
the optical system is the aforementioned imaging optical system.

BRIEF DESCRIPTION OF THE DRAWINGS

FIG. 3A is a sectional view of an imaging optical system of Example 3, and FIG. 3B, FIG. 3C, FIG. 3D, and FIG. 3E are aberration diagrams;

FIG. 4A is a sectional view of an imaging optical system of Example 4, and FIG. 4B, FIG. 4C, FIG. 4D, and FIG. 4E are aberration diagrams;

FIG. 5A is a sectional view of an imaging optical system of Example 5, and FIG. 5B, FIG. 5C, FIG. 5D, and FIG. 5E are aberration diagrams;

FIG. 6A is a sectional view of an imaging optical system of Example 6, and FIG. 6B, FIG. 6C, FIG. 6D, and FIG. 6E are aberration diagrams;

FIG. 8A is a sectional view of an imaging optical system of Example 8, and FIG. 8B, FIG. 8C, FIG. 8D, and FIG. 8E are aberration diagrams;

FIG. 15A is a sectional view of an imaging optical system of Example 15, and FIG. 15B, FIG. 15C, FIG. 15D, and FIG. 15E are aberration diagrams;

FIG. 16A is a sectional view of an imaging optical system of Example 16, and FIG. 16B, FIG. 16C, FIG. 16D, and FIG. 16E are aberration diagrams;

FIG. 20A is a sectional view of an imaging optical system of Example 20, and FIG. 20B, FIG. 20C, FIG. 20D, and FIG. 20E are aberration diagrams;

DETAILED DESCRIPTION OF THE INVENTION

Figure 1A:
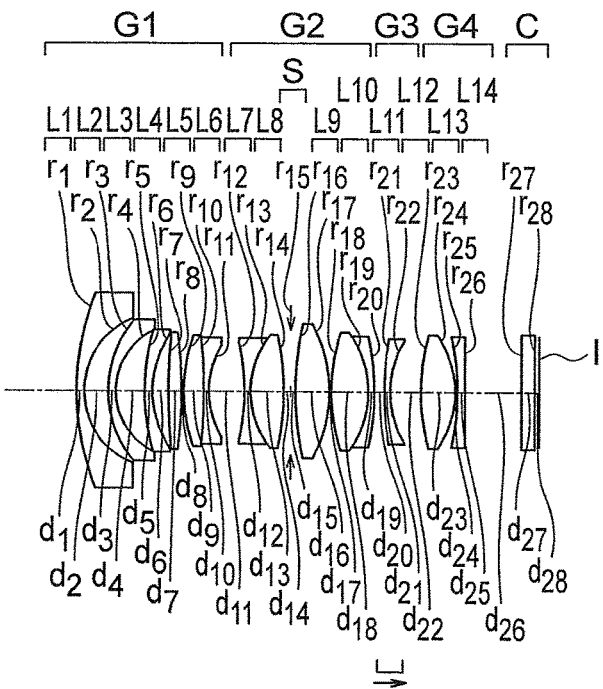
FIG. 1A is a sectional view of an imaging optical system of Example 1.
Figures 1B, 1C, 1D, 1E:
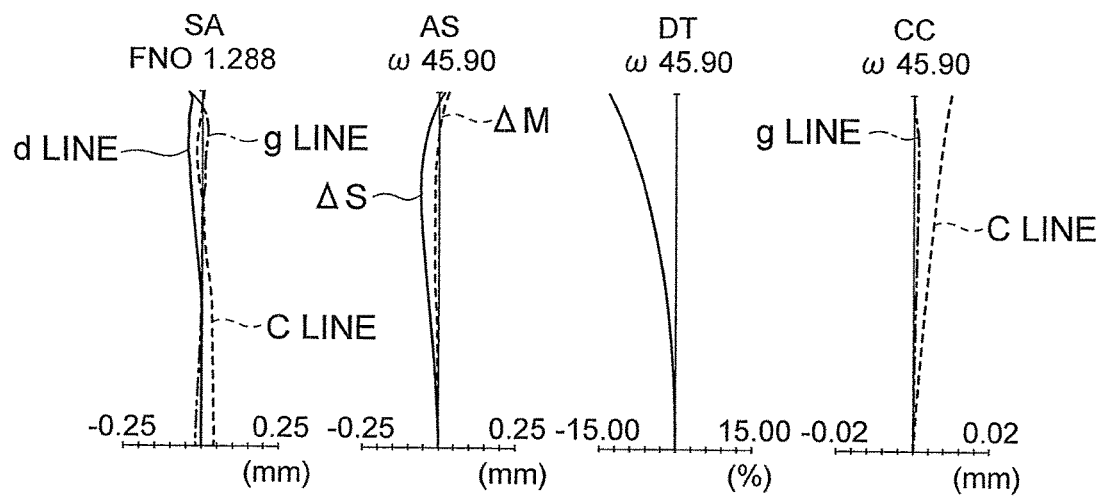
FIG. 1B, FIG. 1C, FIG. 1D, and FIG. 1E are aberration diagrams.

Embodiments and examples of an imaging optical system and an optical apparatus including the same according to the present invention will be described in detail below based on the drawings. It is noted that the present invention is not limited by those embodiments and examples.

An imaging optical system of the present embodiment is an imaging optical system configured to forms a conjugate relation between a conjugate point on the enlargement side having a long distance and a conjugate point on the reduction side having a short distance, the imaging optical system includes, in order from the enlargement side, a first lens unit having a negative refractive power, a second lens unit having a positive refractive power, a third lens unit having a negative refractive power, and a fourth lens unit having a positive refractive power, and the first lens unit includes a first negative lens positioned closest to the enlargement side and a first cemented lens positioned closest to the reduction side, the second lens unit includes, in order from the enlargement side, a second cemented lens, one or more positive lens components, and a third cemented lens, and the lens components form a lens block in which only the enlargement-side surface and the reduction-side surface are in contact with air in the optical path, and the first cemented lens includes a negative lens closest to the reduction side and has a surface closest to the reduction side having a concave surface facing toward the reduction side, the second cemented lens has a positive refractive power and has a surface closest to the enlargement side having a concave surface facing toward the enlargement side, and the third cemented lens has a positive refractive power and includes a negative lens on the reduction side. The concept of lens component includes a single lens, a cemented lens, and a hybrid lens. For example, the hybrid lens is a lens in which a transparent resin layer made of curable resin such as ultraviolet curable resin is formed directly on a processed lens surface.

In the description of the imaging optical system of the present embodiment, a predetermined lens unit is used in description. The predetermined lens unit has a negative refractive power and includes all of lenses located from the lens positioned closest to the enlargement side to the first cemented lens. Thus, the predetermined lens unit corresponds to the first lens unit.

The imaging optical system of the present embodiment will be described by comparing the imaging optical system of the present embodiment with a Gauss-type optical system. In the following description, the object side corresponds to the enlargement side and the image side corresponds to the reduction side.

As described above, the Gauss-type optical system includes a characteristic pair of cemented lenses. Here, one of the cemented lenses has a negative lens closest to the image side and the surface closest to the image side has a concave surface facing the image side.

On the other hand, the imaging optical system of the present embodiment also includes a characteristic pair of cemented lenses, namely, a first cemented lens and a second cemented lens. Here, the first cemented lens has a negative lens closest to the reduction side and the surface closest to the reduction side has a concave surface facing the reduction side. Thus, the first cemented lens corresponds to the one cemented lens of the Gauss-type optical system.

Furthermore, in the Gauss-type optical system, the object-side unit includes the one cemented lens. By contrast, in the imaging optical system of the present embodiment, the predetermined lens unit includes the first cemented lens. Thus, the predetermined lens unit corresponds to the object-side unit of the Gauss-type optical system.

As described above, in the Gauss-type optical system, the refractive power is larger in the image-side unit than in the object-side unit. However, the refractive power of the object-side unit and the refractive power of the image-side unit are both positive refractive powers.

By contrast, in the imaging optical system of the present embodiment, the predetermined lens unit has a negative refractive power. When the distribution state of refractive power is compared to the Gauss-type optical system, in the imaging optical system of the present embodiment, the negative refractive power is distributed to the object-side unit.

In this way, the predetermined lens unit can be said to be an object-side unit in which refractive power is shifted from positive refractive power to negative refractive power in the Gauss-type optical system. The refractive power to be shifted may be a small positive refractive power. However, the refractive power in this case is smaller than the refractive power of the object-side unit in the Gauss-type optical system.

Furthermore, the Gauss-type optical system is an optical system having an extremely high potential in aberration correction even with an F-number of about 1.4, as long as the angle of view is up to about 50°. Such a high potential for aberration correction is based on the characteristic pair of cemented lenses.

Here, the imaging optical system of the present embodiment employs an arrangement in which a refractive power shifts in the object-side unit and an increase in positive refractive power in the image-side unit are effected in the Gauss-type optical system. Therefore, the imaging optical system of the present embodiment differs from the Gauss-type optical system.

However, the imaging optical system of the present embodiment also includes a characteristic pair of cemented lenses. Thus, the imaging optical system of the present embodiment is based on an optical system having an extremely high potential in aberration correction. Therefore, in the imaging optical system of the present embodiment, it is possible (I) to reduce the F-number, that is, to ensure sufficient brightness in the optical system while correcting various aberrations satisfactorily, (II) to reduce the focal length of the imaging optical system as a whole while ensuring a sufficiently long back focus, and (III) to ensure a sufficiently wide angle of view.

The refractive power shift in the object-side unit refers to shifting the refractive power of the object-side unit from original positive refractive power to negative refractive power in the Gauss-type optical system. Furthermore, the increase in positive refractive power in the image-side unit refers to making the positive refractive power of the image-side unit larger than the original refractive power in the Gauss-type optical system.

Furthermore, when the refractive power shift in the object-side unit is effected, the height of principal rays is significantly increased in the image-side unit. As a result, aberration in the image-side unit is deteriorated. In order to avoid this deterioration of aberration, it is preferable to move the aperture stop closer to the image side than the other cemented lens is.

As described above, also in the imaging optical system of the present embodiment, the predetermined lens unit has a negative refractive power. Then, in order to avoid deterioration of aberration in the image-side unit, it is preferable that the aperture stop is positioned closer to the reduction side than the second cemented lens is, also in the imaging optical system of the present embodiment.

As described above, the imaging optical system of the present embodiment is based on the Gauss-type optical system. Thus, the imaging optical system of the present embodiment is also an optical system having an extremely high potential in aberration correction. Based on this, even when the aperture stop is positioned closer to the reduction side than the second cemented lens is, it is possible to prevent deterioration of aberration to some extent.

However, when the aperture stop is positioned closer to the reduction side than the second cemented lens is, the position of the aperture stop relative to the characteristic pair of cemented lenses differs from that of the Gauss-type optical system. Therefore, when the aperture stop is positioned closer to the reduction side than the second cemented lens is, it is difficult to correct aberration at a higher level.

Then, in the imaging optical system of the present embodiment, a third cemented lens is newly provided. This third cemented lens has a negative lens on the reduction side. For example, by combining this negative lens with a positive lens, it is possible to allow the third cemented lens to function as an aplanatic achromatic lens.

In this way, by providing the third cemented lens in addition to the first cemented lens and the second cemented lens, it is possible to correct spherical aberration, coma, longitudinal chromatic aberration, and chromatic aberration of magnification, which are particularly difficult to correct, to a satisfactory level in the imaging optical system of the present embodiment.

As a result, with the imaging optical system of the present embodiment, it is possible to implement an imaging optical system in which various aberrations are corrected favorably while having a wide angle of view and a small F-number. The wide angle of view is, for example, an angle of view of 70° or more, and the small F-number is, for example, about 1.2.

As described above, the imaging optical system of the present embodiment is an optical system having a remarkably high potential for aberration correction. In the imaging optical system of the present embodiment, this extremely high potential for aberration correction is obtained by the inclusion of the following configuration. The first lens unit includes a first negative lens positioned closest to the enlargement side and a first cemented lens positioned closest to the reduction side. The second lens unit includes, in order from the enlargement side, a second cemented lens, one or more positive lens components, and a third cemented lens.

Furthermore, in the imaging optical system of the present embodiment, an aperture stop is positioned closer to the reduction side than the second cemented lens is. In this case, it is preferable that the aperture stop be disposed in the second lens unit.

Furthermore, a more specific configuration of the imaging optical system of the present embodiment is as follows. The imaging optical system includes, in order from the enlargement side, a first lens unit having a negative refractive power, a second lens unit having a positive refractive power, a third lens unit having a negative refractive power, and a fourth lens unit having a positive refractive power. Then, the refractive power of the first lens unit is shifted from positive refractive power in a Gauss-type optical system to negative refractive power, while the second lens unit is provided with a larger positive refractive power than in a Gauss-type optical system.

Furthermore, the first cemented lens has a negative lens closest to the reduction side and the surface closest to the reduction side has a concave surface facing the reduction side. In addition, the second cemented lens has a positive refractive power and the surface closest to the enlargement side has a concave surface facing the enlargement side. Moreover, the third cemented lens has a positive refractive power and has a negative lens on the reduction side. Furthermore, the lens component is a lens block in which the enlargement-side surface and the reduction-side surface alone are in contact with air in the optical path.

A more preferable arrangement of each cemented lens is as follows. The first cemented lens includes, in order from the enlargement side, a positive lens and a negative lens, and the surface closest to the reduction side has a concave surface facing the reduction side. The second cemented lens includes a negative lens and a positive lens, and the surface closest to the enlargement side has a concave surface facing the enlargement side. Furthermore, the third cemented lens includes, in order from the enlargement side, a positive lens and a negative lens.

Furthermore, in the imaging optical system of the present embodiment, it is preferable that following Conditional Expression (1) is satisfied:

$$1<M_{4\_3G}/M_{4\_4G}<100 \qquad (1),$$

where $M_{4\_3G}$ is a lateral magnification of the third lens unit at a time of focusing to an object at infinity; and $N_{4\_4G}$ is a lateral magnification of the fourth lens unit at a time of focusing to an object at infinity.

As described above, the imaging optical system of the present embodiment employs an arrangement in which a refractive power shift in the object-side unit and an increase in positive refractive power in the image-side unit are effected in the Gauss-type optical system. Here, as a particularly unique requirement of an optical system having a large aperture ratio, there is correction at high level for spherical aberration, coma, and astigmatism.

Thus, in order to achieve this aberration correction at high level, the section, closer to the reduction side than the predetermined lens unit is, is constructed with the second lens unit having a positive refractive power, the third lens unit having a negative refractive power, and the fourth lens unit having a positive refractive power. In this way, the section closer to the reduction side than the predetermined lens unit is has a negative refractive power that is present between two positive refractive powers, whereby refractive power is clearly divided.

Then, the optical system as a whole has an arrangement including four lens units having a negative refractive power, a positive refractive power, a negative refractive power, and a positive refractive power. As a result, it is possible to implement an imaging optical system in which various aberrations are corrected favorably while having a wide angle of view and a small F number.

It is then preferable that Conditional Expression (1) is satisfied in the relation between the third lens unit having a negative refractive power and the fourth lens unit having a positive refractive power.

When exceeding an upper limit value of Conditional Expression (1), it is difficult to ensure a back focus of a required length. On the other hand, when falling below a lower limit value of Conditional Expression (1), it is difficult to correct each of spherical aberration, coma, and astigmatism to a satisfactory level.

It is desirable that following Conditional Expression (1') is satisfied instead of Conditional Expression (1):

$$3<M_{4\_3G}/M_{4\_4G}<20 \qquad (1')$$

In addition, it is more desirable that following Conditional Expression (1") is satisfied instead of Conditional Expression (1):

$$4.9<M_{4\_3G}/M_{4\_4G}<15 \qquad (1)$$

Furthermore, in the imaging optical system of the present embodiment, it is preferable that the first negative lens is a meniscus lens.

As described above, in the imaging optical system of the present embodiment, a negative refractive power is imparted to the predetermined lens unit. For this, it is preferable that the lens positioned closest to the enlargement side in particular is a negative lens. However, the negative lens arranged closest to the enlargement side has a significant effect on the amount of off-axis aberration compared with a negative lens arranged at any other position. Then, by forming the negative lens into a meniscus shape, it is possible to prevent deterioration of off-axis aberration. As a result, it is possible to implement an imaging optical system in which various aberrations are corrected favorably while having a wide angle of view and a small F-number.

Furthermore, in the imaging optical system of the present embodiment, it is preferable that following Conditional Expression (2) is satisfied:

$$0.1<(R_{N1F}+R_{N1R})/(R_{N1F}-R_{N1R})<10 \qquad (2),$$

where $R_{N1F}$ is a paraxial radius of curvature of an enlargement-side surface of the first negative lens; and $R_{N1R}$ is a paraxial radius of curvature of an reduction-side surface of the first negative lens.

By satisfying Conditional Expression (2), it is possible to prevent deterioration of off-axis aberration.

When exceeding an upper limit value of Conditional Expression (2), astigmatism or coma is more likely to be deteriorated. Thus, exceeding the upper limit value of Conditional Expression (2) is not preferable. On the other hand, when falling below a lower limit value of Conditional Expression (2), barrel distortion is more likely to be increased.

It is desirable that following Conditional Expression (2') is satisfied instead of Conditional Expression (2):

$$0.5<(R_{N1F}+R_{N1R})/(R_{N1F}R_{N1R})<4 \qquad (2').$$

Furthermore, it is more desirable that following Conditional Expression (2") is satisfied instead of Conditional Expression (2):

$$0.9<(R_{N1F}+R_{N1R})/(R_{N1F}-R_{N1R})<2.5 \qquad (2'').$$

Furthermore, in the imaging optical system of the present embodiment, it is preferable that following Conditional Expression (3) is satisfied:

$$0.1<(R_{3GF}+R_{3GR})/(R_{3GF}-R_{3GR})<10 \qquad (3),$$

where $R_{3GF}$ is a paraxial radius of curvature of a surface positioned closest to the enlargement side in the third lens unit; and $R_{3GR}$ is a paraxial radius of curvature of a surface positioned closest to the reduction side in the third lens unit.

As described above, the imaging optical system of the present embodiment employs an arrangement in which a refractive power shift in the object-side unit and an increase in positive refractive power in the image-side unit are effected in the Gauss-type optical system. Here, as a particularly unique requirement of an optical system having a large aperture ratio, there is correction at high level for spherical aberration, coma, and astigmatism.

Then, in order to achieve this aberration correction at high level, the section, closer to the reduction side than the predetermined lens unit is, is constructed with the second lens unit having a positive refractive power, the third lens unit having a negative refractive power, and the fourth lens unit having a positive refractive power. In this way, the section closer to the reduction side than the predetermined lens unit is has a negative refractive power that is present between two positive refractive powers, whereby refractive power is clearly divided.

Then, the optical system as a whole has an arrangement including four lens units having a negative refractive power, a positive refractive power, a negative refractive power, and a positive refractive power. As a result, it is possible to implement an imaging optical system in which various aberrations are corrected favorably while having a wide angle of view and a small F number.

In particular, the configuration and shape of the third lens unit having a negative refractive power has a larger effect on the amount of spherical aberration, the amount of coma, and the amount of astigmatism when compared with the first lens unit and the second lens unit. That is, the configuration and shape of the third lens unit having a negative refractive power has a large effect on the degree of simultaneous satisfaction of the correction level of these aberrations.

It is then preferable that Conditional Expression (3) is satisfied. By satisfying Conditional Expression (3), it is possible to correct spherical aberration, coma, and astigmatism simultaneously to a satisfactory level.

When exceeding an upper limit value of Conditional Expression (3), the correction effect on spherical aberration is reduced. On the other hand, when falling below a lower limit value of Conditional Expression (3), the correction effect on astigmatism and coma is reduced. It is thus unfavorable that falling below the lower limit value of Conditional Expression (3).

It is desirable that following Conditional Expression (3') is satisfied instead of Conditional Expression (3):

$$0.5<(R_{3GF}+R_{3GR})/(R_{3GF}-R_{3GR})<5 \quad (3').$$

In addition, it is more desirable that following Conditional Expression (3") is satisfied instead of Conditional Expression (3):

$$0.7<(R_{3GF}+R_{3GR})/(R_{3GF}-R_{3GR})<2.8 \quad (3").$$

Furthermore, in the imaging optical system of the present embodiment, it is preferable that the fourth lens unit includes a positive lens and includes two or more lenses.

As described above, the imaging optical system of the present embodiment employs an arrangement in which a refractive power shift in the object-side unit and an increase in positive refractive power in the image-side unit are effected in the Gauss-type optical system. Here, as a particularly unique requirement of an optical system having a large aperture ratio, there is correction at high level for spherical aberration, coma, and astigmatism.

Then, in order to achieve this aberration correction at high level, the section, closer to the reduction side than the predetermined lens unit is, is constructed with the second lens unit having a positive refractive power, the third lens unit having a negative refractive power, and the fourth lens unit having a positive refractive power. In this way, the section closer to the reduction side than the predetermined lens unit is has a negative refractive power that is present between two positive refractive powers, whereby refractive power is clearly divided.

Then, the optical system as a whole has an arrangement including four lens units having a negative refractive power, a positive refractive power, a negative refractive power, and a positive refractive power. As a result, it is possible to implement an imaging optical system in which various aberrations are corrected favorably while having a wide angle of view and a small F number.

In particular, the configuration of the fourth lens unit has a larger effect on the amount of spherical aberration, the amount of coma, and the amount of astigmatism when compared with the first lens unit and the second lens unit. That is, the configuration of the fourth lens unit has a large effect on the degree of simultaneous satisfaction of the correction level of these aberrations.

Considering that the third lens unit is given a negative refractive power, it is preferable that the fourth lens unit is given a large positive refractive power as a whole. Then, the fourth lens unit is configured with two or more lenses and to include a positive lens. By doing so, it is possible to correct spherical aberration, coma, and astigmatism simultaneously to a satisfactory level, while giving a large positive refractive power.

The imaging optical system of the present embodiment is derived from the Gauss-type optical system. Then, to ensure high imaging performance, a detailed arrangement is changed by changing the positive and negative signs of refractive power and the absolute value of refractive power in the object-side unit and/or the image-side unit in accordance with the specifications.

Here, the Gauss-type optical system includes the object-side unit and the image-side unit and is constructed with six lenses or seven lenses as a whole. The arrangement is represented as, for example, in order from the object side, positive • positive negative • S • negative positive • positive, or positive • positive negative • S • negative positive • positive • positive. Here, "positive" represents a positive lens, "negative" represents a negative lens, "positive negative" and "negative positive" represent a cemented lens, "S" represents an aperture stop, and "•" represents an air space. Furthermore, the optical system can be divided into the object-side unit and the image-side unit by the aperture stop S as a boundary. In another arrangement, a positive lens is additionally arranged in the image-side unit.

Furthermore, it is preferable that the imaging optical system of the present embodiment includes an aperture stop in the second lens unit.

In a Gauss-type optical system, it is appropriate to position an aperture stop between the object-side unit and the image-side unit. The imaging optical system of the present embodiment is also based on a Gauss-type optical system. If the imaging optical system of the present embodiment was identical with a Gauss-type optical system, an aperture stop would be positioned between the first lens unit and the second lens unit.

However, in the imaging optical system of the present embodiment, while the refractive power of the predetermined lens unit is shifted from positive refractive power in a Gauss-type optical system to negative refractive power, the section closer to the reduction side than the predetermined lens unit is has a larger positive refractive power compared with a Gauss-type optical system. Thus, the height of principal ray is significantly increased closer to the reduction side than the predetermined lens unit is.

For that reason, it is preferable that the imaging optical system of the present embodiment includes an aperture stop in the second lens unit. By doing so, it is possible to prevent deterioration of aberration in the third lens unit and the fourth lens unit.

If an aperture stop is disposed closer to the reduction side than the second lens unit is, the height of principal ray in the first lens unit is significantly increased. It is therefore desirable to avoid the arrangement of an aperture stop closer to the reduction side than the second lens unit is.

Furthermore, in the imaging optical system of the present embodiment, it is preferable that the third lens unit moves at a time of focusing.

The third lens unit has less aberration variation at a time of moving. Thus, by moving the third lens unit at a time of focusing, it is possible to form an image at high resolution, ranging from an object at infinity to an object at a close distance.

Furthermore, in the imaging optical system of the present embodiment, it is preferable that following Conditional Expression (4) is satisfied:

$$-10 < f_{3G}/f_{4G} < -0.1 \qquad (4),$$

where $f_{3G}$ is a focal length of the third lens unit; and $f_{4G}$ is a focal length of the fourth lens unit.

As described above, it is possible to reduce aberration variation at a time of focusing by moving the third lens unit, but aberration variation should be minimized. In particular, the third lens unit and the fourth lens unit have a large effect on variation of spherical aberration, coma, and astigmatism at a time of focusing. It is then preferable that Conditional Expression (4) is satisfied.

When exceeding an upper limit value of Conditional Expression (4) or falling below a lower limit value, variation of spherical aberration, coma, and astigmatism at a time of focusing reaches an unacceptable level.

It is desirable that following Conditional Expression (4') is satisfied instead of Conditional Expression (4):

$$-4 < f_{3G}/f_{4G} < -0.5 \qquad (4')$$

In addition, it is more desirable that following Conditional Expression (4") is satisfied instead of Conditional Expression (4):

$$-2 < f_{3G}/f_{4G} < -1 \qquad (4").$$

Furthermore, in the imaging optical system of the present embodiment, it is preferable that the first lens unit is the predetermined lens unit, the second cemented lens is positioned closer to the reduction side than the predetermined lens unit is, and adjacent to the predetermined lens unit, and following Conditional Expression (5) is satisfied:

$$-2 < (R_{NGR}+R_{C2F})/(R_{NGR}-R_{C2F}) < 8 \qquad (5),$$

where $R_{NGR}$ is a paraxial radius of curvature of the surface positioned closest to the reduction side in the predetermined lens unit; and $R_{C2F}$ is a paraxial radius of curvature of the surface positioned closest to the enlargement side in the second cemented lens.

As for the predetermined lens unit and the second cemented lens, it is more preferable that Conditional Expression (5) is satisfied. By satisfying Conditional Expression (5), it is possible to prevent degradation of axial aberration and degradation of off-axis aberration.

When exceeding an upper limit value of Conditional Expression (5), astigmatism is likely to be deteriorated.

Therefore, exceeding the upper limit value of Conditional Expression (5) is not preferable. On the other hand, when falling below a lower limit value of Conditional Expression (5), spherical aberration is likely to be increased.

Here, the first cemented lens is positioned closer to the enlargement side than the aperture stop is, the first cemented lens is configured with a positive lens and a negative lens in order from the enlargement side, the surface closest to the reduction side has a concave surface facing toward the reduction side, and the predetermined lens unit has a negative refractive power, whereby it is possible to implement an imaging optical system in which various aberrations are corrected favorably while having a wide angle of view and a small F-number.

It is desirable that following Conditional Expression (5') is satisfied instead of Conditional Expression (5):

$$-1 < (R_{NGR}+R_{C2F})/(R_{NGR}-R_{C2F}) < 5 \qquad (5').$$

In addition, it is more desirable that following Conditional Expression (5") is satisfied instead of Conditional Expression (5):

$$-0.5 < (R_{NGR}+R_{C2F})/(R_{NGR}R_{C2F}) < 0.9 \qquad (5").$$

Furthermore, in the imaging optical system of the present embodiment, it is preferable that a first positive lens positioned closest to the second cemented lens is included and following Conditional Expression (6) is satisfied:

$$0.01 < (R_{P1F}+R_{P1R})/(R_{P1F}-R_{P1R}) < 5 \qquad (6),$$

where $R_{P1F}$ is a paraxial radius of curvature of the enlargement-side surface of the first positive lens; and $R_{P1R}$ is a paraxial radius of curvature of the reduction-side surface of the first positive lens.

By satisfying Conditional Expression (6), it is possible to prevent deterioration of axial aberration and deterioration of off-axis aberration.

When exceeding an upper limit value of Conditional Expression (6), coma is more likely to occur. On the other hand, when falling below a lower limit value of Conditional Expression (6), spherical aberration is more likely to occur.

It is desirable that following Conditional Expression (6') is satisfied instead of Conditional Expression (6):

$$0.1 < (R_{P1F}+R_{P1R})/(R_{P1F}-R_{P1R}) < 1 \qquad (6').$$

Furthermore, it is more desirable that following Conditional Expression (6") is satisfied instead of Conditional Expression (6):

$$0.17 < (R_{P1F}+R_{P1R})/(R_{P1F}-R_{P1R}) < 0.65 \qquad (6").$$

Furthermore, in the imaging optical system of the present embodiment, it is preferable that the cemented lens positioned closest to the enlargement side in the second lens unit is the second cemented lens, and following Conditional Expression (7) is satisfied:

$$-45 < (R_{C2F}+R_{C2R})/(R_{C2F}-R_{C2R}) < 65 \qquad (7)$$

where $R_{C2F}$ is the paraxial radius of curvature of the surface positioned closest to the enlargement side in the second cemented lens; and $R_{C2R}$ is a paraxial radius of curvature of the surface positioned closest to the reduction side in the second cemented lens.

When exceeding an upper limit value of Conditional Expression (7), spherical aberration is likely to increase to the negative side. On the other hand, when falling below a lower limit value of Conditional Expression (7), coma and astigmatism are likely to be deteriorated.

It is desirable that following Conditional Expression (7') is satisfied instead of Conditional Expression (7):

$$-35<(R_{CF}+R_{C2R})/(R_{C2F}-R_{C2R})<45 \quad (7').$$

In addition, it is more desirable that following Conditional Expression (7") is satisfied instead of Conditional Expression (7):

$$-25<(R_{CF}+R_{C2R})/(R_{C2F}-R_{C2R})<35 \quad (7").$$

Furthermore, in the imaging optical system of the present embodiment, it is preferable that the cemented lens positioned closest to the reduction side in the first lens unit is the first cemented lens, and following Conditional Expression (8) is satisfied:

$$-10<(R_{C1F}+R_{C1R})/(R_{C1F}-R_{C1R})<45 \quad (8),$$

where $R_{C1F}$ is a paraxial radius of curvature of the surface positioned closest to the enlargement side in the first cemented lens; and $R_{C1R}$ is a paraxial radius of curvature of the surface positioned closest to the reduction side in the first cemented lens.

When exceeding an upper limit value of Conditional Expression (8), astigmatism is likely to be deteriorated. On the other hand, when falling below a lower limit value of Conditional Expression (8), distortion is likely to be deteriorated.

It is desirable that following Conditional Expression (8') is satisfied instead of Conditional Expression (8):

$$-6<(R_{C1F}+R_{C1R})/(R_{C1F}-R_{C1R})<30 \quad (8').$$

In addition, it is more desirable that following Conditional Expression (8") is satisfied instead of Conditional Expression (8):

$$-3<(R_{C1F}-R_{C1R})/(R_{C1F}-R_{C1R})<15 \quad (8").$$

Furthermore, in the imaging optical system of the present embodiment, it is preferable that following Conditional Expression (9) is satisfied:

$$-5<(R_{NGF}-R_{NGR})/(R_{NGF}-R_{NGR})<17 \quad (9),$$

where $R_{NGF}$ is a paraxial radius of curvature of the surface positioned closest to the enlargement side in the predetermined lens unit; and $R_{NGR}$ is the paraxial radius of curvature of the surface positioned closest to the reduction side in the predetermined lens unit.

As for the predetermined lens unit, it is more preferable that Conditional Expression (9) is satisfied. By satisfying Conditional Expression (9), it is possible to prevent deterioration of off-axis aberration.

When exceeding an upper limit value of Conditional Expression (9), barrel distortion is more likely to be increased. Thus, exceeding the upper limit value of Conditional Expression (9) is not preferable. On the other hand, when falling below a lower limit value of Conditional Expression (9), astigmatism or coma is more likely to be deteriorated.

Here, the first cemented lens is positioned closer to the enlargement side than the aperture stop is, the first cemented lens is configured with a positive lens and a negative lens in order from the enlargement side, the surface closest to the reduction side has a concave surface facing toward the reduction side, and the predetermined lens unit has a negative refractive power, whereby it is possible to implement an imaging optical system in which various aberrations are corrected favorably while having a wide angle of view and a small F-number.

It is desirable that following Conditional Expression (9') is satisfied instead of Conditional Expression (9):

$$-3<(R_{NGF}+R_{NGR})/(R_{NGF}-R_{NGR})<12 \quad (9').$$

In addition, it is more desirable that following Conditional Expression (9") is satisfied instead of Conditional Expression (9):

$$-1.5<(R_{NGF}-R_{NGR})/(R_{NGF}-R_{NGR})<9 \quad (9")$$

Furthermore, in the imaging optical system of the present embodiment, it is preferable that the first cemented lens includes, in order from the enlargement side, a positive lens and a negative lens, the second cemented lens, one or more positive lens components, and the third cemented lens is disposed in this order from the enlargement side, the third lens unit includes one or more negative lens components, and the fourth lens unit includes a positive lens closest to the enlargement side.

By constructing the third lens unit in this way, it is possible to implement an imaging optical system in which various aberrations are corrected favorably while having a wide angle of view and a small F-number. In addition, even when the number of lenses is increased in order to improve optical performance, it is possible to ensure an appropriate principal point position. Furthermore, even when a larger positive refractive power compared with the Gauss-type optical system is applied to the section closer to the reduction side than the predetermined lens unit, it is possible to correct spherical aberration, coma, longitudinal chromatic aberration, and chromatic aberration of magnification to a satisfactory level.

Furthermore, in the imaging optical system of the present embodiment, it is preferable that the fourth lens unit includes a second positive lens closest to the enlargement side, and following Conditional Expression (10) is satisfied:

$$0<(R_{P2F}-R_{P2R})/(R_{P2F}-R_{P2R})<1 \quad (10),$$

where $R_{P2F}$ is a paraxial radius of curvature of the enlargement-side surface of the second positive lens; and $R_{P2R}$ is a paraxial radius of curvature of the reduction-side surface of the second positive lens.

By satisfying Conditional Expression (10), it is possible to prevent deterioration of axial aberration and deterioration of off-axis aberration.

When exceeding an upper limit value of Conditional Expression (10), spherical aberration and coma are more likely to be deteriorated. On the other hand, when falling below a lower limit value of Conditional Expression (10), astigmatism is more likely to be increased. Thus, falling below the lower limit value of Conditional Expression (10) is not preferable.

It is desirable that following Conditional Expression (10') is satisfied instead of Conditional Expression (10):

$$0.05<(R_{NF}+R_{P2R})/(R_{P2F}-R_{NR})<0.85 \quad (10').$$

Furthermore, it is more desirable that following Conditional Expression (10") is satisfied instead of Conditional Expression (10):

$$0.15<(R_{P2F}+R_{P2R})/(R_{P2F}-R_{P2R})<0.65 \quad (10").$$

Furthermore, in the imaging optical system of the present embodiment, it is preferable that following Conditional Expression (11) is satisfied:

$$0.8 < FB/f_R < 1.8 \quad (11),$$

where

FB is a back focus in the imaging optical system; and $f_R$ is a combined focal length of the lens units from the second lens unit to the fourth lens unit.

In order to correct off-axis aberration favorably, it is preferable that Conditional Expression (11) is satisfied. By satisfying Conditional Expression (11), it is possible to correct spherical aberration, coma, and astigmatism simultaneously to a satisfactory level. The back focus is the air conversion length.

When exceeding an upper limit value of Conditional Expression (11), the correction effect on spherical aberration is reduced. On the other hand, when falling below a lower limit value of Conditional Expression (11), the correction effect on astigmatism and coma is reduced. It is thus unfavorable that the lower limit value of Conditional Expression (11) be not reached.

It is desirable that following Conditional Expression (11') is satisfied instead of Conditional Expression (11):

$$1.0 < FB/f_R < 1.7 \quad (11').$$

In addition, it is more desirable that following Conditional Expression (11") is satisfied instead of Conditional Expression (11):

$$1.2 < FB/f_R < 1.65 \quad (11'').$$

Furthermore, in the imaging optical system of the present embodiment, it is preferable that following Conditional Expression (A) is satisfied:

$$0 < f/e_{N1F} < 2 \quad (A),$$

where f is a focal length of the imaging optical system as a whole at the time of focusing to the object at infinity; and $e_{N1F}$ is a maximum effective aperture of the enlargement-side surface of the first negative lens.

When exceeding an upper limit value of Conditional Expression (A), it is difficult to expand the angle of view. That is, when the angle of view is to be expanded, spherical aberration, distortion, and astigmatism are more likely to occur. On the other hand, when falling below a lower limit value of Conditional Expression (A), the optical system is more likely to increase in size radially.

It is desirable that following Conditional Expression (A') is satisfied instead of Conditional Expression (A):

$$0.1 < f/e_{N1F} < 1.5 \quad (A').$$

Furthermore, it is more desirable that following Conditional Expression (A") is satisfied instead of Conditional Expression (A):

$$0.2 < f/e_{N1F} < 1 \quad (A'').$$

Furthermore, in the imaging optical system of the present embodiment, it is preferable that following Conditional Expression (B) is satisfied:

$$0 < (f/e_{AS})/Fno < 2 \quad (B),$$

where f is the focal length of the imaging optical system as a whole at the time of focusing to the object at infinity;

$e_{AS}$ is a maximum diameter of the aperture stop;

Fno is a F-number of the imaging optical system as a whole at the time of focusing to the object at infinity.

When exceeding an upper limit value of Conditional Expression (B), it is difficult to expand the angle of view. That is, when the angle of view is to be expanded, it is difficult to correct spherical aberration and chromatic aberration. On the other hand, when falling below a lower limit value of Conditional Expression (B), the optical system is more likely to increase in size radially.

It is desirable that following Conditional Expression (B') is satisfied instead of Conditional Expression (B):

$$0.2 < (f/e_{AS})/Fno < 1 \quad (B').$$

Furthermore, it is more desirable that following Conditional Expression (B") is satisfied instead of Conditional Expression (B)

$$0.3 < (f/e_{AS})/Fno < 0.9 \quad (B'').$$

Furthermore, in the imaging optical system of the present embodiment, it is preferable that following Conditional Expression (C) is satisfied:

$$0 < T_{air\_max}/\Sigma d \leq 0.27 \quad (C),$$

where $T_{air\_max}$ is a largest axial air space in the range from a surface positioned closest to the enlargement side to a surface positioned closest to the reduction side in the imaging optical system; and $\Sigma d$ is an axial distance from the surface positioned closest to the enlargement side to the surface positioned closest to the reduction side in the imaging optical system.

Conditional Expression (C) is a conditional expression advantageous for ensuring high optical performance, reducing the overall length of the optical system, and reducing the outer diameter of the imaging optical system.

Adequately increasing the airspace between lenses leads to improvement in optical performance. However, excessively increasing $\Sigma d$, that is, the axial distance from the lens surface positioned closest to the enlargement side to the lens surface positioned closest to the reduction side in the imaging optical system, to ensure optical performance is more likely to lead to an increase in the overall length of the optical system and a larger aperture of the optical system.

Then, by satisfying Conditional Expression (C), it is advantageous for ensuring a required number of lenses for achieving high optical performance while reducing the overall length and the diameter of the optical system.

It is desirable that following Conditional Expression (C') is satisfied instead of Conditional Expression (C):

$$0.03 < T_{air\_max}/\Sigma d \leq 0.2 \quad (C').$$

Furthermore, it is more desirable that following Conditional Expression (C") is satisfied instead of Conditional Expression (C):

$$0.07 < T_{air\_max}/\Sigma d \leq 0.16 \quad (C'').$$

Furthermore, in the imaging optical system of the present embodiment, it is preferable that the third lens unit is set as a first focusing lens unit, a partial lens unit in the fourth lens unit is set as a second focusing lens unit, and at a time of focusing, in addition to movement of the first focusing lens unit, the second focusing lens unit moves while changing a distance to the first focusing lens unit.

By allowing a plurality of lens units to move at a time of focusing, it is possible to reduce aberration occurring at a time of focusing to an object at a close distance. As a result, it is possible to reduce the distance to an object that enables focusing.

Furthermore, it is preferable that the imaging optical system of the present embodiment has a first focusing lens unit and the first focusing lens unit is disposed closer to the reduction side than the third cemented lens is, moves along the optical axis of the imaging optical system at a time of focusing, and has a negative refractive power.

By doing so, it is possible to reduce a change in size of the image at the time of focusing on the reduction side (imaging plane) or the enlargement side (screen plane) Furthermore, it is possible to suppress deterioration of astigmatism and deterioration of spherical aberration due to movement of the focusing lens unit at the time of focusing on an object at infinity.

Furthermore, in the imaging optical system of the present embodiment, it is preferable that following Conditional Expression (D) is satisfied:

$$0<(R_{F1F}+R_{F1R})/(R_{F1F}-R_{F1R})<5 \qquad (D)$$

where $R_{F1F}$ is a paraxial radius of curvature of the surface positioned closest to the enlargement side in the first focusing lens unit; and $R_{F1R}$ is a paraxial radius of curvature of the surface positioned closest to the reduction side in the first focusing lens unit.

It is preferable to suppress variation of spherical aberration and variation of coma by setting so as not to fall below a lower limit value of Conditional Expression (D) and by setting so as not to exceed an upper limit value of Conditional Expression (D).

It is desirable that following Conditional Expression (D') is satisfied instead of Conditional Expression (D):

$$0.1<(R_{F1F}+R_{F1R})/(R_{F1F}-R_{F1R})<4.5 \qquad (D').$$

In addition, it is more desirable that following Conditional Expression (D") is satisfied instead of Conditional Expression (D):

$$0.2<(R_{F1F}+R_{F1R})/(R_{F1F}-R_{F1R})<4 \qquad (D").$$

Furthermore, in the imaging optical system of the present embodiment, it is preferable that the first focusing lens unit moves toward the reduction side at the time of focusing to an object at a close distance from a state of focusing on an object at infinity which positions on the enlargement side, and following Conditional Expression (E) is satisfied:

$$-1<M_{F1}/f<0 \qquad (E)$$

where $M_{F1}$ is a maximum amount of movement along the optical axis direction at the time of focusing in the first focusing lens unit; and f is the focal length of the imaging optical system as a whole at the time of focusing to the object at infinity.

It is preferable to reduce the distance to an object that enables focusing by setting so as not to fall below a lower limit value of Conditional Expression (E), and to prevent the entire length of the imaging optical system from becoming too long by setting so as not to exceed an upper limit value of Conditional Expression (E)

It is desirable that following Conditional Expression (E') is satisfied instead of Conditional Expression (E):

$$-0.8<M_{F1}/f<-0.05 \qquad (E').$$

In addition, it is more desirable that following Conditional Expression (E") is satisfied instead of Conditional Expression (E)

$$-0.4<M_{F1}/f<-0.04 \qquad (E').$$

Furthermore, it is preferable that the imaging optical system of the present embodiment has a second focusing lens unit and the second focusing lens unit is disposed closer to the reduction side than the first focusing lens unit is, moves along the optical axis of the imaging forming optical system while changing the distance to the first focusing lens unit at the time of focusing, and have a positive refractive power.

The refractive power of the first focusing lens unit is negative refractive power and the refractive power of the second focusing lens unit, positioned closer to the reduction side than the first focusing lens unit is, is positive refractive power, which is advantageous in reducing the size of the imaging optical system while keeping the exit pupil away from the image plane of the reduction side. Furthermore, this configuration is advantageous in achieving both reduction of aberration variation at the time of focusing and reduction of the distance to the object that enables focusing.

Furthermore, in the imaging optical system of the present embodiment, it is preferable that the first focusing lens unit and the second focusing lens unit each include at most two lenses.

By doing so, it is possible to reduce the weight of the focusing lens units. Therefore, this configuration is advantageous in reduction of load on the drive mechanism and reduction of the size of the imaging optical system.

Furthermore, in the imaging optical system of the present embodiment, it is preferable that the first focusing lens unit moves toward the reduction side at the time of focusing to an object at a close distance from a state of focusing on an object at infinity which positions on the enlargement side, and the second focusing lens unit moves toward the enlargement side at the time of focusing to the object at a close distance from the state of focusing on the object at infinity which positions on the enlargement side, and the first focusing lens unit and the second focusing lens unit satisfy following Conditional Expression (F) at the time of focusing:

$$0<M_{F2}/M_{F1}<1.5 \qquad (F)$$

where $M_{F1}$ is a maximum amount of movement along the optical axis direction at the time of focusing in the first focusing lens unit; and $M_{F2}$ is a maximum amount of movement along the optical axis direction at the time of focusing in the second focusing lens unit.

By moving the second focusing lens unit so as not to fall below the lower limit value of Conditional Expression (F), it is possible to favorably correct off-axis aberration varying with the movement of the first focusing lens unit. On the other hand, suppressing the amount of movement of the second focusing lens unit so as not to fall below the lower limit value of Conditional Expression (F), thereby it is preferable to reduce change in size of the image at the time of focusing on the reduction side (imaging plane) or the enlargement side (screen plane).

It is desirable that following Conditional Expression (F') is satisfied instead of Conditional Expression (F):

$$0.005<M_{F2}/M_{F1}<1.2 \qquad (F').$$

In addition, it is more desirable that following Conditional Expression (F") is satisfied instead of Conditional Expression (F):

$$0.008<M_{F2}/M_{F1}<1 \qquad (F").$$

Furthermore, in the imaging optical system of the present embodiment, it is preferable that the first focusing lens unit and the second focusing lens unit satisfy following Conditional Expression (G):

$$-3 < f_{F1}/f_{F2} < -0.5 \quad (G),$$

where
$f_{F1}$ is a focal length of the first focusing lens unit; and
$f_{F2}$ is a focal length of the second focusing lens unit.

A sufficient negative refractive power of the first focusing lens unit is ensured by setting so as not to fall below a lower limit value of Conditional Expression (G), and an excessive negative refractive power of the first focusing lens unit is suppressed by setting so as not to exceed an upper limit value of Conditional Expression (G). This configuration is advantageous both in reduction of aberration variation occurring at the time of focusing in a narrow move range and in reduction of the distance to an object that enables focusing.

It is desirable that following Conditional Expression (G') is satisfied instead of Conditional Expression (G)

$$-2.8 < f_{F1}/f_{F2} < -0.8 \quad (G').$$

In addition, it is more desirable that following Conditional Expression (G") is satisfied instead of Conditional Expression (G):

$$-2.5 < f_{F1}/f_{F2} < -1 \quad (G'').$$

Furthermore, in the imaging optical system of the present embodiment, it is preferable that the first focusing lens unit and the second focusing lens unit satisfy following Conditional Expression (H)

$$5 < \beta_{F1}/\beta_{F2} < 50 \quad (H),$$

where
$\beta_{F1}$ is a lateral magnification of the first focusing lens unit at a time of focusing to an object at infinity; and
$\beta_{F2}$ is a lateral magnification of the second focusing lens unit at the time of focusing to then object at infinity.

When exceeding an upper limit value of Conditional Expression (H) or falling below a lower limit value of Conditional Expression (H), variation of spherical aberration, variation of coma, and variation of astigmatism at the time of focusing reach an unacceptable level.

It is desirable that following Conditional Expression (H') is satisfied instead of Conditional Expression (H):

$$8 < \beta_{F1}/\beta_{F2} < 40 \quad (H').$$

In addition, it is more desirable that following Conditional Expression (H") is satisfied instead of Conditional Expression (H):

$$10 < \beta_{F1}/\beta_{F2} < 35 \quad (H'').$$

Furthermore, in the imaging optical system of the present embodiment, it is preferable that the first cemented lens is a cemented lens including three lenses.

This configuration is advantageous in reduction of aberration variation due to decentration of the cemented lens and in correction of chromatic aberration.

Furthermore, in the imaging optical system of the present embodiment, it is preferable that the third lens unit includes a plurality of lenses.

This configuration is advantageous in aberration correction. Furthermore, when the third lens unit is a focusing lens unit, this configuration is also advantageous in reduction of aberration variation at a time of focusing to an object at a close distance.

Furthermore, in the imaging optical system of the present embodiment, it is preferable that the third lens unit includes a cemented lens.

This configuration is advantageous in reduction of aberration variation caused by decentration and in correction of chromatic aberration.

Furthermore, in the imaging optical system of the present embodiment, it is preferable that the fourth lens unit includes a cemented lens including a positive lens.

This configuration is advantageous in reduction of aberration variation caused by decentration of the cemented lens and in correction of chromatic aberration.

Furthermore, in the imaging optical system of the present embodiment, it is preferable that the cemented lens including a positive lens in the fourth lens unit moves while changing a distance to another focusing lens unit at a time of focusing.

Making a floating lens unit in focusing operation to be a cemented lens is advantageous in reduction of aberration variation occurring at a time of focusing.

Furthermore, an optical apparatus of the present embodiment includes an optical system and an image pickup element arranged on the reduction side, the image pickup element has an image pickup surface and converts an image formed on the image pickup surface by the optical system into an electrical signal, and the optical system is the aforementioned imaging optical system.

According to the optical apparatus of the present embodiment, it is possible to capture an image in a wider photography range with low noise at high resolution.

Furthermore, an optical apparatus of the present embodiment has an optical system and a display element arranged on the reduction side, the display element has a display surface, an image displayed on the display surface is projected toward the enlargement side by the optical system, and the optical system is the aforementioned imaging optical system.

According to the optical apparatus of the present embodiment, it is possible to project an image in a wider projection range with low noise at high resolution.

The imaging optical system and the optical apparatus described above may satisfy a plurality of arrangements at the same time. Doing so is preferable to obtain a favorable imaging optical system or optical apparatus. A preferable combination of arrangements is made as desired. Furthermore, in each conditional expression, only the upper limit value or the lower limit value in a more restricted numerical range of the conditional expression may be limited.

Examples of the imaging optical system will be described in detail below based on the drawings. It is noted that the present invention is not limited by those examples.

Examples 1 to 20 of the imaging optical system will be described below based on the drawings. All of the imaging optical systems of Examples 1 to 20 are imaging optical systems having an F number falling below 1.5.

FIG. 1A, FIG. 2A, FIG. 3A, FIG. 4A, FIG. 5A, FIG. 6A, FIG. 7A, FIG. 8A, FIG. 9A, FIG. 10A, FIG. 11A, FIG. 12A, FIG. 13A, FIG. 14A, FIG. 15A, FIG. 16A, FIG. 17A, FIG. 18A, FIG. 19A, and FIG. 20A are lens sectional views of the imaging optical systems of Examples. The lens sectional views are lens sectional views at a time of focusing to an object at infinity.

FIG. 1B, FIG. 2B, FIG. 3B, FIG. 4B, FIG. 5B, FIG. 6B, FIG. 7B, FIG. 8B, FIG. 9B, FIG. 10B, FIG. 11B, FIG. 12B, FIG. 13B, FIG. 14B, FIG. 15B, FIG. 16B, FIG. 17B, FIG. 18B, FIG. 19B, and FIG. 20B illustrate spherical aberration (SA) in the imaging optical systems of Examples. FIG. 1C, FIG. 2C, FIG. 3C, FIG. 4C, FIG. 5C, FIG. 6C, FIG. 7C, FIG. 8C, FIG. 9C, FIG. 10C, FIG. 11C, FIG. 12C, FIG. 13C, FIG. 14C, FIG. 15C, FIG. 16C, FIG. 17C, FIG. 18C, FIG. 19C, and FIG. 20C illustrate astigmatism (AS) FIG. 1D, FIG. 2D, FIG. 3D, FIG. 4D, FIG. 5D, FIG. 6D, FIG. 7D, FIG. 8D, FIG. 9D, FIG. 10D, FIG. 11D, FIG. 12D, FIG. 13D, FIG. 14D, FIG. 15D, FIG. 16D, FIG. 17D, FIG. 18D, FIG. 19D, and FIG. 20D illustrate distortion (DT). FIG. 1E, FIG. 2E, FIG. 3E, FIG. 4E, FIG. 5E, FIG. 6E, FIG. 7E, FIG. 8E, FIG. 9E, FIG. 10E, FIG. 11E, FIG. 12E, FIG. 13E, FIG. 14E, FIG. 15E, FIG. 16E, FIG. 17E, FIG. 18E, FIG. 19E, and FIG. 20E illustrate chromatic aberration of magnification (CC).

The aberration diagrams are aberration diagrams at the time of focusing to the object at infinity. Furthermore, "ω" denotes a half angle of view.

Furthermore, in the lens sectional views of Examples, the first lens unit is denoted as G1, the second lens unit is denoted as G2, the third lens unit is denoted as G3, the fourth lens unit is denoted as G4, cover glass is denoted as C, and the image plane is denoted as I. The imaging optical system of each Example can be divided into a front unit and a rear unit. In this case, the first lens unit G1 corresponds to the front unit, and the remaining lens units correspond to the rear unit.

Furthermore, although not shown, a plane-parallel plate that forms a low-pass filter may be arranged between the fourth lens unit G4 and the image plane I. A wavelength range limiting coat for limiting infrared light may be applied on the surface of the plane-parallel plate. A multilayer film for limiting a wavelength range may be applied on the surface of the cover glass C. In addition, the cover glass C may have a low-pass filter function.

Furthermore, when the imaging optical system is used for image capturing, an image pickup element is arranged on the image plane I. On the other hand, when the imaging optical system is used for projection, a display element is arranged on the image plane I. In the description of the arrangement in each example, it is presumed that the imaging optical system is used for image capturing. Thus, it is assumed that the enlargement side is the object side and the reduction side is the image side.

The imaging optical system according to Example 1 will be described. FIG. 1A is a lens sectional view of the imaging optical system according to Example 1. FIG. 1B, FIG. 1C, FIG. 1D, and FIG. 1E are aberration diagrams of the imaging optical system according to Example 1.

The imaging optical system according to Example 1 includes, as illustrated in FIG. 1A, in order from the object side, a first lens unit G1 having a negative refractive power, a second lens unit G2 having a positive refractive power, a third lens unit G3 having a negative refractive power, and a fourth lens unit G4 having a positive refractive power. The second lens unit G2 includes an aperture stop S.

The first lens unit G1 includes a negative meniscus lens L1 having a convex surface facing toward the object side, a negative meniscus lens L2 having a convex surface facing toward the object side, a negative meniscus lens L3 having a convex surface facing toward the object side, a biconvex positive lens L4, a biconvex positive lens L5, and a biconcave negative lens L6. Here, the biconvex positive lens L5 and the biconcave negative lens L6 are cemented together.

The second lens unit G2 includes a biconcave negative lens L7, a biconvex positive lens L8, a biconvex positive lens L9, a biconvex positive lens L10, and a negative meniscus lens L11 having a convex surface facing toward the image side. Here, the biconcave negative lens L7 and the biconvex positive lens L8 are cemented together. The biconvex positive lens L10 and the negative meniscus lens L11 are cemented together.

The third lens unit G3 includes a negative meniscus lens L12 having a convex surface facing toward the object side.

The fourth lens unit G4 includes a biconvex positive lens L13 and a negative meniscus lens L14 having a convex surface facing toward the image side.

Here, the first lens unit G1 is the predetermined lens unit. Furthermore, the biconvex positive lens L5 and the biconcave negative lens L6 constitute the first cemented lens. Furthermore, the biconcave negative lens L7 and the biconvex positive lens L8 constitute the second cemented lens. Furthermore, the biconvex positive lens L10 and the negative meniscus lens L11 constitute the third cemented lens.

Furthermore, at a time of focusing from an object at infinity to an object at a close distance, the negative meniscus lens L12 moves toward the image side along the optical axis.

Aspheric surfaces are provided on four surfaces in total, namely, the image-side surface of the negative meniscus lens L3, both surfaces of the negative meniscus lens L12, and the image-side surface of the biconvex positive lens L13.

Figure 2A:
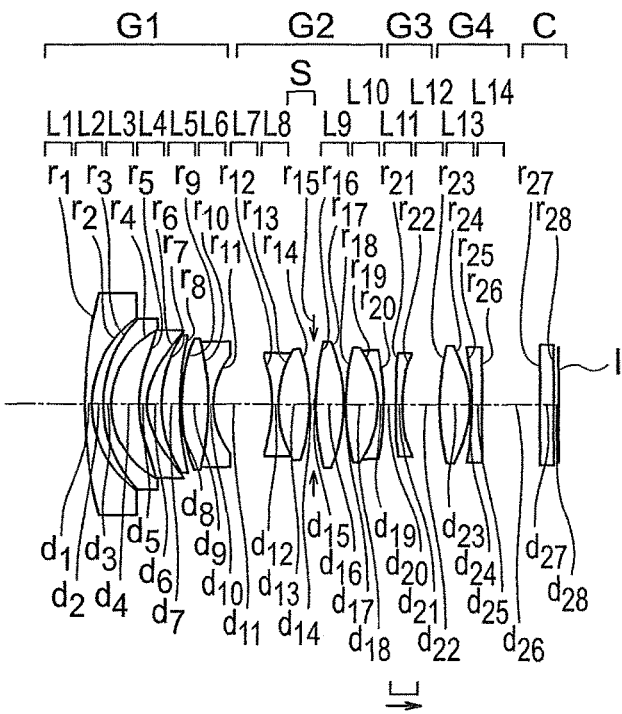
FIG. 2A is a sectional view of an imaging optical system of Example 2.
Figures 2B, 2C, 2D, 2E:
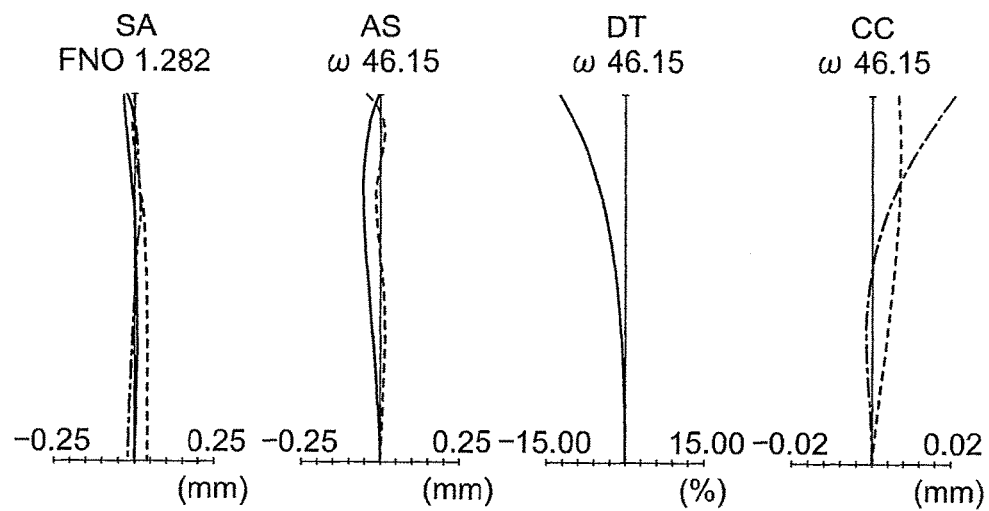
FIG. 2B, FIG. 2C, FIG. 2D, and FIG. 2E are aberration diagrams.

The imaging optical system according to Example 2 will be described. FIG. 2A is a lens sectional view of the imaging optical system according to Example 2. FIG. 2B, FIG. 2C, FIG. 2D, and FIG. 2E are aberration diagrams of the imaging optical system according to Example 2.

The imaging optical system according to Example 2 includes, as illustrated in FIG. 2A, in order from the object side, a first lens unit G1 having a negative refractive power, a second lens unit G2 having a positive refractive power, a third lens unit G3 having a negative refractive power, and a fourth lens unit G4 having a positive refractive power. The second lens unit G2 includes an aperture stop S.

The first lens unit G1 includes a negative meniscus lens L1 having a convex surface facing toward the object side, a negative meniscus lens L2 having a convex surface facing toward the object side, a negative meniscus lens L3 having a convex surface facing toward the object side, a positive meniscus lens L4 having a convex surface facing toward the object side, a biconvex positive lens L5, and a biconcave negative lens L6. Here, the biconvex positive lens L5 and the biconcave negative lens L6 are cemented together.

The second lens unit G2 includes a biconcave negative lens L7, a biconvex positive lens L8, a biconvex positive lens L9, a biconvex positive lens L10, and a negative meniscus lens L11 having a convex surface facing toward the image side, Here, the biconcave negative lens L7 and the biconvex positive lens L8 are cemented together. The biconvex positive lens L10 and the negative meniscus lens L11 are cemented together.

The third lens unit G3 includes a negative meniscus lens L12 having a convex surface facing toward the object side.

The fourth lens unit G4 includes a biconvex positive lens L13 and a negative meniscus lens L14 having a convex surface facing toward the image side.

Here, the first lens unit G1 is the predetermined lens unit. Furthermore, the biconvex positive lens L5 and the biconcave negative lens L6 constitute the first cemented lens. Furthermore, the biconcave negative lens L7 and the biconvex positive lens L8 constitute the second cemented lens. Furthermore, the biconvex positive lens L10 and the negative meniscus lens L11 constitute the third cemented lens.

Furthermore, at a time of focusing from an object at infinity to an object at a close distance, the negative meniscus lens L12 moves toward the image side along the optical axis.

Aspheric surfaces are provided on six surfaces in total, namely, both surfaces of the negative meniscus lens L3, both surfaces of the negative meniscus lens L12, and both surfaces of the biconvex positive lens L13.

The imaging optical system according to Example 3 will be described. FIG. 3A is a lens sectional view of the imaging optical system according to Example 3. FIG. 3B, FIG. 3C, FIG. 3D, and FIG. 3E are aberration diagrams of the imaging optical system according to Example 3.

The imaging optical system according to Example 3 includes, as illustrated in FIG. 3A, in order from the object side, a first lens unit G1 having a negative refractive power, a second lens unit G2 having a positive refractive power, a third lens unit G3 having a negative refractive power, and a fourth lens unit G4 having a positive refractive power. The second lens unit G2 includes an aperture stop S.

The first lens unit G1 includes a negative meniscus lens L1 having a convex surface facing toward the object side, a negative meniscus lens L2 having a convex surface facing toward the object side, a biconvex positive lens L3, and a biconcave negative lens L4. Here, the biconvex positive lens L3 and the biconcave negative lens L4 are cemented together.

The second lens unit G2 includes a biconcave negative lens L5, a biconvex positive lens L6, a biconvex positive lens L7, a biconvex positive lens L8, and a biconcave negative lens L9. Here, the biconcave negative lens L5 and the biconvex positive lens L6 are cemented together. The biconvex positive lens L8 and the biconcave negative lens L9 are cemented together.

The third lens unit G3 includes a negative meniscus lens L10 having a convex surface facing toward the object side.

The fourth lens unit G4 includes a biconvex positive lens L11 and a negative meniscus lens L12 having a convex surface facing toward the image side.

Here, the first lens unit G1 the predetermined lens unit. Furthermore, the biconvex positive lens L3 and the biconcave negative lens L4 constitute the first cemented lens. Furthermore, the biconcave negative lens L5 and the biconvex positive lens L6 constitute the second cemented lens. Furthermore, the biconvex positive lens L8 and the biconcave negative lens L9 constitute the third cemented lens.

Furthermore, at a time of focusing from an object at infinity to an object at a close distance, the negative meniscus lens L10 moves toward the image side along the optical axis.

Aspheric surfaces are provided on six surfaces in total, namely, both surfaces of the negative meniscus lens L2, both surfaces of the negative meniscus lens L10, and both surfaces of the biconvex positive lens L11.

The imaging optical system according to Example 4 will be described. FIG. 4A is a lens sectional view of the imaging optical system according to Example 4. FIG. 4B, FIG. 4C, FIG. 4D, and FIG. 4E are aberration diagrams of the imaging optical system according to Example 4.

The imaging optical system according to Example 4 includes, as illustrated in FIG. 4A, in order from the object side, a first lens unit G1 having a negative refractive power, a second lens unit G2 having a positive refractive power, a third lens unit G3 having a negative refractive power, and a fourth lens unit G4 having a positive refractive power. The second lens unit G2 includes an aperture stop S.

The first lens unit G1 includes a negative meniscus lens L1 having a convex surface facing toward the object side, a negative meniscus lens L2 having a convex surface facing toward the object side, a negative meniscus lens L3 having a convex surface facing toward the object side, a positive meniscus lens L4 having a convex surface facing toward the object side, a biconvex positive lens L5, and a biconcave negative lens L6. Here, the biconvex positive lens L5 and the biconcave negative lens L6 are cemented together.

The second lens unit G2 includes a biconcave negative lens L7, a biconvex positive lens L8, a biconvex positive lens L9, a biconvex positive lens L10, and a negative meniscus lens L11 having a convex surface facing toward the image side. Here, the biconcave negative lens L7 and the biconvex positive lens L8 are cemented together. The biconvex positive lens L10 and the negative meniscus lens L11 are cemented together.

The third lens unit G3 includes a biconcave negative lens L12.

The fourth lens unit G4 includes a biconvex positive lens L13 and a negative meniscus lens L14 having a convex surface facing toward the image side.

Here, the first lens unit G1 is the predetermined lens unit. Furthermore, the biconvex positive lens L5 and the biconcave negative lens L6 constitute the first cemented lens. Furthermore, the biconcave negative lens L7 and the biconvex positive lens L8 constitute the second cemented lens. Furthermore, the biconvex positive lens L10 and the negative meniscus lens L11 constitute the third cemented lens.

Furthermore, at a time of focusing from an object at infinity to an object at a close distance, the biconcave negative lens L12 moves toward the image side along the optical axis.

Aspheric surfaces are provided on six surfaces in total, namely, both surfaces of the negative meniscus lens L3, both surfaces of the biconcave negative lens L12, and both surfaces of the biconvex positive lens L13.

The imaging optical system according to Example 5 will be described. FIG. 5A is a lens sectional view of the imaging optical system according to Example 5. FIG. 5B, FIG. 5C, FIG. 5D, and FIG. 5E are aberration diagrams of the imaging optical system according to Example 5.

The imaging optical system according to Example 5 includes, as illustrated in FIG. 5A, in order from the object side, a first lens unit G1 having a negative refractive power, a second lens unit G2 having a positive refractive power, a third lens unit G3 having a negative refractive power, and a fourth lens unit G4 having a positive refractive power. The second lens unit G2 includes an aperture stop S.

The first lens unit G1 includes a negative meniscus lens L1 having a convex surface facing toward the object side, a negative meniscus lens L2 having a convex surface facing toward the object side, a negative meniscus lens L3 having a convex surface facing toward the object side, a biconvex positive lens L4, and a biconcave negative lens L5. Here, the negative meniscus lens L3, the biconvex positive lens L4, and the biconcave negative lens L5 are cemented together.

The second lens unit G2 includes a biconcave negative lens L6, a biconvex positive lens L7, a biconvex positive lens L8, a biconvex positive lens L9, and a negative meniscus lens L10 having a convex surface facing toward the image side. Here, the biconcave negative lens L6 and the biconvex positive lens L7 are cemented together. Furthermore, the biconvex positive lens L9 and the negative meniscus lens L10 are cemented together.

The third lens unit G3 includes a negative meniscus lens L11 having a convex surface facing toward the object side.

The fourth lens unit G4 includes a biconvex positive lens L12 and a negative meniscus lens L13 having a convex surface facing toward the image side.

Here, the first lens unit G1 is the predetermined lens unit. Furthermore, the negative meniscus lens L3, the biconvex positive lens L4, and the biconcave negative lens L5 constitute the first cemented lens. Furthermore, the biconcave negative lens L6 and the biconvex positive lens L7 constitute the second cemented lens. Furthermore, the biconvex positive lens L9 and the negative meniscus lens L10 constitute the third cemented lens.

Furthermore, at a time of focusing from an object at infinity to an object at a close distance, the negative meniscus lens L11 moves toward the image side along the optical axis.

Aspheric surfaces are provided on five surfaces in total, namely, the image-side surface of the negative meniscus lens L1, both surfaces of the negative meniscus lens L11, and both surfaces of the biconvex positive lens L12.

The imaging optical system according to Example 6 will be described. FIG. 6A is a lens sectional view of the imaging optical system according to Example 6. FIG. 6B, FIG. 6C, FIG. 6D, and FIG. 6E are aberration diagrams of the imaging optical system according to Example 6.

The imaging optical system according to Example 6 includes, as illustrated in FIG. 6A, in order from the object side, a first lens unit G1 having a negative refractive power, a second lens unit G2 having a positive refractive power, a third lens unit G3 having a negative refractive power, and a fourth lens unit G4 having a positive refractive power. The second lens unit G2 includes an aperture stop S.

The first lens unit G1 includes a negative meniscus lens L1 having a convex surface facing toward the object side, a negative meniscus lens L2 having a convex surface facing toward the object side, a biconvex positive lens L3, and a biconcave negative lens L4. Here, the biconvex positive lens L3 and the biconcave negative L4 are cemented together.

The second lens unit G2 includes a biconcave negative lens L5, a biconvex positive lens L6, a biconvex positive lens L7, a biconvex positive lens L8, and a biconcave negative lens L9. Here, the biconcave negative lens L5 and the biconvex positive lens L6 are cemented together. Furthermore, the biconvex positive lens L8 and the biconcave negative lens L9 are cemented together.

The third lens unit G3 includes a negative meniscus lens L10 having a convex surface facing toward the object side.

The fourth lens unit G4 includes a biconvex positive lens L11 and a negative meniscus lens L12 having a convex surface facing toward the image side.

Here, the first lens unit G1 is the predetermined lens unit. Furthermore, the biconvex positive lens L3 and the biconcave negative L4 constitute the first cemented lens. Furthermore, the biconcave negative lens L5 and the biconvex positive lens L6 constitute the second cemented lens. Furthermore, the biconvex positive lens L8 and the biconcave negative lens L9 constitute the third cemented lens.

Furthermore, at a time of focusing from an object at infinity to an object at a close distance, the negative meniscus lens L10 moves toward the image side along the optical axis.

Aspheric surfaces are provided on six surfaces in total, namely, both surfaces of the negative meniscus lens L2, both surfaces of the negative meniscus lens L10, and both surfaces of the biconvex positive lens L11.

Figure 7A:
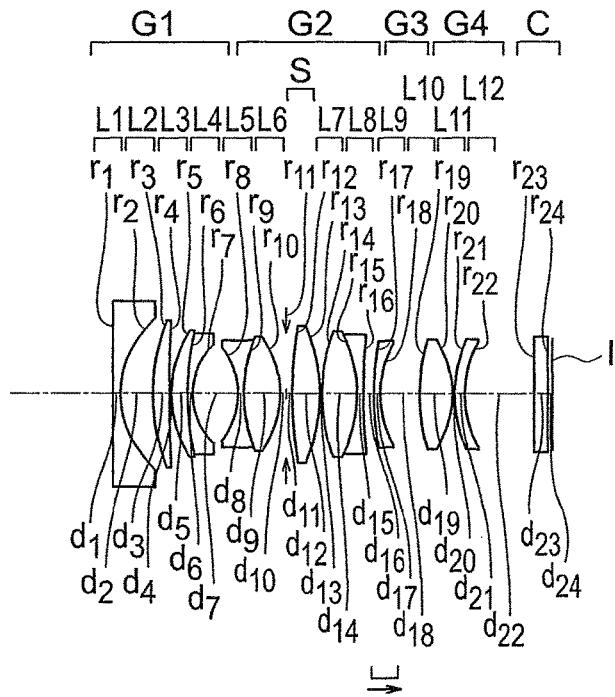
FIG. 7A is a sectional view of an imaging optical system of Example 7.
Figures 7B, 7C, 7D, 7E:
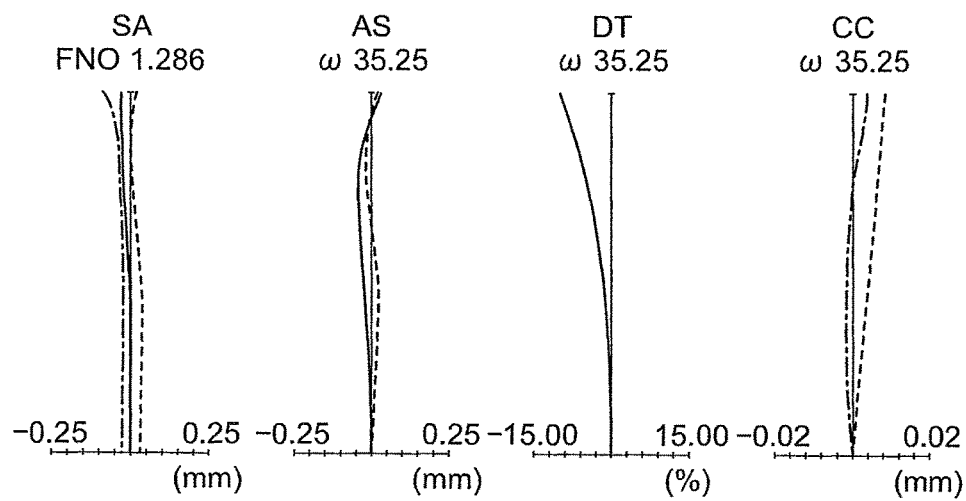
FIG. 7B, FIG. 7C, FIG. 7D, and FIG. 7E are aberration diagrams.

The imaging optical system according to Example 7 will be described. FIG. 7A is a lens sectional view of the imaging optical system according to Example 7. FIG. 7B, FIG. 7C, FIG. 7D, and FIG. 7E are aberration diagrams of the imaging optical system according to Example 7.

The imaging optical system according to Example 7 includes, as illustrated in FIG. 7A, in order from the object side, a first lens unit G1 having a negative refractive power, a second lens unit G2 having a positive refractive power, a third lens unit G3 having a negative refractive power, and a fourth lens unit G4 having a positive refractive power. The second lens unit G2 includes an aperture stop S.

The first lens unit G1 includes a negative meniscus lens L1 having a convex surface facing toward the object side, a positive meniscus lens L2 having a convex surface facing toward the object side, a positive meniscus lens L3 having a convex surface facing toward the object side, and a negative meniscus lens L4 having a convex surface facing toward the object side. Here, the positive meniscus lens L3 and the negative meniscus lens L4 are cemented together.

The second lens unit G2 includes a biconcave negative lens L5, a biconvex positive lens L6, a biconvex positive lens L7, a biconvex positive lens L8, and a biconcave negative lens L9. Here, the biconcave negative lens L5 and the biconvex positive lens L6 are cemented together. Furthermore, the biconvex positive lens L8 and the biconcave negative lens L9 are cemented together.

The third lens unit G3 includes a negative meniscus lens L10 having a convex surface facing toward the object side, The fourth lens unit G4 includes a biconvex positive lens L11 and a negative meniscus lens L12 having a convex surface facing toward the object side.

Here, the first lens unit G1 is the predetermined lens unit. Furthermore, the positive meniscus lens L3 and the negative meniscus lens L4 constitute the first cemented lens. Furthermore, the biconcave negative lens L5 and the biconvex positive lens L6 constitute the second cemented lens. Furthermore, the biconvex positive lens L8 and the biconcave negative lens L9 constitute the third cemented lens.

Furthermore, at a time of focusing from an object at infinity to an object at a close distance, the negative meniscus lens L10 moves toward the image side along the optical axis.

Aspheric surfaces are provided on four surfaces, in total namely, the image-side surface of the negative meniscus lens L1, both surfaces of the negative meniscus lens L10, and the object-side surface of the biconvex positive lens L11.

The imaging optical system according to Example 8 will be described. FIG. 8A is a lens sectional view of the imaging optical system according to Example 8. FIG. 8B, FIG. 8C, FIG. 8D, and FIG. 8E are aberration diagrams of the imaging optical system according to Example 8.

The imaging optical system according to Example 8 includes, as illustrated in FIG. 8A, in order from the object side, a first lens unit G1 having a negative refractive power, a second lens unit G2 having a positive refractive power, a third lens unit G3 having a negative refractive power, and a fourth lens unit G4 having a positive refractive power. The second lens unit G2 includes an aperture stop S.

The front unit GF includes a negative meniscus lens L1 having a convex surface facing toward the object side, a negative meniscus lens L2 having a convex surface facing toward the object side, a biconvex positive lens L3, and a biconcave negative lens L4. Here, the biconvex positive lens L3 and the biconcave negative lens L4 are cemented together.

The second lens unit G2 includes a biconcave negative lens L5, a biconvex positive lens L6, a biconvex positive lens L7, a biconvex positive lens L8, and a biconcave negative lens L9. Here, the biconcave negative lens L5 and the biconvex positive lens L6 are cemented together. Furthermore, the biconvex positive lens L8 and the biconcave negative lens L9 are cemented together.

The third lens unit G3 includes a negative meniscus lens L10 having a convex surface facing toward the object side, The fourth lens unit G4 includes a biconvex positive lens L11 and a negative meniscus lens L12 having a convex surface facing toward the object side.

Here, the first lens unit G1 is the predetermined lens unit. Furthermore, the biconvex positive lens L3 and the biconcave negative lens L4 constitute the first cemented lens. Furthermore, the biconcave negative lens L5 and the biconvex positive lens L6 constitute the second cemented lens. Furthermore, the biconvex positive lens L8 and the biconcave negative lens L9 constitute the third cemented lens.

Furthermore, at a time of focusing from an object at infinity to an object at a close distance, the negative meniscus lens L10 moves toward the image side along the optical axis.

Aspheric surfaces are provided on six surfaces in total, namely, both surfaces of the negative meniscus lens L2, both surfaces of the negative meniscus lens L10, and both surfaces of the biconvex positive lens L11.

Figure 9A:
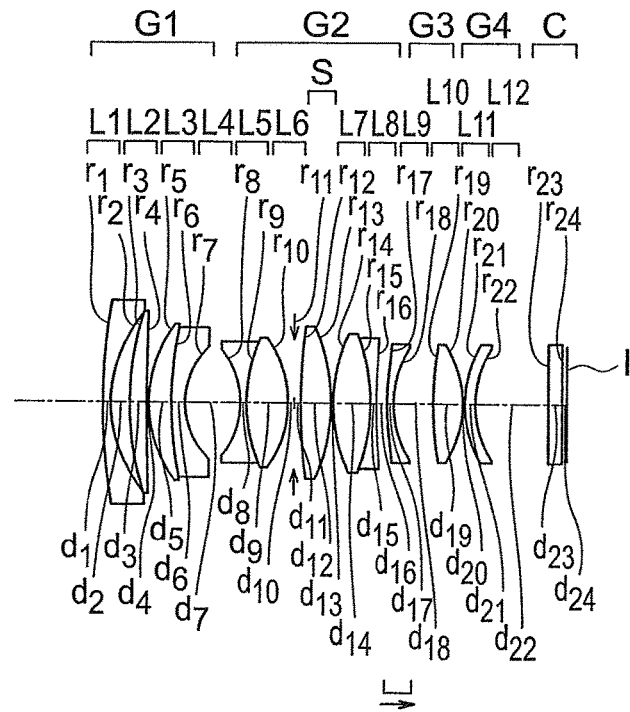
FIG. 9A is a sectional view of an imaging optical system of Example 9.
Figures 9B, 9C, 9D, 9E:
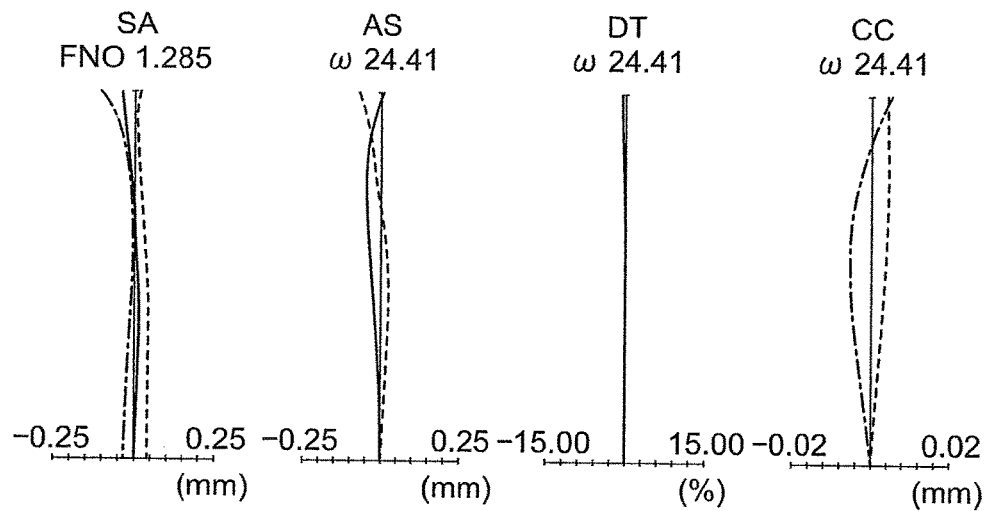
FIG. 9B, FIG. 9C, FIG. 9D, and FIG. 9E are aberration diagrams.

The imaging optical system according to Example 9 will be described. FIG. 9A is a lens sectional view of the imaging optical system according to Example 9. FIG. 9B, FIG. 9C, FIG. 9D, and FIG. 9E are aberration diagrams of the imaging optical system according to Example 9.

The imaging optical system according to Example 9 includes, as illustrated in FIG. 9A, in order from the object side, a first lens unit G1 having a negative refractive power, a second lens unit G2 having a positive refractive power, a third lens unit G3 having a negative refractive power, and a fourth lens unit G4 having a positive refractive power. The second lens unit G2 includes an aperture stop S.

The first lens unit G1 includes a negative meniscus lens L1 having a convex surface facing toward the object side, a positive meniscus lens L2 having a convex surface facing toward the object side, a positive meniscus lens L3 having a convex surface facing toward the object side, and a negative meniscus lens L4 having a convex surface facing toward the object side. Here, the positive meniscus lens L3 and the negative meniscus lens L4 are cemented together.

The second lens unit G2 includes a biconcave negative lens L5, a biconvex positive lens L6, a biconvex positive lens L7, a biconvex positive lens L8, a biconcave negative lens L9. Here, the biconcave negative lens L5 and the biconvex positive lens L6 are cemented together. Furthermore, the biconvex positive lens L8 and the biconcave negative lens L9 are cemented together.

The third lens unit G3 includes a negative meniscus lens L10 having a convex surface facing toward the object side, The fourth lens unit G4 includes a biconvex positive lens L11 and a negative meniscus lens L12 having a convex surface facing toward the object side.

Here, the first lens unit G1 is the predetermined lens unit. Furthermore, the positive meniscus lens L3 and the negative meniscus lens L4 constitute the first cemented lens. Furthermore, the biconcave negative lens L5 and the biconvex positive lens L6 constitute the second cemented lens. Furthermore, the biconvex positive lens L8 and the biconcave negative lens L9 constitute the third cemented lens.

Furthermore, at a time of focusing from an object at infinity to an object at a close distance, the negative meniscus lens L10 moves toward the image side along the optical axis.

Aspheric surfaces are provided on five surfaces in total, namely, the image-side surface of the negative meniscus lens L1, both surfaces of the negative meniscus lens L10, and both surfaces of the biconvex positive lens L11.

Figure 10A:
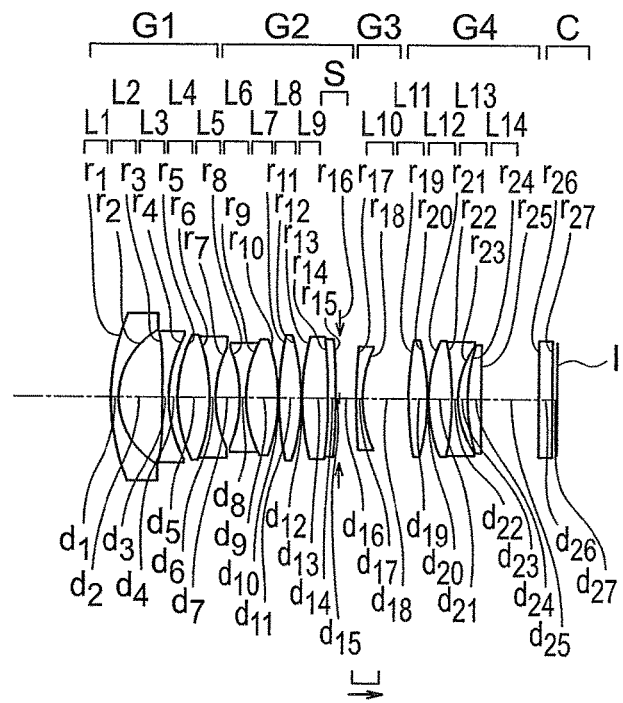
FIG. 10A is a sectional view of an imaging optical system of Example 10.
Figures 10B, 10C, 10D, 10E:
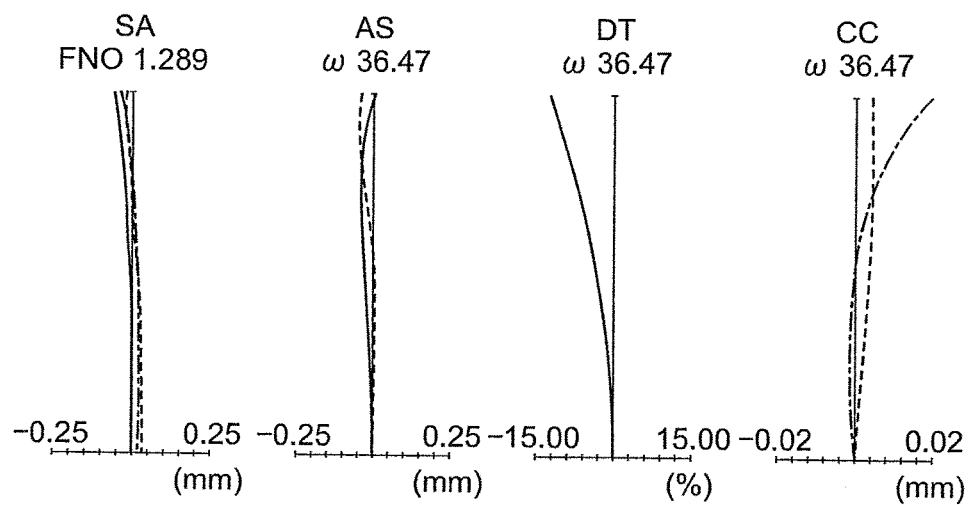
FIG. 10B, FIG. 10C, FIG. 10D, and FIG. 10E are aberration diagrams.

The imaging optical system according to Example 10 will be described. FIG. 10A is a lens sectional view of the imaging optical system according to Example 10. FIG. 10B, FIG. 10C, FIG. 10D, and FIG. 10E are aberration diagrams of the imaging optical system according to Example 10.

The imaging optical system according to Example 10 includes, as illustrated in FIG. 10A, in order from the object side, a first lens unit G1 having a negative refractive power, a second lens unit G2 having a positive refractive power, a third lens unit G3 having a negative refractive power, and a fourth lens unit G4 having a positive refractive power. The second lens unit G2 includes an aperture stop S.

The first lens unit G1 includes a negative meniscus lens L1 having a convex surface facing toward the object side, a biconcave negative lens L2, a biconvex positive lens L3, and a biconcave negative lens L4. Here, the biconvex positive lens L3 and the biconcave negative lens L4 are cemented together.

The second lens unit G2 includes a biconcave negative lens L5, a biconvex positive lens L6, a biconvex positive lens L7, a biconvex positive lens L8, a negative meniscus lens L9 having a convex surface facing toward the image side. Here, the biconcave negative lens L5 and the biconvex positive lens L6 are cemented together. Furthermore, the biconvex positive lens L8 and the negative meniscus lens L9 are cemented together.

The third lens unit G3 includes a negative meniscus lens L10 having a convex surface facing toward the object side, The fourth lens unit G4 includes a biconvex positive lens L11, a biconvex positive lens L12, a biconcave negative lens L13, and a positive meniscus lens L14 having a convex surface facing toward the object side. Here, the biconvex positive lens L12 and the biconcave negative lens L13 are cemented together.

Here, the first lens unit G1 is the predetermined lens unit. Furthermore, the biconvex positive lens L3 and the biconcave negative lens L4 constitute the first cemented lens. Furthermore, the biconcave negative lens L5 and the biconvex positive lens L6 constitute the second cemented lens. Furthermore, the biconvex positive lens L8 and the negative meniscus lens L9 constitute the third cemented lens.

Furthermore, at a time of focusing from an object at infinity to an object at a close distance, the negative meniscus lens L10 moves toward the image side along the optical axis.

Aspheric surfaces are provided on four surfaces in total, namely, both surfaces of the biconcave negative lens L2 and both surfaces of the negative meniscus lens L10.

Figure 11A:
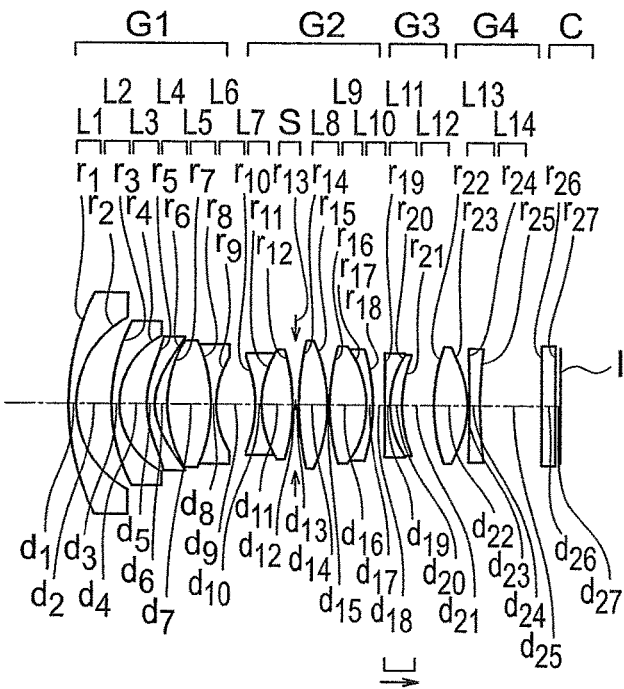
FIG. 11A is a sectional view of an imaging optical system of Example 11.
Figures 11B, 11C, 11D, 11E:
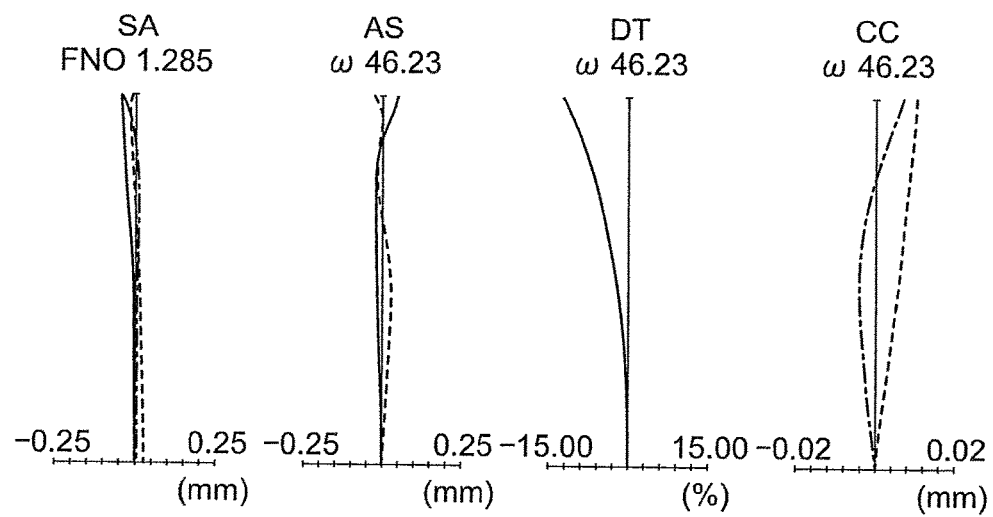
FIG. 11B, FIG. 11C, FIG. 11D, and FIG. 11E are aberration diagrams.

The imaging optical system according to Example 11 will be described. FIG. 11A is a lens sectional view of the imaging optical system according to Example 11. FIG. 11B, FIG. 11C, FIG. 11D, and FIG. 11E are aberration diagrams of the imaging optical system according to Example 11.

The imaging optical system according to Example 11 includes, as illustrated in FIG. 11A, in order from the object side, a first lens unit G1 having a negative refractive power, a second lens unit G2 having a positive refractive power, a third lens unit G3 having a negative refractive power, and a fourth lens unit G4 having a positive refractive power. The second lens unit G2 includes an aperture stop S.

The first lens unit G1 includes a negative meniscus lens L1 having a convex surface facing toward the object side, a negative meniscus lens L2 having a convex surface facing toward the object side, a negative meniscus lens L3 having a convex surface facing toward the object side, a biconvex positive lens L4, and a biconcave negative lens L5. Here, the biconvex positive lens L4 and the biconcave negative lens L5 are cemented together.

The second lens unit G2 includes a biconcave negative lens L6, a biconvex positive lens L7, a biconvex positive lens L8, a biconvex positive lens L9, a negative meniscus lens L10 having a convex surface facing toward the image side. Here, the biconcave negative lens L6 and the biconvex positive lens L7 are cemented together. The biconvex positive lens L9 and the negative meniscus lens L10 are cemented together.

The third lens unit G3 includes a negative meniscus lens L11 having a convex surface facing toward the object side and a positive meniscus lens L12 having a convex surface facing toward the object side. Here, the negative meniscus lens L11 and the positive meniscus lens L12 are cemented together.

The fourth lens unit G4 includes a biconvex positive lens L13 and a biconcave negative lens L14.

Here, the first lens unit G1 is the predetermined lens unit. Furthermore, the biconvex positive lens L4 and the biconcave negative lens L5 constitute the first cemented lens. Furthermore, the biconcave negative lens L6 and the biconvex positive lens L7 constitute the second cemented lens. Furthermore, the biconvex positive lens L9 and the negative meniscus lens L10 constitute the third cemented lens.

Furthermore, at a time of focusing from an object at infinity to an object at a close distance, the negative meniscus lens L11 and the positive meniscus lens L12 move toward the image side along the optical axis.

Aspheric surfaces are provided on five surfaces in total, namely, both surfaces of the negative meniscus lens L3, the object-side surface of the negative meniscus lens L11, and both surfaces of the biconvex positive lens L13.

Figure 12A:
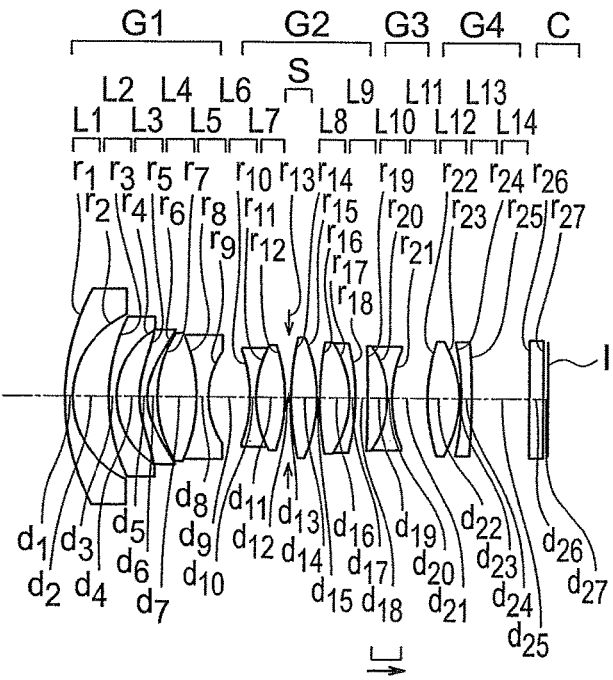
FIG. 12A is a sectional view of an imaging optical system of Example 12.
Figures 12B, 12C, 12D, 12E:
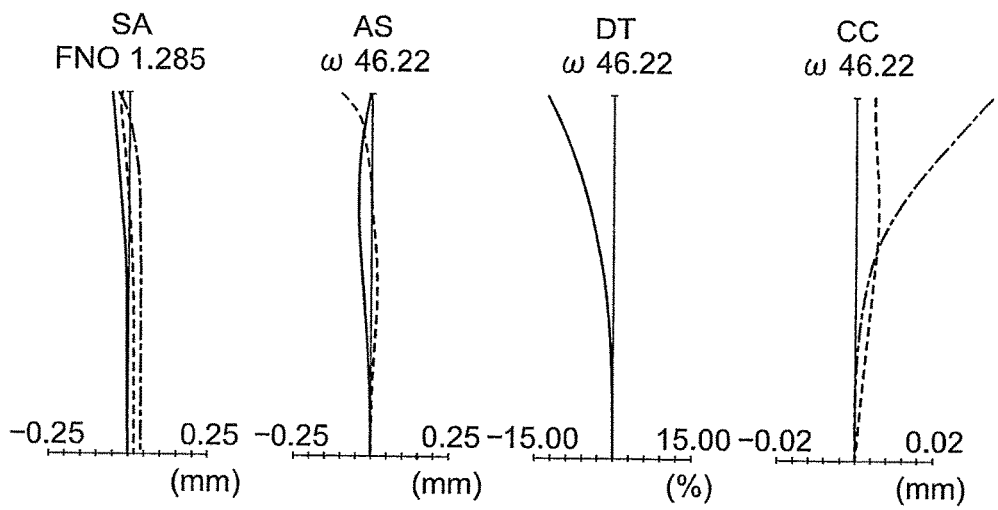
FIG. 12B, FIG. 12C, FIG. 12D, and FIG. 12E are aberration diagrams.

The imaging optical system according to Example 12 will be described. FIG. 12A is a lens sectional view of the imaging optical system according to Example 12, FIG. 12B, FIG. 12C, FIG. 12D, and FIG. 12E are aberration diagrams of the imaging optical system according to Example 12.

The imaging optical system according to Example 12 includes, as illustrated in FIG. 12A, in order from the object side, a first lens unit G1 having a negative refractive power, a second lens unit G2 having a positive refractive power, a third lens unit G3 having a negative refractive power, and a fourth lens unit G4 having a positive refractive power. The second lens unit G2 includes an aperture stop S.

The first lens unit G1 includes a negative meniscus lens L1 having a convex surface facing toward the object side, a negative meniscus lens L2 having a convex surface facing toward the object side, a negative meniscus lens L3 having a convex surface facing toward the object side, a biconvex positive lens L4, and a biconcave negative lens L5. Here, the biconvex positive lens L4 and the biconcave negative lens L5 are cemented together.

The second lens unit G2 includes a biconcave negative lens L6, a biconvex positive lens L7, a biconvex positive lens L8, a biconvex positive lens L9, a negative meniscus lens L10 having a convex surface facing toward the image side. Here, the biconcave negative lens L6 and the biconvex positive lens L7 are cemented together. The biconvex positive lens L9 and the negative meniscus lens L10 are cemented together.

The third lens unit G3 includes a positive meniscus lens L11 having a convex surface facing toward the image side and a biconcave negative lens L12. Here, the positive meniscus lens L11 and the biconcave negative lens L12 are cemented together.

The fourth lens unit G4 includes a biconvex positive lens L13 and a negative meniscus lens L14 having a convex surface facing toward the image side.

Here, the first lens unit G1 is the predetermined lens unit. Furthermore, the biconvex positive lens L4 and the biconcave negative lens L5 constitute the first cemented lens. Furthermore, the biconcave negative lens L6 and the biconvex positive lens L7 constitute the second cemented lens. Furthermore, the biconvex positive lens L9 and the negative meniscus lens L10 constitute the third cemented lens.

Furthermore, at a time of focusing from an object at infinity to an object at a close distance, the positive meniscus lens L11 and the biconcave negative lens L12 move toward the image side along the optical axis.

Aspheric surfaces are provided on five surfaces in total, namely, both surfaces of the negative meniscus lens L3, the image-side surface of the biconcave negative lens L12, and both surfaces of the biconvex positive lens L13.

Figure 13A:
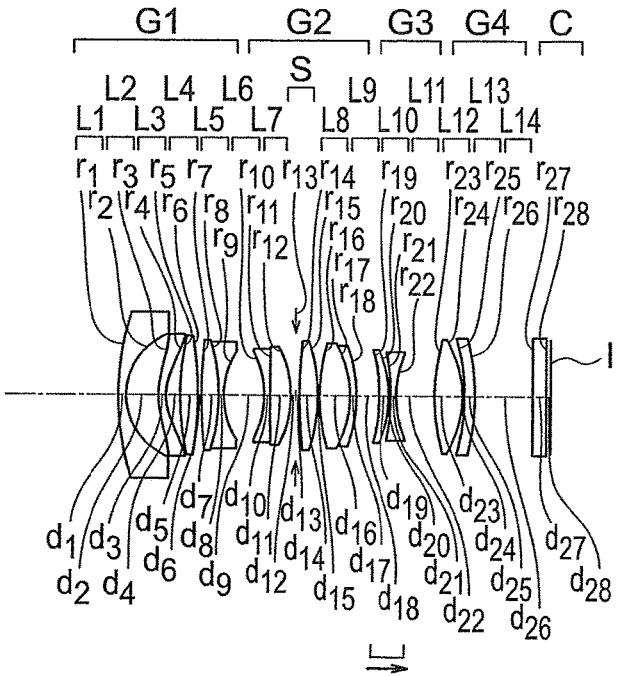
FIG. 13A is a sectional view of an imaging optical system of Example 13.
Figures 13B, 13C, 13D, 13E:
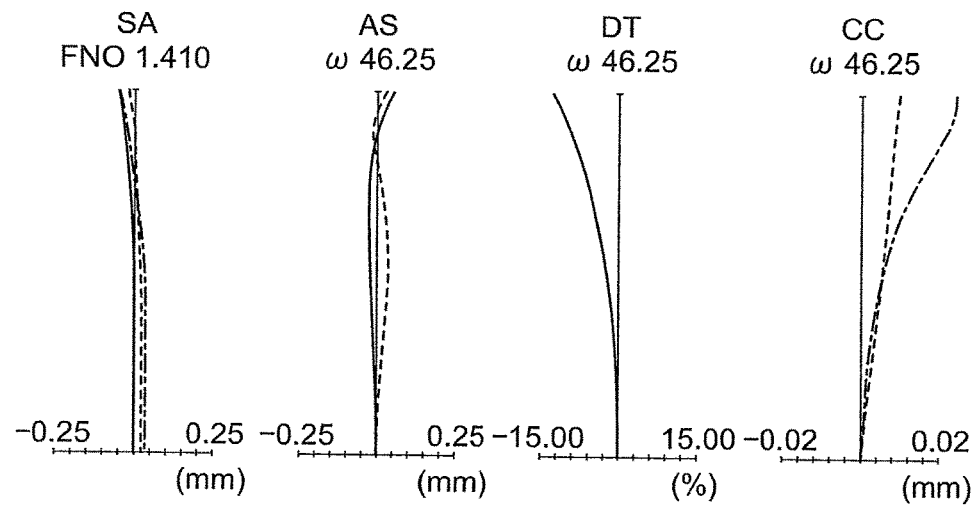
FIG. 13B, FIG. 13C, FIG. 13D, and FIG. 13E are aberration diagrams.

The imaging optical system according to Example 13 will be described. FIG. 13A is a lens sectional view of the imaging optical system according to Example 13. FIG. 13B, FIG. 13C, FIG. 13D, and FIG. 13E are aberration diagrams of the imaging optical system according to Example 13.

The imaging optical system according to Example 13 includes, as illustrated in FIG. 13A, in order from the object side, a first lens unit G1 having a negative refractive power, a second lens unit G2 having a positive refractive power, a third lens unit G3 having a negative refractive power, and a fourth lens unit G4 having a positive refractive power. The second lens unit G2 includes an aperture stop S.

The first lens unit G1 includes a negative meniscus lens L1 having a convex surface facing toward the object side, a negative meniscus lens L2 having a convex surface facing toward the object side, a biconvex positive lens L3, a biconvex positive lens L4, and a biconcave negative lens L5. Here, the biconvex positive lens L4 and the biconcave negative lens L5 are cemented together.

The second lens unit G2 includes a biconcave negative lens L6, a biconvex positive lens L7, a biconvex positive lens L8, a biconvex positive lens L9, and a negative meniscus lens L10 having a convex surface facing toward the image side. Here, the biconcave negative lens L6 and the biconvex positive lens L7 are cemented together. The biconvex positive lens L9 and the negative meniscus lens L10 are cemented together.

The third lens unit G3 includes a positive meniscus lens L11 having a convex surface facing toward the image side and a biconcave negative lens L12.

The fourth lens unit G4 includes a biconvex positive lens L13 and a negative meniscus lens L14 having a convex surface facing toward the image side.

Here, the first lens unit G1 is the predetermined lens unit. Furthermore, the biconvex positive lens L4 and the biconcave negative lens L5 constitute the first cemented lens. Furthermore, the biconcave negative lens L6 and the biconvex positive lens L7 constitute the second cemented lens. Furthermore, the biconvex positive lens L9 and the negative meniscus lens L10 constitute the third cemented lens.

Furthermore, at a time of focusing from an object at infinity to an object at a close distance, the positive meniscus lens L11 and the biconcave negative lens L12 move toward the image side along the optical axis.

Aspheric surfaces are provided on five surfaces in total, namely, both surfaces of the negative meniscus lens L2, the object-side surface of the positive meniscus lens L11, and both surfaces of the biconvex positive lens L13.

Figure 14A:
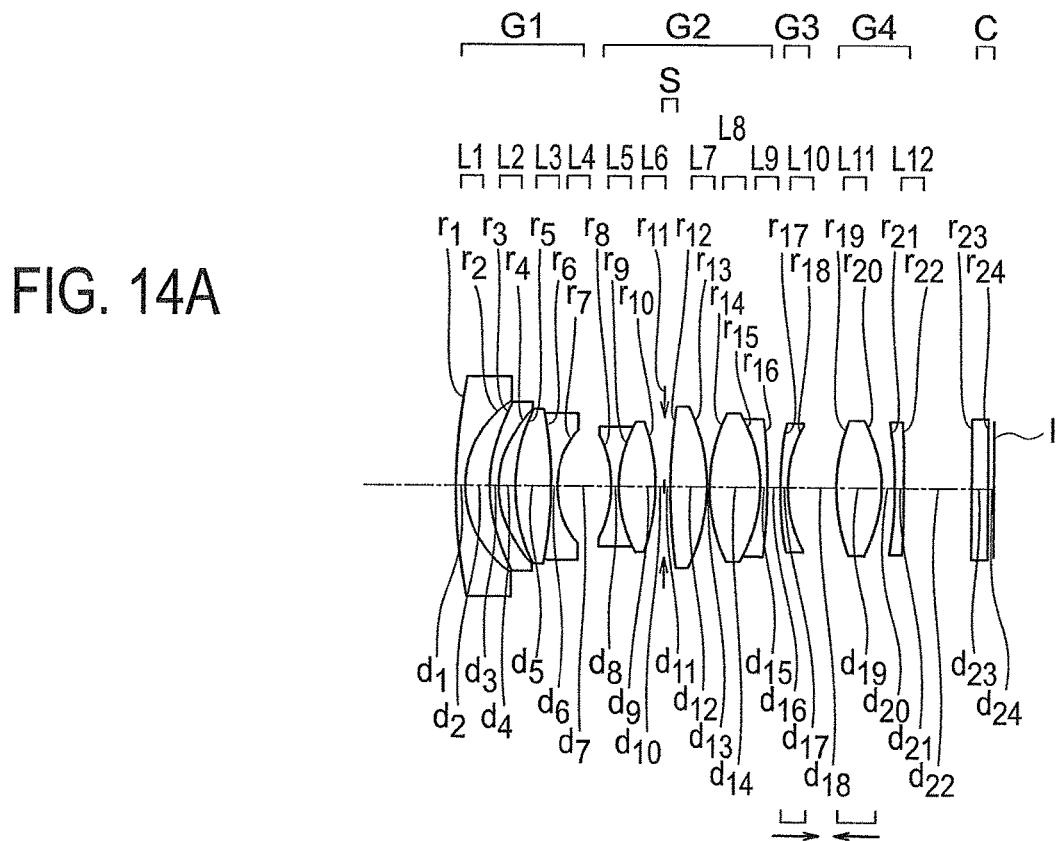
FIG. 14A is a sectional view of an imaging optical system of Example 14.
Figures 14B, 14C, 14D, 14E:
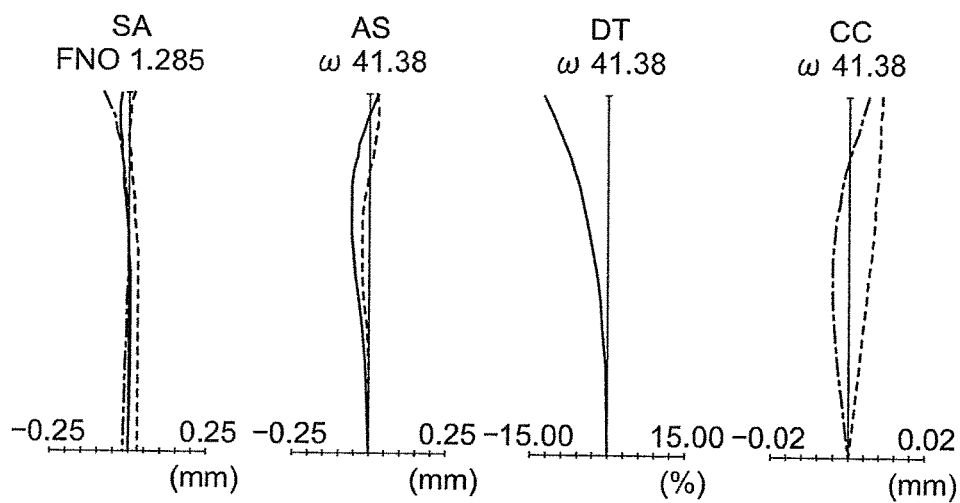
FIG. 14B, FIG. 14C, FIG. 14D, and FIG. 14E are aberration diagrams.

The imaging optical system according to Example 14 will be described. FIG. 14A is a lens sectional view of the imaging optical system according to Example 14. FIG. 14B, FIG. 14C, FIG. 14D, and FIG. 14E are aberration diagrams of the imaging optical system according to Example 14.

The imaging optical system according to Example 14 includes, as illustrated in FIG. 14A, in order from the object side, a first lens unit G1 having a negative refractive power, a second lens unit G2 having a positive refractive power, a third lens unit G3 having a negative refractive power, and a fourth lens unit G4 having a positive refractive power. The second lens unit G2 includes an aperture stop S.

The first lens unit G1 includes a negative meniscus lens L1 having a convex surface facing toward the object side, a negative meniscus lens L2 having a convex surface facing toward the object side, a biconvex positive lens L3, and a biconcave negative lens L4. Here, the biconvex positive lens L3 and the biconcave negative lens L4 are cemented together.

The second lens unit G2 includes a biconcave negative lens L5, a biconvex positive lens L6, a biconvex positive lens L7, a biconvex positive lens L8, a negative meniscus lens L9 having a convex surface facing toward the image side. Here, the biconcave negative lens L5 and the biconvex positive lens L6 are cemented together. The biconvex positive lens L8 and the negative meniscus lens L9 are cemented together.

The third lens unit G3 includes a negative meniscus lens L10 having a convex surface facing toward the object side, The fourth lens unit G4 includes a biconvex positive lens L11 and a negative meniscus lens L12 having a convex surface facing toward the image side.

Here, the first lens unit G1 is the predetermined lens unit. Furthermore, the biconvex positive lens L3 and the biconcave negative lens L4 constitute the first cemented lens. Furthermore, the biconcave negative lens L5 and the biconvex positive lens L6 constitute the second cemented lens. Furthermore, the biconvex positive lens L8 and the negative meniscus lens L9 constitute the third cemented lens.

Furthermore, at a time of focusing from an object at infinity to an object at a close distance, the negative meniscus lens L10 moves toward the image side along the optical axis, and the biconvex positive lens L11 moves toward the object side along the optical axis.

Aspheric surfaces are provided on six surfaces in total, namely, both surfaces of the negative meniscus lens L2, both surfaces of the negative meniscus lens L10, and both surfaces of the biconvex positive lens L11.

The imaging optical system according to Example 15 will be described. FIG. 15A is a lens sectional view of the imaging optical system according to Example 15. FIG. 15B, FIG. 15C, FIG. 15D, and FIG. 15E are aberration diagrams of the imaging optical system according to Example 15.

The imaging optical system according to Example 15 includes, as illustrated in FIG. 15A, in order from the object side, a first lens unit G1 having a negative refractive power, a second lens unit G2 having a positive refractive power, a third lens unit G3 having a negative refractive power, and a fourth lens unit G4 having a positive refractive power. The second lens unit G2 includes an aperture stop S.

The first lens unit G1 includes a negative meniscus lens L1 having a convex surface facing toward the object side, a negative meniscus lens L2 having a convex surface facing toward the object side, a negative meniscus lens L3 having a convex surface facing toward the object side, a biconvex positive lens L4, and a biconcave negative lens L5. Here, the biconvex positive lens L4 and the biconcave negative lens L5 are cemented together.

The rear unit GR includes a biconcave negative lens L6, a biconvex positive lens L7, a biconvex positive lens L8, a biconvex positive lens L9, and a negative meniscus lens L10 having a convex surface facing toward the image side. Here, the biconcave negative lens L6 and the biconvex positive lens L7 are cemented together. The biconvex positive lens L9 and the negative meniscus lens L10 are cemented together.

The third lens unit G3 includes a negative meniscus lens L11 having a convex surface facing toward the object side.

The fourth lens unit G4 includes a biconvex positive lens L12 and a biconcave negative lens L13.

Here, the first lens unit G1 is the predetermined lens unit. Furthermore, the biconvex positive lens L4 and the biconcave negative lens L5 constitute the first cemented lens. Furthermore, the biconcave negative lens L6 and the biconvex positive lens L7 constitute the second cemented lens. Furthermore, the biconvex positive lens L9 and the negative meniscus lens L10 constitute the third cemented lens.

Furthermore, at a time of focusing from an object at infinity to an object at a close distance, the negative meniscus lens L11 moves toward the image side along the optical axis, and the biconvex positive lens L12 moves toward the object side along the optical axis.

Aspheric surfaces are provided on six surfaces in total, namely, both surfaces of the negative meniscus lens L2, both surfaces of the negative meniscus lens L11, and both surfaces of the biconvex positive lens L12.

The imaging optical system according to Example 16 will be described. FIG. 16A is a lens sectional view of the imaging optical system according to Example 16, FIG. 16B, FIG. 16C, FIG. 16D, and FIG. 16E are aberration diagrams of the imaging optical system according to Example 16.

The imaging optical system according to Example 16 includes, as illustrated in FIG. 16A, in order from the object side, a first lens unit G1 having a negative refractive power, a second lens unit G2 having a positive refractive power, a third lens unit G3 having a negative refractive power, and a fourth lens unit G4 having a positive refractive power. The second lens unit G2 includes an aperture stop S.

The first lens unit G1 includes a negative meniscus lens L1 having a convex surface facing toward the object side, a negative meniscus lens L2 having a convex surface facing toward the object side, a biconvex positive lens L3, and a biconcave negative lens L4. Here, the biconvex positive lens L3 and the biconcave negative lens L4 are cemented together.

The second lens unit G2 includes a biconcave negative lens L5, a biconvex positive lens L6, a biconvex positive lens L7, a biconvex positive lens L8, and a negative meniscus lens L9 having a convex surface facing toward the image side. Here, the biconcave negative lens L5 and the biconvex positive lens L6 are cemented together. The biconvex positive lens L8 and the negative meniscus lens L9 are cemented together.

The third lens unit G3 includes a negative meniscus lens L10 having a convex surface facing toward the object side.

The fourth lens unit G4 includes a negative meniscus lens L11 having a convex surface facing toward the object side, a biconvex positive lens L12, and a negative meniscus lens L13 having a convex surface facing toward the image side. Here, the negative meniscus lens L11 and the biconvex positive lens L12 are cemented together.

Here, the first lens unit G1 is the predetermined lens unit. Furthermore, the biconvex positive lens L3 and the biconcave negative lens L4 constitute the first cemented lens. Furthermore, the biconcave negative lens L5 and the biconvex positive lens L6 constitute the second cemented lens.

Furthermore, the biconvex positive lens L8 and the negative meniscus lens L9 constitute the third cemented lens.

Furthermore, at a time of focusing from an object at infinity to an object at a close distance, the negative meniscus lens L10 moves toward the image side along the optical axis, and the negative meniscus lens L11 and the biconvex positive lens L12 move toward the object side along the optical axis.

Aspheric surfaces are provided on five surfaces in total, namely, both surfaces of the negative meniscus lens L2, both surfaces of the negative meniscus lens L10, and the object-side surface of the biconvex positive lens L12.

Figure 17A:
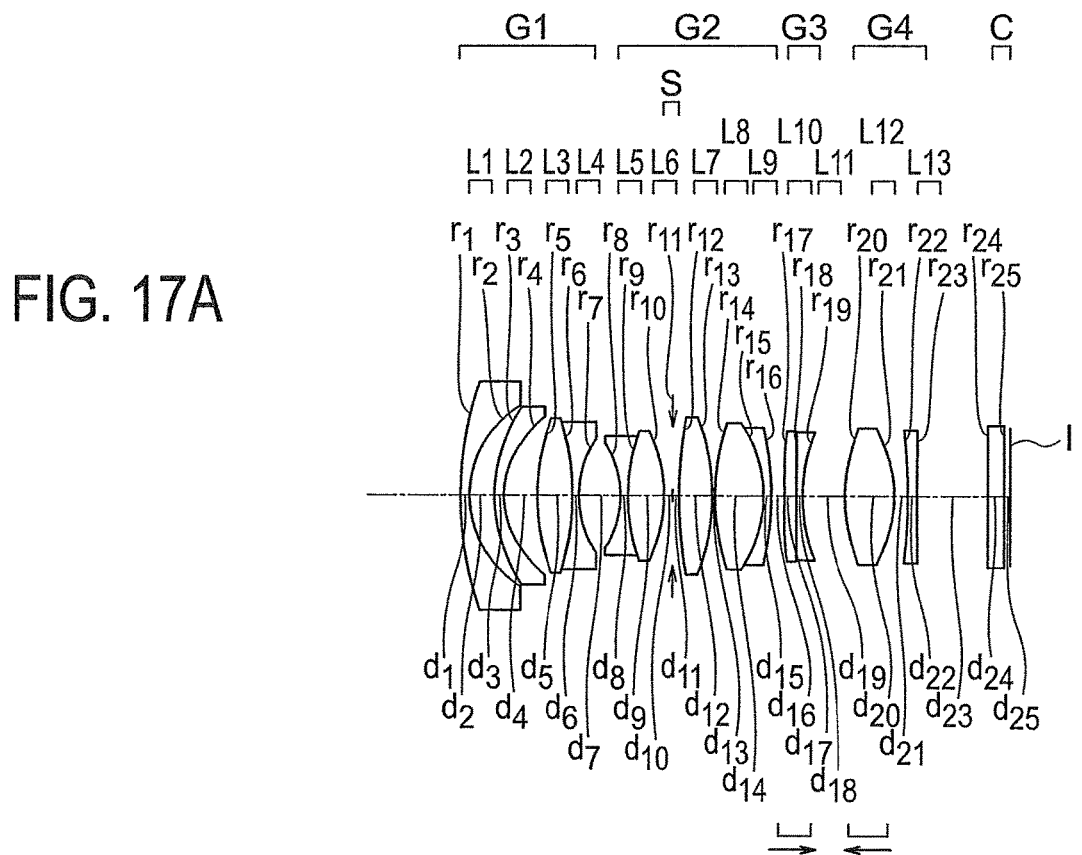
FIG. 17A is a sectional view of an imaging optical system of Example 17.
Figures 17B, 17C, 17D, 17E:
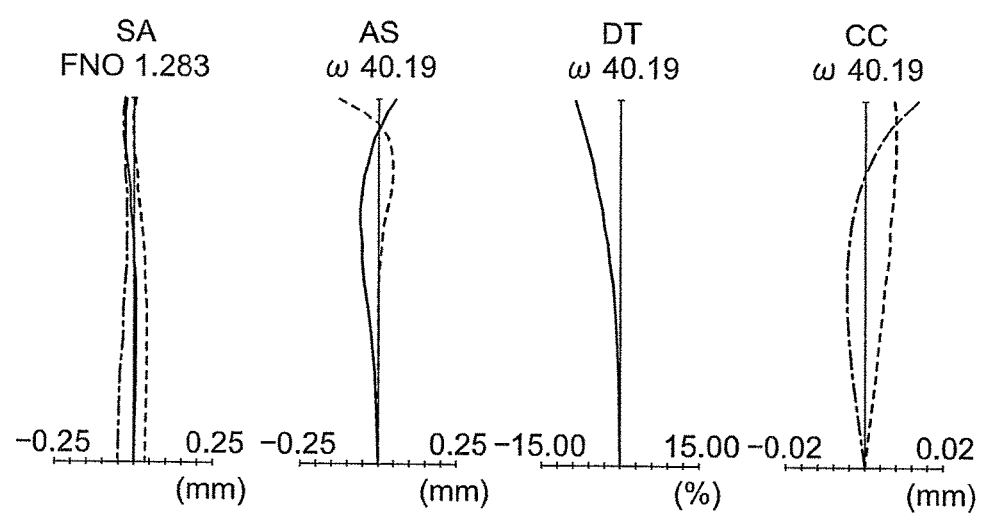
FIG. 17B, FIG. 17C, FIG. 17D, and FIG. 17E are aberration diagrams.

The imaging optical system according to Example 17 will be described. FIG. 17A is a lens sectional view of the imaging optical system according to Example 17. FIG. 17B, FIG. 17C, FIG. 17D, and FIG. 17E are aberration diagrams of the imaging optical system according to Example 17.

The imaging optical system according to Example 17 includes, as illustrated in FIG. 17A, in order from the object side, a first lens unit G1 having a negative refractive power, a second lens unit G2 having a positive refractive power, a third lens unit G3 having a negative refractive power, and a fourth lens unit G4 having a positive refractive power. The second lens unit G2 includes an aperture stop S.

The first lens unit G1 includes a negative meniscus lens L1 having a convex surface facing toward the object side, a negative meniscus lens L2 having a convex surface facing toward the object side, a biconvex positive lens L3, and a biconcave negative lens L4. Here, the biconvex positive lens L3 and the biconcave negative lens L4 are cemented together.

The second lens unit G2 includes a biconcave negative lens L5, a biconvex positive lens L6, a biconvex positive lens L7, a biconvex positive lens L8, and a negative meniscus lens L9 having a convex surface facing toward the image side. Here, the biconcave negative lens L5 and the biconvex positive lens L6 are cemented together. The biconvex positive lens L8 and the negative meniscus lens L9 are cemented together.

The third lens unit G3 includes a biconcave negative lens L10 and a negative meniscus lens L11 having a convex surface facing toward the object side. Here, the biconcave negative lens L10 and the negative meniscus lens L11 are cemented together.

The fourth lens unit G4 includes a biconvex positive lens L12 and a biconcave negative lens L13.

Here, the first lens unit G1 is the predetermined lens unit. Furthermore, the biconvex positive lens L3 and the biconcave negative lens L4 constitute the first cemented lens. Furthermore, the biconcave negative lens L5 and the biconvex positive lens L6 constitute the second cemented lens. Furthermore, the biconvex positive lens L8 and the negative meniscus lens L9 constitute the third cemented lens.

Furthermore, at a time of focusing from an object at infinity to an object at a close distance, the biconcave negative lens L10 and the negative meniscus lens L11 move toward the image side along the optical axis, and the biconvex positive lens L12 moves toward the object side along the optical axis.

Aspheric surfaces are provided on six surfaces in total, namely, both surfaces of the negative meniscus lens L2, the object-side surface of the biconcave negative lens L10, the image-side surface of the negative meniscus lens L11, and both surfaces of the biconvex positive lens L12.

Figure 18A:
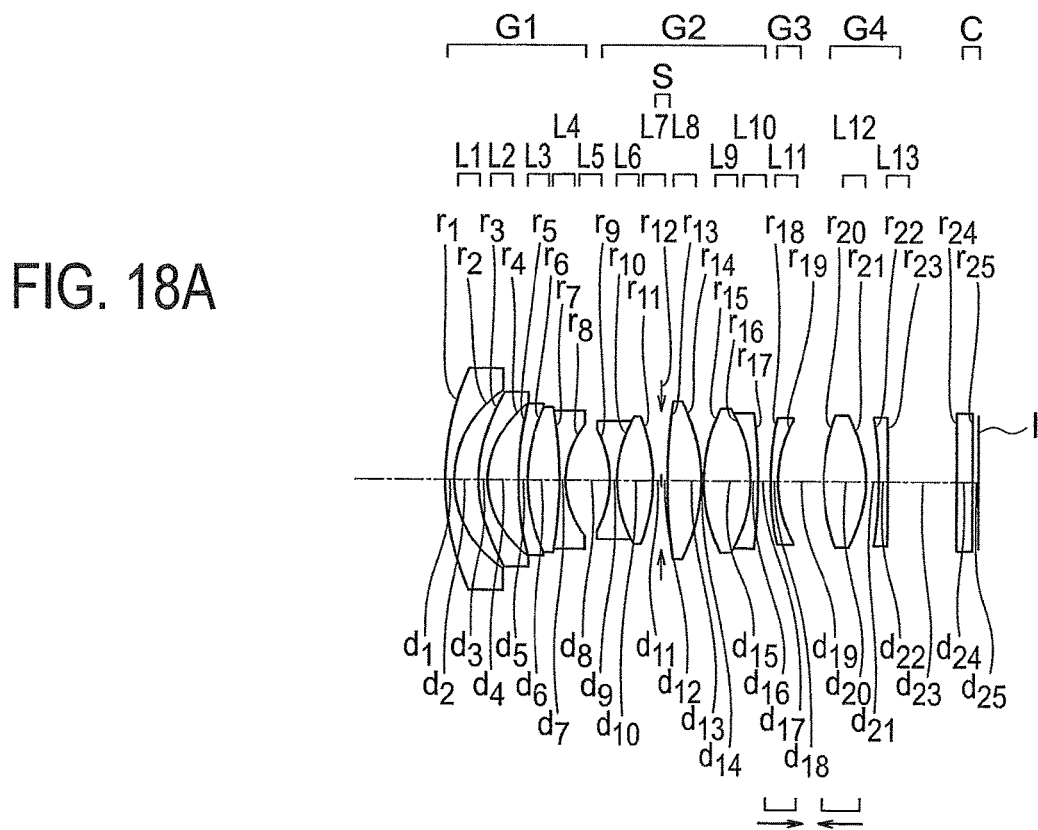
FIG. 18A is a sectional view of an imaging optical system of Example 18.
Figures 18B, 18C, 18D, 18E:
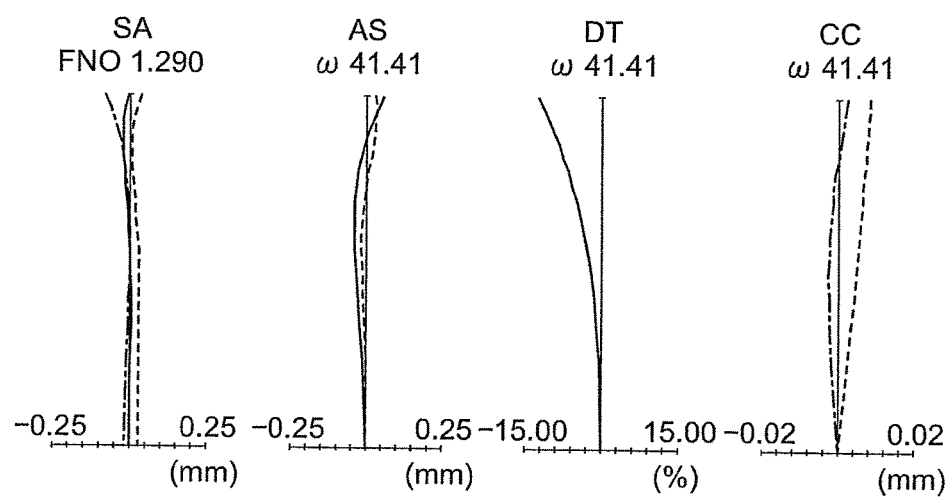
FIG. 18B, FIG. 18C, FIG. 18D, and FIG. 18E are aberration diagrams.

The imaging optical system according to Example 18 will be described. FIG. 18A is a lens sectional view of the imaging optical system according to Example 18. FIG. 18B, FIG. 18C, FIG. 18D, and FIG. 18E are aberration diagrams of the imaging optical system according to Example 18.

The imaging optical system according to Example 18 includes, as illustrated in FIG. 18A, in order from the object side, a first lens unit G1 having a negative refractive power, a second lens unit G2 having a positive refractive power, a third lens unit G3 having a negative refractive power, and a fourth lens unit G4 having a positive refractive power. The second lens unit G2 includes an aperture stop S.

The first lens unit G1 includes a negative meniscus lens L1 having a convex surface facing toward the object side, a negative meniscus lens L2 having a convex surface facing toward the object side, a negative meniscus lens L3 having a convex surface facing toward the object side, a biconvex positive lens L4, and a biconcave negative lens L5. Here, the negative meniscus lens L3, the biconvex positive lens L4, and the biconcave negative lens L5 are cemented together.

The second lens unit G2 includes a biconcave negative lens L6, a biconvex positive lens L7, a biconvex positive lens L8, a biconvex positive lens L9, and a negative meniscus lens L10 having a convex surface facing toward the image side. Here, the biconcave negative lens L6 and the biconvex positive lens L7 are cemented together. The biconvex positive lens L9 and the negative meniscus lens L10 are cemented together.

The third lens unit G3 includes a negative meniscus lens L11 having a convex surface facing toward the object side.

The fourth lens unit G4 includes a biconvex positive lens L12 and a negative meniscus lens L13 having a convex surface facing toward the image side.

Here, the first lens unit G1 is the predetermined lens unit. Furthermore, the negative meniscus lens L3, the biconvex positive lens L4, and the biconcave negative lens L5 constitute the first cemented lens. The biconcave negative lens L6 and the biconvex positive lens L7 constitute the second cemented lens. The biconvex positive lens L9 and the negative meniscus lens L10 constitute the third cemented lens.

Furthermore, at a time of focusing from an object at infinity to an object at a close distance, the negative meniscus lens L11 moves toward the image side along the optical axis, and the biconvex positive lens L12 moves toward the object side along the optical axis.

Aspheric surfaces are provided on six surfaces in total, namely, both surfaces of the negative meniscus lens L2, both surfaces of the negative meniscus lens L11, and both surfaces of the biconvex positive lens L12.

Figure 19A:
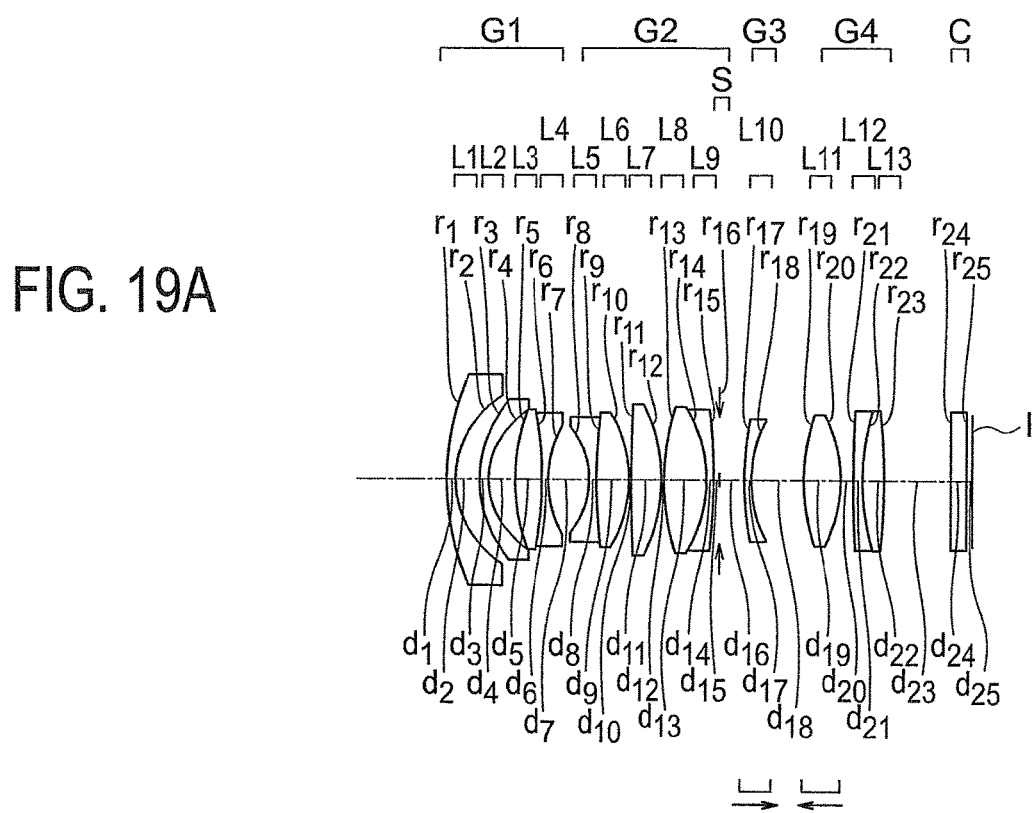
FIG. 19A is a sectional view of an imaging optical system of Example 19.
Figures 19B, 19C, 19D, 19E:
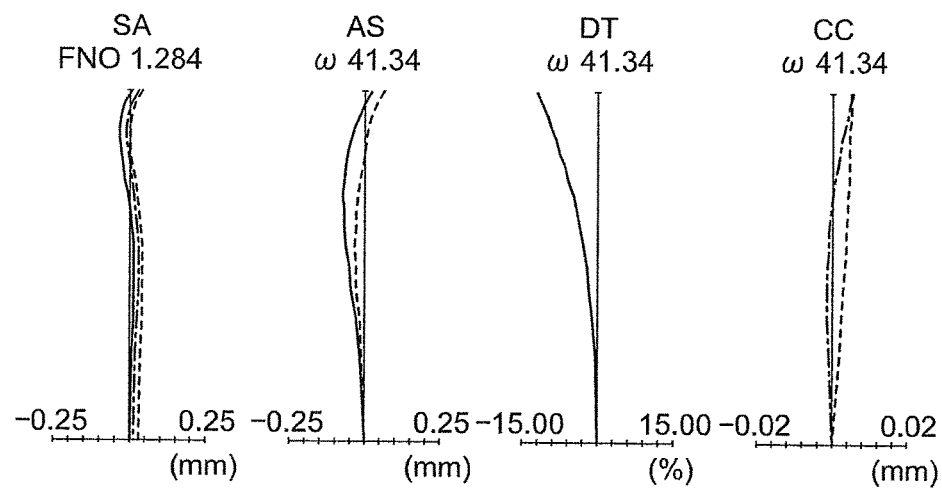
FIG. 19B, FIG. 19C, FIG. 19D, and FIG. 19E are aberration diagrams.

The imaging optical system according to Example 19 will be described. FIG. 19A is a lens sectional view of the imaging optical system according to Example 19. FIG. 19B, FIG. 19C, FIG. 19D, and FIG. 19E are aberration diagrams of the imaging optical system according to Example 19.

The imaging optical system according to Example 19 includes, as illustrated in FIG. 19A, in order from the object side, a first lens unit G1 having a negative refractive power, a second lens unit G2 having a positive refractive power, a third lens unit G3 having a negative refractive power, and a fourth lens unit G4 having a positive refractive power. The second lens unit G2 includes an aperture stop S.

The first lens unit G1 includes a negative meniscus lens L1 having a convex surface facing toward the object side, a negative meniscus lens L2 having a convex surface facing toward the object side, a biconvex positive lens L3, and a biconcave negative lens L4. Here, the biconvex positive lens L3 and the biconcave negative lens L4 are cemented together.

The second lens unit G2 includes a biconcave negative lens L5, a biconvex positive lens L6, a biconvex positive lens L7, a biconvex positive lens L8, and a negative meniscus lens L9 having a convex surface facing toward the image side. Here, the biconcave negative lens L5 and the biconvex positive lens L6 are cemented together. The biconvex positive lens L8 and the negative meniscus lens L9 are cemented together.

The third lens unit G3 includes a negative meniscus lens L10 having a convex surface facing toward the object side.

The fourth lens unit G4 includes a biconvex positive lens L11, a negative meniscus lens L12 having a convex surface facing toward the object side, and a biconvex positive lens L13. Here, the negative meniscus lens L12 and the biconvex positive lens L13 are cemented together.

Here, the first lens unit G1 is the predetermined lens unit. Furthermore, the biconvex positive lens L3 and the biconcave negative lens L4 constitute the first cemented lens. The biconcave negative lens L5 and the biconvex positive lens L6 constitute the second cemented lens. The biconvex positive lens L8 and the negative meniscus lens L9 constitute the third cemented lens.

Furthermore, at a time of focusing from an object at infinity to an object at a close distance, the negative meniscus lens L10 moves toward the image side along the optical axis, and the biconvex positive lens L11 moves toward the object side along the optical axis.

Aspheric surfaces are provided on six surfaces in total, namely, both surfaces of the negative meniscus lens L2, both surfaces of the negative meniscus lens L10, and both surfaces of the biconvex positive lens L11.

The imaging optical system according to Example 20 will be described. FIG. 20A is a lens sectional view of the imaging optical system according to Example 20. FIG. 20B, FIG. 20C, FIG. 20D, and FIG. 20E are aberration diagrams of the imaging optical system according to Example 20.

The imaging optical system according to Example 20 includes, as illustrated in FIG. 20A, in order from the object side, a first lens unit G1 having a negative refractive power, a second lens unit G2 having a positive refractive power, a third lens unit G3 having a negative refractive power, and a fourth lens unit G4 having a positive refractive power. The second lens unit G2 includes an aperture stop S.

The first lens unit G1 includes a negative meniscus lens L1 having a convex surface facing toward the object side, a negative meniscus lens L2 having a convex surface facing toward the object side, a negative meniscus lens L3 having a convex surface facing toward the object side, a biconvex positive lens L4, and a biconcave negative lens L5. Here, the negative meniscus lens L3, the biconvex positive lens L4, and the biconcave negative lens L5 are cemented together.

The second lens unit G2 includes a biconcave negative lens L6, a biconvex positive lens L7, a biconvex positive lens L8, a biconvex positive lens L9, and a negative meniscus lens L10 having a convex surface facing toward the image side. Here, the biconcave negative lens L6 and the biconvex positive lens L7 are cemented together. The biconvex positive lens L9 and the negative meniscus lens L10 are cemented together.

The third lens unit G3 includes a negative meniscus lens L11 having a convex surface facing toward the object side.

The fourth lens unit G4 includes a biconvex positive lens L12 and a biconcave negative lens L13.

Here, the first lens unit G1 is the predetermined lens unit. Furthermore, the negative meniscus lens L3, the biconvex positive lens L4, and the biconcave negative lens L5 constitute the first cemented lens. The biconcave negative lens L6 and the biconvex positive lens L7 constitute the second cemented lens. The biconvex positive lens L9 and the negative meniscus lens L10 constitute the third cemented lens.

Furthermore, at a time of focusing from an object at infinity to an object at a close distance, the negative meniscus lens L11 moves toward the image side along the optical axis, and the biconvex positive lens L12 moves toward the object side along the optical axis.

Aspheric surfaces are provided on six surfaces in total, namely, both surfaces of the negative meniscus lens L2, both surfaces of the negative meniscus lens L11, and both surfaces of the biconvex positive lens L12.

Next, numerical data of optical components comprising the imaging optical system of each above example are shown. In numerical data of each example, r1, r2, denotes a curvature radius of each lens surface, d1, d2, . . . denotes a thickness of each lens or an air distance between adjacent lens surfaces, nd1, nd2, . . . denotes a refractive index of each lens for d-line, v1, vd2, . . . denotes an Abbe number of each lens, * denotes an aspheric surface. Moreover, in various data, f denotes a focal length of an imaging optical system as a whole, FNO. denotes an F number, ω denotes a half angle of view, IH denotes an image height, FB denotes a back focus, LTL denotes a lens total length. The lens total length is the distance from the frontmost lens surface to the rearmost lens surface plus back focus. The back focus is a unit which is expressed upon air conversion of a distance from the lens backmost surface to a paraxial image surface. Moreover, the unit of angle is ° (degree). Moreover, Infinity indicates the time of focusing to an object at infinity and Close distance indicates the time of focusing to an object at a close distance.

A shape of an aspheric surface is defined by the following expression where the direction of the optical axis is represented by z, the direction orthogonal to the optical axis is represented by y, a conical coefficient is represented by K, aspheric surface coefficients are represented by A4, A6, A8, A10, $$Z=(y^2/r)/[1+\{1-(1+k)(y/r)^2\}^{1/2}]+A4y^4+A6y^6+A8y^8+A10y^{10}$$

Further, in the aspherical surface coefficients, 'e–n' (where, n is an integral number) indicates '10$^{-n}$'. Moreover, these symbols are commonly used in the following numerical data for each example.

Example 1

| Unit mm | | | | |
|---|---|---|---|---|
| Surface data | | | | |
| Surface no. | r | d | nd | vd |
| Object plane | ∞ | ∞ | | |
| 1 | 55.000 | 1.50 | 1.48749 | 70.23 |
| 2 | 15.910 | 4.92 | | |
| 3 | 22.804 | 1.50 | 1.49700 | 81.61 |
| 4 | 13.911 | 5.69 | | |
| 5 | 46.637 | 1.50 | 1.74320 | 49.34 |
| 6* | 18.515 | 3.21 | | |
| 7 | 129.872 | 2.66 | 2.00100 | 29.13 |
| 8 | −86.634 | 0.40 | | |
| 9 | 33.953 | 4.06 | 2.00100 | 29.13 |
| 10 | −103.511 | 1.00 | 1.54814 | 45.79 |
| 11 | 18.116 | 7.11 | | |
| 12 | −43.091 | 1.20 | 1.84666 | 23.78 |

-continued

Unit mm

| | | | | |
|---|---|---|---|---|
| 13 | 18.546 | 6.63 | 1.72000 | 43.69 |
| 14 | −54.065 | 1.40 | | |
| 15(Stop) | ∞ | 1.00 | | |
| 16 | 65.628 | 6.75 | 1.91082 | 35.25 |
| 17 | −28.862 | 0.40 | | |
| 18 | 39.343 | 7.33 | 1.49700 | 81.61 |
| 19 | −20.569 | 1.20 | 2.00100 | 29.13 |
| 20 | −53.055 | 2.10 | | |
| 21* | 76.582 | 1.20 | 1.74320 | 49.34 |
| 22* | 22.423 | 6.05 | | |
| 23 | 44.175 | 6.76 | 1.61881 | 63.85 |
| 24* | −17.602 | 0.40 | | |
| 25 | −52.627 | 1.50 | 1.80518 | 25.42 |
| 26 | −117478.336 | 11.34 | | |
| 27 | ∞ | 2.66 | 1.51633 | 64.14 |
| 28 | ∞ | 1.00 | | |
| Image plane | ∞ | | | |

Aspherical surface data

6th surface k = 0.000
A4 = −1.84370e−05, A6 = −5.06577e−08, A8 = −3.20158e−10,
A10 = −1.50045e−12

21th surface k = 0.000
A4 = 1.32953e−05, A6 = −6.53919e−08, A8 = 3.20080e−10

22th surface k = 0.000
A4 = 3.17365e−05, A6 = −6.64637e−08, A8 = 5.90911e−10

24th surface k = 0.000
A4 = 4.95207e−05, A6 = −7.03512e−08, A8 = 2.17058e−10

Various data

| | |
|---|---|
| f | 12.37 |
| FNO. | 1.29 |
| 2ω | 91.80 |
| IH | 11.15 |
| FB (in air) | 14.09 |
| LTL (in air) | 91.57 |

Unit focal length

| | | | |
|---|---|---|---|
| f1 = −31.65 | f2 = 20.55 | f3 = −43.07 | f4 = 30.31 |

Example 2

Unit mm

Surface data

| Surface no. | r | d | nd | νd |
|---|---|---|---|---|
| Object plane | ∞ | ∞ | | |
| 1 | 83.044 | 1.50 | 1.48749 | 70.23 |
| 2 | 20.661 | 2.17 | | |
| 3 | 23.930 | 1.50 | 1.49700 | 81.61 |
| 4 | 16.138 | 5.37 | | |
| 5* | 21.611 | 1.50 | 1.80610 | 40.92 |
| 6* | 11.913 | 2.85 | | |
| 7 | 24.962 | 3.44 | 2.00100 | 29.13 |
| 8 | 53.374 | 0.40 | | |
| 9 | 34.784 | 5.15 | 2.00100 | 29.13 |
| 10 | −53.257 | 1.00 | 1.54814 | 45.79 |
| 11 | 14.970 | 11.39 | | |
| 12 | −28.403 | 1.20 | 1.85478 | 24.80 |
| 13 | 20.951 | 6.03 | 1.72000 | 43.69 |

-continued

Unit mm

| | | | | |
|---|---|---|---|---|
| 14 | −33.655 | 0.80 | | |
| 15(Stop) | ∞ | 0.40 | | |
| 16 | 49.077 | 5.33 | 1.91082 | 35.25 |
| 17 | −31.682 | 0.40 | | |
| 18 | 45.282 | 6.08 | 1.49700 | 81.61 |
| 19 | −19.966 | 1.20 | 2.00100 | 29.13 |
| 20 | −55.421 | 2.40 | | |
| 21* | −342.302 | 1.20 | 1.74320 | 49.34 |
| 22* | 41.214 | 7.06 | | |
| 23* | 47.308 | 5.70 | 1.69350 | 53.21 |
| 24* | −19.021 | 0.40 | | |
| 25 | −62.081 | 2.00 | 1.80000 | 29.84 |
| 26 | −1714.984 | 11.27 | | |
| 27 | ∞ | 2.66 | 1.51633 | 64.14 |
| 28 | ∞ | 1.00 | | |
| Image plane | ∞ | | | |

Aspherical surface data

5th surface k = 0.000
A4 = −3.99414e−05, A6 = −5.18429e−08, A8 = 6.69658e−14

6th surface k = −0.577
A4 = −4.36841e−05, A6 = −1.95530e−07, A8 = 3.83789e−11

21th surface k = 0.000
A4 = 6.67877e−05, A6 = −1.58982e−07, A8 = 4.64529e−10

22th surface k = 0.000
A4 = 7.70376e−05, A6 = −5.50923e−08, A8 = 5.33851e−10

23th surface k = 0.000
A4 = −1.24954e−05, A6 = 8.81283e−08, A8 = 9.00353e−12

24th surface k = 0.000
A4 = 4.48788e−05, A6 = −4.00730e−08, A8 = 3.07057e−10

Various data

| | |
|---|---|
| f | 12.22 |
| FNO. | 1.28 |
| 2ω | 92.31 |
| IH | 11.15 |
| FB (in air) | 14.02 |
| LTL (in air) | 90.50 |

Unit focal length

| | | | |
|---|---|---|---|
| f1 = −30.68 | f2 = 21.00 | f3 = −49.43 | f4 = 26.50 |

Example 3

Unit mm

Surface data

| Surface no. | r | d | nd | νd |
|---|---|---|---|---|
| Object plane | ∞ | ∞ | | |
| 1 | 50.000 | 1.50 | 1.59522 | 67.74 |
| 2 | 13.648 | 7.82 | | |
| 3* | 92.631 | 1.00 | 1.49700 | 81.61 |
| 4* | 15.753 | 4.52 | | |
| 5 | 62.631 | 3.78 | 2.00100 | 29.13 |
| 6 | −43.739 | 1.00 | 1.43875 | 94.93 |
| 7 | 1300.324 | 9.40 | | |

-continued

Unit mm

| | | | | |
|---|---|---|---|---|
| 8 | −152.146 | 1.20 | 1.80518 | 25.42 |
| 9 | 16.490 | 5.57 | 1.49700 | 81.61 |
| 10 | −54.381 | 4.05 | | |
| 11(Stop) | ∞ | 1.00 | | |
| 12 | 50.450 | 4.38 | 2.00100 | 29.13 |
| 13 | −32.930 | 0.40 | | |
| 14 | 34.206 | 5.53 | 1.59522 | 67.74 |
| 15 | −20.364 | 1.20 | 1.84666 | 23.78 |
| 16 | 232.456 | 2.32 | | |
| 17* | 107.461 | 1.20 | 1.72903 | 54.04 |
| 18* | 18.009 | 6.43 | | |
| 19* | 46.207 | 5.77 | 1.72903 | 54.04 |
| 20* | −15.866 | 0.40 | | |
| 21 | −35.028 | 1.00 | 1.84666 | 23.78 |
| 22 | −267.948 | 11.35 | | |
| 23 | ∞ | 2.66 | 1.51633 | 64.14 |
| 24 | ∞ | 1.00 | | |
| Image plane | ∞ | | | |

Aspherical surface data

3rd surface k = 0.000
A4 = −1.36094e−05, A6 = −6.27185e−08

4th surface k = 0.000
A4 = −4.47225e−05, A6 = −2.03357e−07, A8 = −4.22299e−10

17th surface k = 0.000
A4 = 1.20627e−05, A6 = −2.61967e−07, A8 = 8.60374e−10

18th surface k = 0.000
A4 = 3.74036e−05, A6 = −2.14913e−07

19th surface k = 0.000
A4 = 5.78649e−06, A6 = 8.61366e−08, A8 = −2.43718e−10

20th surface k = 0.000
A4 = 6.44174e−05, A6 = −3.77935e−08, A8 = 5.92557e−10

Various data

| | |
|---|---|
| f | 12.37 |
| FNO. | 1.41 |
| 2ω | 91.71 |
| IH | 11.15 |
| FB (in air) | 14.10 |
| LTL (in air) | 83.58 |

Unit focal length

| | | | |
|---|---|---|---|
| f1 = −51.99 | f2 = 20.39 | f3 = −29.84 | f4 = 25.10 |

Example 4

Unit mm

Surface data

| Surface no. | r | d | nd | vd |
|---|---|---|---|---|
| Object plane | ∞ | ∞ | | |
| 1 | 45.098 | 1.50 | 1.48749 | 70.23 |
| 2 | 18.539 | 1.95 | | |
| 3 | 21.083 | 1.50 | 1.72916 | 54.68 |
| 4 | 14.117 | 4.99 | | |
| 5* | 19.014 | 1.50 | 1.80610 | 40.92 |

-continued

Unit mm

| | | | | |
|---|---|---|---|---|
| 6* | 10.725 | 2.91 | | |
| 7 | 25.870 | 3.45 | 2.00100 | 29.13 |
| 8 | 77.203 | 0.53 | | |
| 9 | 41.845 | 4.43 | 2.00100 | 29.13 |
| 10 | −39.803 | 1.00 | 1.54814 | 45.79 |
| 11 | 14.737 | 8.27 | | |
| 12 | −25.729 | 1.20 | 1.85478 | 24.80 |
| 13 | 22.371 | 4.87 | 1.72000 | 43.69 |
| 14 | −30.252 | 0.84 | | |
| 15(Stop) | ∞ | 0.40 | | |
| 16 | 50.721 | 4.61 | 1.91082 | 35.25 |
| 17 | −27.243 | 0.40 | | |
| 18 | 62.166 | 5.01 | 1.49700 | 81.61 |
| 19 | −17.526 | 1.20 | 2.00100 | 29.13 |
| 20 | −39.549 | 2.40 | | |
| 21* | −637.328 | 1.20 | 1.74320 | 49.34 |
| 22* | 36.803 | 6.73 | | |
| 23* | 41.788 | 6.17 | 1.69350 | 53.21 |
| 24* | −16.602 | 0.40 | | |
| 25 | −35.183 | 2.00 | 1.84666 | 23.78 |
| 26 | −230.322 | 11.35 | | |
| 27 | ∞ | 2.66 | 1.51633 | 64.14 |
| 28 | ∞ | 1.00 | | |
| Image plane | ∞ | | | |

Aspherical surface data

5th surface k = 0.000
A4 = −6.79321e−05, A6 = −8.02738e−08

6th surface k = −0.560
A4 = −7.49950e−05, A6 = −3.46303e−07, A8 = 2.25935e−10

21th surface k = 0.000
A4 = 6.91286e−05, A6 = −2.58182e−07, A8 = 9.71591e−10

22th surface k = 0.000
A4 = 8.55270e−05, A6 = −1.70347e−07, A8 = 9.97225e−10

23th surface k = 0.000
A4 = 2.63288e−06, A6 = 7.98087e−08, A8 = 7.17631e−12

24th surface k = 0.000
A4 = 7.02984e−05, A6 = −4.69949e−08, A8 = 5.44468e−10

Various data

| | |
|---|---|
| f | 12.22 |
| FNO. | 1.43 |
| 2ω | 92.38 |
| IH | 11.15 |
| FB (in air) | 14.11 |
| LTL (in air) | 83.58 |

Unit focal length

| | | | |
|---|---|---|---|
| f1 = −27.24 | f2 = 19.53 | f3 = −46.78 | f4 = 27.02 |

Example 5

Unit mm

Surface data

| Surface no. | r | d | nd | νd |
|---|---|---|---|---|
| Object plane | ∞ | ∞ | | |
| 1 | 55.000 | 1.50 | 1.51633 | 64.14 |
| 2* | 18.170 | 4.00 | | |
| 3 | 28.573 | 1.50 | 1.43875 | 94.93 |
| 4 | 15.059 | 5.57 | | |
| 5 | 39.782 | 1.50 | 1.49700 | 81.61 |
| 6 | 21.771 | 6.21 | 2.00100 | 29.13 |
| 7 | −163.886 | 1.00 | 1.51633 | 64.14 |
| 8 | 15.085 | 7.58 | | |
| 9 | −20.995 | 1.20 | 1.84666 | 23.78 |
| 10 | 20.978 | 6.12 | 1.72916 | 54.68 |
| 11 | −34.822 | 1.40 | | |
| 12(Stop) | ∞ | 1.00 | | |
| 13 | 83.738 | 6.07 | 1.90366 | 31.32 |
| 14 | −27.721 | 0.40 | | |
| 15 | 22.240 | 8.81 | 1.43875 | 94.93 |
| 16 | −22.947 | 1.20 | 2.00100 | 29.13 |
| 17 | −60.576 | 2.10 | | |
| 18* | 108.640 | 1.20 | 1.74320 | 49.34 |
| 19* | 22.708 | 6.73 | | |
| 20* | 45.350 | 6.49 | 1.72903 | 54.04 |
| 21* | −18.174 | 0.40 | | |
| 22 | −32.398 | 1.50 | 1.80518 | 25.42 |
| 23 | −99.166 | 11.33 | | |
| 24 | ∞ | 2.66 | 1.51633 | 64.14 |
| 25 | ∞ | 1.00 | | |
| Image plane | ∞ | | | |

Aspherical surface data

2nd surface $k = 0.000$
$A4 = -6.23121e-06, A6 = 1.18132e-08, A8 = -1.23403e-10$ 18th surface $k = 0.000$
$A4 = 4.49362e-05, A6 = -2.70140e-07, A8 = 3.65234e-10$ 19th surface $k = 0.000$
$A4 = 6.80175e-05, A6 = -1.65974e-07, A8 = -4.13549e-10$ 20th surface $k = 0.000$
$A4 = -8.97352e-07, A6 = 7.39063e-08, A8 = -2.52588e-10$ 21th surface $k = 0.000$
$A4 = 3.80931e-05, A6 = -7.73568e-09, A8 = 1.28690e-10$

Various data

| f | 14.43 |
|---|---|
| FNO. | 1.25 |
| 2ω | 82.08 |
| IH | 11.15 |
| FB (in air) | 14.08 |
| LTL (in air) | 87.56 |

Unit focal length

| f1 = −37.44 | f2 = 19.75 | f3 = −38.86 | f4 = 26.18 |
|---|---|---|---|

Example 6

Unit mm

Surface data

| Surface no. | r | d | nd | νd |
|---|---|---|---|---|
| Object plane | ∞ | ∞ | | |
| 1 | 60.000 | 1.50 | 1.59522 | 67.74 |
| 2 | 12.478 | 5.84 | | |
| 3* | 40.000 | 1.00 | 1.49700 | 81.61 |
| 4* | 14.998 | 3.16 | | |
| 5 | 35.972 | 3.92 | 2.00100 | 29.13 |
| 6 | −42.320 | 1.00 | 1.43875 | 94.93 |
| 7 | 414.837 | 4.27 | | |
| 8 | −27.030 | 1.20 | 1.80518 | 25.42 |
| 9 | 18.406 | 5.66 | 1.49700 | 81.61 |
| 10 | −30.278 | 1.40 | | |
| 11(Stop) | ∞ | 1.00 | | |
| 12 | 68.685 | 4.59 | 2.00100 | 29.13 |
| 13 | −26.820 | 0.40 | | |
| 14 | 36.721 | 5.71 | 1.59522 | 67.74 |
| 15 | −19.927 | 1.20 | 1.84666 | 23.78 |
| 16 | 694.790 | 2.80 | | |
| 17* | 75.396 | 1.20 | 1.72903 | 54.04 |
| 18* | 17.574 | 5.84 | | |
| 19* | 41.636 | 6.00 | 1.72903 | 54.04 |
| 20* | −16.928 | 0.40 | | |
| 21 | −32.103 | 1.40 | 1.84666 | 23.78 |
| 22 | −107.619 | 11.35 | | |
| 23 | ∞ | 2.66 | 1.51633 | 64.14 |
| 24 | ∞ | 1.00 | | |
| Image plane | ∞ | | | |

Aspherical surface data

3rd surface $k = 0.000$
$A4 = -2.55995e-05, A6 = -8.99603e-08$

4th surface $k = 0.000$
$A4 = -5.23687e-05, A6 = -2.97602e-07, A8 = -1.85881e-10$ 17th surface $k = 0.000$
$A4 = -4.88103e-06, A6 = -1.26125e-07, A8 = 5.63953e-10$ 18th surface $k = 0.000$
$A4 = 1.93156e-05, A6 = -1.60732e-07$ 19th surface $k = 0.000$
$A4 = 1.68798e-05, A6 = 1.86070e-08, A8 = 2.04658e-11$ 20th surface $k = 0.000$
$A4 = 5.56507e-05, A6 = -3.84768e-08, A8 = 5.56560e-10$

Various data

| f | 14.28 |
|---|---|
| FNO. | 1.41 |
| 2ω | 83.51 |
| IH | 11.15 |
| FB (in air) | 14.10 |
| LTL (in air) | 73.58 |

Unit focal length

| f1 = −187.16 | f2 = 22.21 | f3 = −31.71 | f4 = 24.51 |
|---|---|---|---|

Example 7

Unit mm

Surface data

| Surface no. | r | d | nd | vd |
|---|---|---|---|---|
| Object plane | ∞ | ∞ | | |
| 1 | 5148.256 | 1.50 | 1.48749 | 70.23 |
| 2* | 18.807 | 6.39 | | |
| 3 | 42.326 | 3.23 | 1.84666 | 23.78 |
| 4 | 346.117 | 0.40 | | |
| 5 | 24.689 | 3.11 | 2.00100 | 29.13 |
| 6 | 55.765 | 1.00 | 1.66680 | 33.05 |
| 7 | 14.112 | 8.98 | | |
| 8 | −15.886 | 1.20 | 1.69895 | 30.13 |
| 9 | 31.567 | 7.04 | 1.49700 | 81.61 |
| 10 | −20.543 | 1.40 | | |
| 11(Stop) | ∞ | 1.00 | | |
| 12 | 87.111 | 5.41 | 2.00100 | 29.13 |
| 13 | −35.861 | 0.40 | | |
| 14 | 35.014 | 6.91 | 1.64000 | 60.08 |
| 15 | −28.217 | 1.20 | 1.84666 | 23.78 |
| 16 | 127.412 | 2.10 | | |
| 17* | 61.800 | 1.20 | 1.69680 | 55.53 |
| 18* | 22.454 | 7.85 | | |
| 19 | 41.243 | 6.36 | 1.49700 | 81.61 |
| 20* | −18.974 | 0.40 | | |
| 21 | 27.365 | 2.00 | 1.84666 | 23.78 |
| 22 | 22.950 | 13.74 | | |
| 23 | ∞ | 2.66 | 1.51633 | 64.14 |
| 24 | ∞ | 1.00 | | |
| Image plane | ∞ | | | |

Aspherical surface data

2nd surface k = 0.000
A4 = −7.77095e−06, A6 = −3.61202e−08, A8 = 8.79759e−11, A10 = −5.37766e−13

17th surface k = 0.000
A4 = 7.47784e−06, A6 = −1.60739e−07, A8 = 3.61719e−10

18th surface k = 0.000
A4 = 2.12764e−05, A6 = −1.70569e−07, A8 = 1.89648e−10, A10 = 4.41707e−13

20th surface k = 0.000
A4 = 3.68441e−05, A6 = −4.88703e−08, A8 = 2.31428e−10

Various data

| | |
|---|---|
| f | 17.53 |
| FNO. | 1.29 |
| 2ω | 70.49 |
| IH | 11.15 |
| FB (in air) | 16.49 |
| LTL (in air) | 85.58 |

Unit focal length

| f1 = −63.42 | f2 = 24.06 | f3 = −51.26 | f4 = 29.44 |
|---|---|---|---|

Example 8

Unit mm

Surface data

| Surface no. | r | d | nd | vd |
|---|---|---|---|---|
| Object plane | ∞ | ∞ | | |
| 1 | 50.000 | 1.50 | 1.59522 | 67.74 |
| 2 | 16.786 | 4.17 | | |
| 3* | 51.357 | 1.00 | 1.49700 | 81.61 |
| 4* | 19.813 | 2.49 | | |
| 5 | 46.028 | 3.31 | 2.00100 | 29.13 |
| 6 | −55.727 | 1.00 | 1.43875 | 94.93 |
| 7 | 39.491 | 6.62 | | |
| 8 | −25.698 | 1.20 | 1.80518 | 25.42 |
| 9 | 27.710 | 5.68 | 1.49700 | 81.61 |
| 10 | −24.016 | 1.40 | | |
| 11(Stop) | ∞ | 1.00 | | |
| 12 | 108.354 | 4.48 | 2.00100 | 29.13 |
| 13 | −29.617 | 0.40 | | |
| 14 | 24.807 | 6.00 | 1.59522 | 67.74 |
| 15 | −36.499 | 1.20 | 1.84666 | 23.78 |
| 16 | 62.738 | 2.10 | | |
| 17* | 35.827 | 1.20 | 1.72903 | 54.04 |
| 18* | 16.512 | 5.50 | | |
| 19 | 52.670 | 4.64 | 1.72903 | 54.04 |
| 20* | −23.182 | 0.40 | | |
| 21 | 123.676 | 2.84 | 1.84666 | 23.78 |
| 22 | 37.648 | 12.71 | | |
| 23 | ∞ | 2.66 | 1.51633 | 64.14 |
| 24 | ∞ | 1.00 | | |
| Image plane | ∞ | | | |

Aspherical surface data

3rd surface k = 0.000
A4 = −3.26020e−05, A6 = −7.50663e−08

4th surface k = 0.000
A4 = −9.81172e−06, A6 = −9.11363e−08, A8 = 2.46376e−10

17th surface k = 0.000
A4 = −7.48122e−06, A6 = −1.48889e−07, A8 = 5.33611e−10

18th surface k = 0.000
A4 = 1.01588e−05, A6 = −1.82412e−07

19th surface k = 0.000
A4 = 2.03136e−05, A6 = 2.24409e−08, A8 = 1.17085e−10

20th surface k = 0.000
A4 = 3.46499e−05, A6 = −5.41179e−08, A8 = 4.32985e−10

Various data

| | |
|---|---|
| f | 17.53 |
| FNO. | 1.42 |
| 2ω | 72.05 |
| IH | 11.15 |
| FB (in air) | 15.46 |
| LTL (in air) | 73.58 |

Unit focal length

| f1 = −64.97 | f2 = 22.23 | f3 = −43.14 | f4 = 32.17 |
|---|---|---|---|

Example 9

Unit mm

Surface data

| Surface no. | r | d | nd | vd |
|---|---|---|---|---|
| Object plane | ∞ | ∞ | | |
| 1 | 116.266 | 1.50 | 1.51633 | 64.14 |
| 2* | 25.717 | 3.68 | | |
| 3 | 60.055 | 3.25 | 2.00100 | 29.13 |
| 4 | 549.816 | 0.40 | | |
| 5 | 25.750 | 4.30 | 2.00100 | 29.13 |
| 6 | 73.371 | 2.59 | 1.69895 | 30.13 |
| 7 | 15.387 | 10.67 | | |
| 8 | −16.516 | 1.20 | 1.72825 | 28.46 |
| 9 | 31.039 | 8.00 | 1.49700 | 81.61 |
| 10 | −22.028 | 1.40 | | |
| 11(Stop) | ∞ | 1.00 | | |
| 12 | 110.340 | 5.84 | 2.00100 | 29.13 |
| 13 | −36.817 | 0.40 | | |
| 14 | 32.663 | 7.08 | 1.72916 | 54.68 |
| 15 | −38.391 | 1.20 | 2.00069 | 25.46 |
| 16 | 148.534 | 2.10 | | |
| 17* | 59.611 | 1.20 | 1.74320 | 49.34 |
| 18* | 20.525 | 7.68 | | |
| 19* | 73.228 | 5.69 | 1.49700 | 81.61 |
| 20* | −19.916 | 0.40 | | |
| 21 | 23.197 | 2.00 | 2.00100 | 29.13 |
| 22 | 20.305 | 14.24 | | |
| 23 | ∞ | 2.66 | 1.51633 | 64.14 |
| 24 | ∞ | 1.00 | | |
| Image plane | ∞ | | | |

Aspherical surface data

2nd surface $k = 0.000$
$A4 = -2.54908e-06, A6 = -1.26063e-08, A8 = 2.84478e-11,$
$A10 = -9.00492e-14$ 17th surface $k = 0.000$
$A4 = 2.07770e-06, A6 = -1.50101e-07, A8 = 3.10129e-10$ 18th surface $k = 0.000$
$A4 = 1.40527e-05, A6 = -1.50608e-07, A8 = -2.97060e-11,$
$A10 = 4.02049e-13$ 19th surface $k = 0.000$
$A4 = 1.44890e-06, A6 = 4.50889e-08, A8 = -1.12829e-10$ 20th surface $k = 0.000$
$A4 = 2.07584e-05, A6 = -6.95062e-09, A8 = 1.34767e-10$ Various data

| f | 24.74 |
|---|---|
| FNO. | 1.29 |
| 2ω | 48.82 |
| IH | 11.15 |
| FB (in air) | 17.00 |
| LTL (in air) | 88.58 |

Unit focal length

| f1 = −238.21 | f2 = 23.20 | f3 = −42.68 | f4 = 34.77 |
|---|---|---|---|

Example 10

Unit mm

Surface data

| Surface no. | r | d | nd | vd |
|---|---|---|---|---|
| Object plane | ∞ | ∞ | | |
| 1 | 44.574 | 1.50 | 1.48749 | 70.23 |
| 2 | 15.584 | 8.50 | | |
| 3* | −659.095 | 1.20 | 1.49700 | 81.61 |
| 4* | 25.626 | 1.71 | | |
| 5 | 29.244 | 6.27 | 2.00069 | 25.46 |
| 6 | −34.706 | 1.20 | 1.58144 | 40.75 |
| 7 | 23.314 | 4.79 | | |
| 8 | −26.565 | 1.20 | 1.85478 | 24.80 |
| 9 | 25.266 | 6.29 | 1.69680 | 55.53 |
| 10 | −35.206 | 0.20 | | |
| 11 | 61.090 | 4.37 | 1.72916 | 54.68 |
| 12 | −42.527 | 0.20 | | |
| 13 | 49.281 | 5.00 | 1.69680 | 55.53 |
| 14 | −104.266 | 1.50 | 1.85478 | 24.80 |
| 15 | −156.094 | 0.60 | | |
| 16(Stop) | ∞ | 3.40 | | |
| 17* | 113.215 | 1.20 | 1.85400 | 40.39 |
| 18* | 24.921 | 9.08 | | |
| 19 | 67.113 | 3.70 | 1.72916 | 54.68 |
| 20 | −45.208 | 0.20 | | |
| 21 | 29.445 | 4.61 | 2.00100 | 29.13 |
| 22 | −60.934 | 1.20 | 1.85478 | 24.80 |
| 23 | 19.276 | 1.83 | | |
| 24 | 37.289 | 2.70 | 1.72916 | 54.68 |
| 25 | 2981.268 | 11.34 | | |
| 26 | ∞ | 2.66 | 1.51633 | 64.14 |
| 27 | ∞ | 1.00 | | |
| Image plane | ∞ | | | |

Aspherical surface data

3rd surface $k = 0.000$
$A4 = -1.71558e-05, A6 = -1.08272e-08, A8 = -3.91577e-11$ 4th surface $k = 0.000$
$A4 = -2.61471e-06, A6 = -3.46749e-08, A8 = 1.55161e-11$ 17th surface $k = 0.000$
$A4 = -6.00990e-06, A6 = 5.45326e-09$ 18th surface $k = 0.000$
$A4 = -1.45040e-09, A6 = 6.67983e-10$ Various data

| f | 17.27 |
|---|---|
| FNO. | 1.29 |
| 2ω | 72.93 |
| IH | 11.15 |
| FB (in air) | 14.10 |
| LTL (in air) | 86.56 |

Unit focal length

| f1 = −59.77 | f2 = 25.61 | f3 = −37.65 | f4 = 24.48 |
|---|---|---|---|

Example 11

Unit mm

Surface data

| Surface no. | r | d | nd | vd |
|---|---|---|---|---|
| Object plane | ∞ | ∞ | | |
| 1 | 47.643 | 1.50 | 1.48749 | 70.23 |
| 2 | 18.906 | 6.89 | | |
| 3 | 34.644 | 1.50 | 1.49700 | 81.61 |
| 4 | 14.800 | 5.23 | | |
| 5* | 17.187 | 1.50 | 1.80610 | 40.92 |
| 6* | 11.161 | 2.41 | | |
| 7 | 23.928 | 8.36 | 2.00100 | 29.13 |
| 8 | −30.498 | 1.00 | 1.54814 | 45.79 |
| 9 | 17.470 | 7.52 | | |
| 10 | −24.084 | 1.20 | 1.85478 | 24.80 |
| 11 | 20.703 | 5.93 | 1.72000 | 43.69 |
| 12 | −37.961 | 0.80 | | |
| 13(Stop) | ∞ | 0.40 | | |
| 14 | 54.341 | 5.44 | 1.91082 | 35.25 |
| 15 | −30.412 | 0.40 | | |
| 16 | 39.754 | 7.01 | 1.49700 | 81.61 |
| 17 | −19.594 | 1.20 | 2.00100 | 29.13 |
| 18 | −38.465 | 2.40 | | |
| 19* | 414.161 | 1.00 | 1.90366 | 31.32 |
| 20 | 18.000 | 2.30 | 1.85478 | 24.80 |
| 21 | 25.940 | 6.12 | | |
| 22* | 33.842 | 6.35 | 1.69350 | 53.21 |
| 23* | −18.468 | 0.40 | | |
| 24 | −276.994 | 2.00 | 1.80000 | 29.84 |
| 25 | 85.548 | 11.94 | | |
| 26 | ∞ | 2.66 | 1.51633 | 64.14 |
| 27 | ∞ | 1.00 | | |
| Image plane | ∞ | | | |

Aspherical surface data

5th surface k = 0.000
A4 = −8.57246e−05, A6 = −1.03782e−08, A8 = −1.94414e−10

6th surface k = −0.692
A4 = −7.83164e−05, A6 = −1.21507e−07, A8 = 1.96340e−10

19th surface k = 0.000
A4 = −1.55962e−05, A6 = −6.30133e−09, A8 = 2.61539e−10

22th surface k = 0.000
A4 = −5.62796e−06, A6 = 9.16059e−09, A8 = 8.83497e−11

23th surface k = 0.000
A4 = 4.94331e−05, A6 = −6.53931e−08, A8 = 4.43411e−10

Various data

| | |
|---|---|
| f | 12.22 |
| FNO. | 1.28 |
| 2ω | 92.46 |
| IH | 11.15 |
| FB (in air) | 14.70 |
| LTL (in air) | 93.58 |

Unit focal length f1 = −31.67  f2 = 19.88  f3 = −29.88  f4 = 22.38

Example 12

Unit mm

Surface data

| Surface no. | r | d | nd | vd |
|---|---|---|---|---|
| Object plane | ∞ | ∞ | | |
| 1 | 45.722 | 1.50 | 1.48749 | 70.23 |
| 2 | 17.855 | 7.13 | | |
| 3 | 36.016 | 1.50 | 1.49700 | 81.61 |
| 4 | 15.632 | 4.52 | | |
| 5* | 18.581 | 1.50 | 1.80610 | 40.92 |
| 6* | 11.935 | 1.94 | | |
| 7 | 24.600 | 7.59 | 2.00100 | 29.13 |
| 8 | −31.878 | 2.38 | 1.54814 | 45.79 |
| 9 | 16.765 | 8.06 | | |
| 10 | −26.687 | 1.20 | 1.85478 | 24.80 |
| 11 | 23.196 | 5.57 | 1.72000 | 43.69 |
| 12 | −32.692 | 0.80 | | |
| 13(Stop) | ∞ | 0.40 | | |
| 14 | 53.958 | 5.01 | 1.91082 | 35.25 |
| 15 | −30.706 | 0.55 | | |
| 16 | 60.710 | 5.80 | 1.49700 | 81.61 |
| 17 | −19.901 | 1.20 | 2.00100 | 29.13 |
| 18 | −41.858 | 2.42 | | |
| 19 | −234.486 | 3.86 | 1.84666 | 23.78 |
| 20 | −18.422 | 1.01 | 1.76182 | 26.52 |
| 21* | 29.085 | 6.88 | | |
| 22* | 36.524 | 6.22 | 1.69350 | 53.21 |
| 23* | −19.090 | 0.41 | | |
| 24 | −51.703 | 2.00 | 1.84666 | 23.78 |
| 25 | −133.252 | 11.37 | | |
| 26 | ∞ | 2.66 | 1.51633 | 64.14 |
| 27 | ∞ | 1.00 | | |
| Image plane | ∞ | | | |

Aspherical surface data

5th surface k = 0.000
A4 = −8.59295e−05, A6 = −1.94871e−08, A8 = −6.46329e−11

6th surface k = −0.634
A4 = −8.64751e−05, A6 = −1.30688e−07, A8 = 3.42520e−10

21th surface k = 0.000
A4 = 1.79113e−05, A6 = 3.98127e−08, A8 = −9.48115e−11

22th surface k = 0.000
A4 = −3.31913e−06, A6 = 3.95668e−08, A8 = −5.21567e−11

23th surface k = 0.000
A4 = 4.54848e−05, A6 = −2.78523e−08, A8 = 1.95054e−10

Various data

| | |
|---|---|
| f | 12.22 |
| FNO. | 1.28 |
| 2ω | 92.43 |
| IH | 11.15 |
| FB (in air) | 14.13 |
| LTL (in air) | 93.58 |

Unit focal length f1 = −28.27  f2 = 20.78  f3 = −39.46  f4 = 23.03

Example 13

Unit mm

Surface data

| Surface no. | r | d | nd | vd |
|---|---|---|---|---|
| Object plane | ∞ | ∞ | | |
| 1 | 55.000 | 1.50 | 1.69350 | 53.21 |
| 2 | 13.167 | 6.25 | | |
| 3* | 16.098 | 1.50 | 1.80610 | 40.92 |
| 4* | 10.905 | 2.73 | | |
| 5 | 54.248 | 3.41 | 2.00100 | 29.13 |
| 6 | −75.122 | 0.68 | | |
| 7 | 93.731 | 3.44 | 2.00100 | 29.13 |
| 8 | −36.465 | 1.00 | 1.54814 | 45.79 |
| 9 | 16.566 | 7.86 | | |
| 10 | −19.643 | 1.20 | 1.85478 | 24.80 |
| 11 | 879.391 | 4.00 | 1.72000 | 43.69 |
| 12 | −21.663 | 1.38 | | |
| 13(Stop) | ∞ | 0.40 | | |
| 14 | 104.934 | 3.50 | 1.91082 | 35.25 |
| 15 | −34.726 | 0.40 | | |
| 16 | 36.885 | 5.93 | 1.43700 | 95.10 |
| 17 | −21.076 | 1.20 | 2.00100 | 29.13 |
| 18 | −30.000 | 4.40 | | |
| 19* | −46.884 | 2.00 | 1.80610 | 40.88 |
| 20 | −22.514 | 0.40 | | |
| 21 | −44.553 | 1.00 | 1.80518 | 25.42 |
| 22 | 21.983 | 7.49 | | |
| 23* | 40.051 | 5.40 | 1.69350 | 53.21 |
| 24* | −20.046 | 0.40 | | |
| 25 | −42.305 | 2.00 | 1.84666 | 23.78 |
| 26 | −47.276 | 11.35 | | |
| 27 | ∞ | 2.66 | 1.51633 | 64.14 |
| 28 | ∞ | 1.00 | | |
| Image plane | ∞ | | | |

Aspherical surface data

3rd surface
k = 0.000
A4 = −2.15321e−04, A6 = 6.74789e−07, A8 = −2.02453e−09

4th surface
k = −1.199
A4 = −1.89475e−04, A6 = 7.86895e−07, A8 = −2.24144e−09

19th surface
k = 0.000
A4 = −3.76948e−05, A6−2.87051e−08

23th surface
k = 0.000
A4 = −6.59625e−06, A6 = 3.35290e−09, A8 = 7.61971e−13

24th surface
k = 0.000
A4 = 2.69835e−05, A6 = −3.17904e−08, A8 = 1.35926e−10

Various data

| | |
|---|---|
| f | 12.22 |
| FNO. | 1.41 |
| 2ω | 92.51 |
| IH | 11.15 |
| FB (in air) | 14.10 |
| LTL (in air) | 83.58 |

Unit focal length

| | | | |
|---|---|---|---|
| f1 = −27.11 | f2 = 19.06 | f3 = −27.77 | f4 = 21.08 |

Example 14

Unit mm

Surface data

| Surface no. | r | d | nd | vd |
|---|---|---|---|---|
| Object plane | ∞ | ∞ | | |
| 1 | 94.461 | 1.50 | 1.48749 | 70.23 |
| 2 | 17.060 | 4.00 | | |
| 3* | 24.648 | 1.50 | 1.49700 | 81.61 |
| 4* | 15.578 | 2.77 | | |
| 5 | 28.855 | 5.84 | 2.00100 | 29.14 |
| 6 | −68.444 | 1.01 | 1.51633 | 64.14 |
| 7 | 14.314 | 8.87 | | |
| 8 | −19.049 | 1.20 | 1.85478 | 24.80 |
| 9 | 21.984 | 6.04 | 1.72916 | 54.68 |
| 10 | −30.416 | 1.40 | | |
| 11(Stop) | ∞ | 1.00 | | |
| 12 | 90.026 | 5.97 | 2.00100 | 29.14 |
| 13 | −30.555 | 0.40 | | |
| 14 | 28.214 | 8.26 | 1.49700 | 81.61 |
| 15 | −24.399 | 1.20 | 2.00100 | 29.14 |
| 16 | −96.064 | Variable | | |
| 17* | 80.276 | 1.20 | 1.88202 | 37.22 |
| 18* | 25.036 | Variable | | |
| 19* | 31.198 | 7.41 | 1.59201 | 67.02 |
| 20* | −19.644 | Variable | | |
| 21 | −73.364 | 1.50 | 1.85478 | 24.80 |
| 22 | −233.212 | 11.19 | | |
| 23 | ∞ | 2.66 | 1.51633 | 64.14 |
| 24 | ∞ | 1.00 | | |
| Image plane | ∞ | | | |

Aspherical surface data

3rd surface
k = 0.000
A4 = 1.89045e−05, A6 = −2.89706e−07, A8 = 5.75790e−10

4th surface
k = 0.000
A4 = 1.02371e−05, A6 = −3.76732e−07, A8 = 2.44918e−10

17th surface
k = 0.000
A4 = 2.64635e−05, A6 = −3.91852e−08, A8 = 9.64945e−11

18th surface
k = 0.000
A4 = 3.16821e−05, A6 = −1.05829e−08, A8 = 7.52656e−12

19th surface
k = 0.000
A4 = −8.36939e−06, A6 = 2.75938e−08, A8 = −2.50887e−11

20th surface
k = 0.000
A4 = 4.45445e−05, A6 = −4.44198e−08, A8 = 2.03637e−10

Various data

| | |
|---|---|
| f | 14.43 |
| FNO. | 1.29 |
| 2ω | 82.76 |
| IH | 11.15 |
| FB (in air) | 13.94 |
| LTL (in air) | 87.07 |

-continued

Unit mm

|  | Infinity | Close distance |
|---|---|---|
| d16 | 2.10 | 3.69 |
| d18 | 7.85 | 5.20 |
| d20 | 2.10 | 3.17 |

Unit focal length f1 = −35.04   f2 = 21.51   f3 = −41.67   f4-1 = 21.53   f4-2 = −125.76

Example 15

Unit mm

Surface data

| Surface no. | r | d | nd | νd |
|---|---|---|---|---|
| Object plane | ∞ | ∞ | | |
| 1 | 39.248 | 1.50 | 1.48749 | 70.23 |
| 2 | 17.000 | 4.00 | | |
| 3* | 24.002 | 1.50 | 1.49700 | 81.61 |
| 4* | 14.349 | 4.51 | | |
| 5 | 65.084 | 1.50 | 1.43700 | 95.00 |
| 6 | 22.522 | 0.81 | | |
| 7 | 25.834 | 5.03 | 2.00100 | 29.14 |
| 8 | −61.404 | 1.00 | 1.51633 | 64.14 |
| 9 | 15.190 | 7.21 | | |
| 10 | −20.209 | 1.20 | 1.84666 | 23.78 |
| 11 | 21.020 | 5.71 | 1.72916 | 54.68 |
| 12 | −33.368 | 1.40 | | |
| 13(Stop) | ∞ | 1.00 | | |
| 14 | 91.934 | 5.42 | 2.00100 | 29.14 |
| 15 | −28.949 | 0.40 | | |
| 16 | 28.443 | 7.32 | 1.49700 | 81.61 |
| 17 | −24.446 | 1.20 | 2.00100 | 29.14 |
| 18 | −100.478 | Variable | | |
| 19* | 71.730 | 1.20 | 1.88202 | 37.22 |
| 20* | 24.866 | Variable | | |
| 21* | 33.158 | 6.93 | 1.59201 | 67.02 |
| 22* | −19.644 | Variable | | |
| 23 | −127.949 | 1.50 | 1.84666 | 23.78 |
| 24 | 494.026 | 11.46 | | |
| 25 | ∞ | 2.66 | 1.51633 | 64.14 |
| 26 | ∞ | 1.00 | | |
| Image plane | ∞ | | | |

Aspherical surface data

3rd surface k = 0.000
A4 = 1.15247e−05, A6 = −2.93936e−07, A8 = 5.98745e−10

4th surface k = 0.000
A4 = 8.69902e−06, A6 = −3.66102e−07, A8 = −8.05586e−11

19th surface k = 0.000
A4 = 3.09849e−05, A6 = −7.67649e−08, A8 = 1.52039e−10

20th surface k = 0.000
A4 = 3.80996e−05, A6 = −5.06882e−08, A8 = 6.79340e−11

21th surface k = 0.000
A4 = −7.46752e−06, A6 = 2.20795e−08, A8 = −3.76506e−12

-continued

Unit mm

22th surface k = 0.000
A4 = 4.26645e−05, A6 = −4.46638e−08, A8 = 2.07315e−10

Various data

| f | 14.43 |
|---|---|
| FNO. | 1.29 |
| 2ω | 82.90 |
| IH | 11.15 |
| FB (in air) | 14.21 |
| LTL (in air) | 87.58 |

|  | Infinity | Close distance |
|---|---|---|
| d18 | 2.10 | 5.18 |
| d20 | 8.84 | 4.73 |
| d22 | 2.10 | 3.13 |

Unit focal length f1 = −33.73   f2 = 21.50   f3 = −43.68   f4-1 = 21.91   f4-2 = −119.90

Example 16

Unit mm

Surface data

| Surface no. | r | d | nd | νd |
|---|---|---|---|---|
| Object plane | ∞ | ∞ | | |
| 1 | 54.301 | 1.50 | 1.48749 | 70.23 |
| 2 | 17.105 | 4.00 | | |
| 3* | 22.655 | 1.50 | 1.49700 | 81.61 |
| 4* | 13.783 | 5.65 | | |
| 5 | 47.419 | 4.91 | 2.00100 | 29.14 |
| 6 | −40.946 | 1.50 | 1.49700 | 81.61 |
| 7 | 17.739 | 6.17 | | |
| 8 | −18.916 | 1.20 | 1.85478 | 24.80 |
| 9 | 22.938 | 5.88 | 1.72916 | 54.68 |
| 10 | −30.236 | 1.43 | | |
| 11(Stop) | ∞ | 1.00 | | |
| 12 | 86.514 | 5.50 | 2.00100 | 29.14 |
| 13 | −30.725 | 0.40 | | |
| 14 | 31.726 | 7.58 | 1.49700 | 81.61 |
| 15 | −23.755 | 1.20 | 2.00100 | 29.14 |
| 16 | −72.101 | Variable | | |
| 17* | 58.976 | 1.20 | 1.88202 | 37.22 |
| 18* | 23.004 | Variable | | |
| 19 | 35.206 | 1.50 | 1.85478 | 24.80 |
| 20 | 21.523 | 7.64 | 1.69350 | 53.21 |
| 21* | −23.391 | Variable | | |
| 22 | −89.135 | 1.50 | 1.85478 | 24.80 |
| 23 | −355.544 | 10.81 | | |
| 24 | ∞ | 2.66 | 1.51633 | 64.14 |
| 25 | ∞ | 1.00 | | |
| Image plane | ∞ | | | |

Aspherical surface data

3rd surface k = 0.000
A4 = 4.11853e−05, A6 = −5.16604e−07, A8 = 1.05864e−09

4th surface k = 0.000
A4 = 4.38670e−05, A6 = −6.01995e−07, A8 = −1.18982e−10

-continued

Unit mm

17th surface k = 0.000
A4 = −8.15788e−06, A6 = 1.62936e−07, A8 = −2.77428e−10

18th surface k = 0.000
A4 = −5.38507e−06, A6 = 1.41312e−07, A8 = −6.87814e−11

21th surface k = 0.000
A4 = 3.31222e−05, A6 = −3.47713e−08, A8 = 4.91193e−11

Various data

| | |
|---|---|
| f | 14.43 |
| FNO. | 1.28 |
| 2ω | 82.67 |
| IH | 11.15 |
| FB (in air) | 13.57 |
| LTL (in air) | 86.94 |

| | Infinity | Close distance |
|---|---|---|
| d16 | 2.10 | 4.37 |
| d18 | 7.69 | 5.40 |
| d21 | 2.31 | 2.33 |

Unit focal length

| | | | | |
|---|---|---|---|---|
| f1 = −36.39 | f2 = 21.52 | f3 = −43.44 | f4-1 = 22.87 | f4-2 = −139.53 |

Example 17

Unit mm

Surface data

| Surface no. | r | d | nd | vd |
|---|---|---|---|---|
| Object plane | ∞ | ∞ | | |
| 1 | 56.666 | 1.50 | 1.48749 | 70.23 |
| 2 | 17.381 | 4.00 | | |
| 3* | 26.130 | 1.50 | 1.49700 | 81.61 |
| 4* | 14.593 | 5.45 | | |
| 5 | 36.407 | 5.70 | 2.00100 | 29.14 |
| 6 | −43.000 | 1.07 | 1.51633 | 64.14 |
| 7 | 17.284 | 6.73 | | |
| 8 | −16.026 | 1.20 | 1.85478 | 24.80 |
| 9 | 31.874 | 5.80 | 1.72916 | 54.68 |
| 10 | −24.566 | 1.40 | | |
| 11(Stop) | ∞ | 1.00 | | |
| 12 | 74.674 | 5.36 | 2.00100 | 29.14 |
| 13 | −35.918 | 0.40 | | |
| 14 | 38.381 | 7.78 | 1.49700 | 81.61 |
| 15 | −21.723 | 1.20 | 2.00100 | 29.14 |
| 16 | −51.835 | Variable | | |
| 17* | −876.835 | 1.90 | 1.49700 | 81.61 |
| 18 | 4834.356 | 1.01 | 1.88202 | 37.22 |
| 19* | 34.099 | Variable | | |
| 20* | 26.746 | 7.90 | 1.59201 | 67.02 |
| 21* | −19.467 | Variable | | |
| 22 | −101.033 | 1.50 | 1.85478 | 24.80 |
| 23 | 665.463 | 11.44 | | |
| 24 | ∞ | 2.66 | 1.51633 | 64.14 |
| 25 | ∞ | 1.00 | | |
| Image plane | ∞ | | | |

-continued

Unit mm

Aspherical surface data

3rd surface k = 0.000
A4 = 3.02491e−05, A6 = −2.96892e−07, A8 = 7.24372e−10

4th surface k = 0.000
A4 = 2.08903e−05, A6 = −3.62573e−07, A8 = −1.14396e−10

17th surface k = 0.000
A4 = 4.34401e−05, A6 = −7.16017e−08, A8 = 2.37592e−10

19th surface k = 0.000
A4 = 2.76916e−05, A6 = −1.05004e−08, A8 = 3.38439e−11

20th surface k = 0.000
A4 = −1.95186e−05, A6 = 2.00819e−08, A8 = −8.54673e−12

21th surface k = 0.000
A4 = 4.36333e−05, A6 = −5.29835e−08, A8 = 2.29440e−10

Various data

| | |
|---|---|
| f | 14.43 |
| FNO. | 1.28 |
| 2ω | 80.38 |
| IH | 11.15 |
| FB (in air) | 14.19 |
| LTL (in air) | 87.58 |

| | Infinity | Close distance |
|---|---|---|
| d16 | 2.10 | 3.56 |
| d19 | 6.79 | 4.14 |
| d21 | 2.10 | 3.29 |

Unit focal length

| | | | | |
|---|---|---|---|---|
| f1 = −42.06 | f2 = 22.59 | f3 = −37.91 | f4-1 = 20.32 | f4-2 = −102.53 |

Example 18

Unit mm

Surface data

| Surface no. | r | d | nd | vd |
|---|---|---|---|---|
| Object plane | ∞ | ∞ | | |
| 1 | 45.929 | 1.50 | 1.48749 | 70.23 |
| 2 | 17.901 | 4.00 | | |
| 3* | 24.421 | 1.50 | 1.49700 | 81.61 |
| 4* | 14.462 | 5.17 | | |
| 5 | 52.566 | 1.50 | 1.43700 | 95.00 |
| 6 | 28.072 | 5.41 | 2.00100 | 29.14 |
| 7 | −71.603 | 1.00 | 1.51633 | 64.14 |
| 8 | 15.139 | 7.33 | | |
| 9 | −18.586 | 1.20 | 1.85478 | 24.80 |
| 10 | 21.871 | 5.95 | 1.72916 | 54.68 |
| 11 | −29.638 | 1.40 | | |
| 12(Stop) | ∞ | 1.00 | | |
| 13 | 94.121 | 5.54 | 2.00100 | 29.14 |
| 14 | −29.643 | 0.40 | | |
| 15 | 27.732 | 7.76 | 1.49700 | 81.61 |
| 16 | −24.212 | 1.20 | 2.00100 | 29.14 |
| 17 | −99.919 | Variable | | |
| 18* | 65.587 | 1.20 | 1.88202 | 37.22 |

-continued

Unit mm

| | | | | |
|---|---|---|---|---|
| 19* | 24.192 | Variable | | |
| 20* | 32.429 | 7.04 | 1.59201 | 67.02 |
| 21* | −18.988 | Variable | | |
| 22 | −70.072 | 1.50 | 1.85478 | 24.80 |
| 23 | −618.266 | 11.44 | | |
| 24 | ∞ | 2.66 | 1.51633 | 64.14 |
| 25 | ∞ | 1.00 | | |
| Image plane | ∞ | | | |

Aspherical surface data

3rd surface $k = 0.000$
$A4 = 1.85778e{-}05, A6 = -2.66707e{-}07, A8 = 5.45926e{-}10$ 4th surface $k = 0.000$
$A4 = 1.59076e{-}05, A6 = -3.30881e{-}07, A8 = -4.15775e{-}11$ 18th surface $k = 0.000$
$A4 = 2.16423e{-}05, A6 = -8.58061e{-}09, A8 = -1.86603e{-}11$ 19th surface $k = 0.000$
$A4 = 2.63675e{-}05, A6 = 2.34271e{-}08, A8 = -1.58562e{-}10$ 20th surface $k = 0.000$
$A4 = -8.13151e{-}06, A6 = 3.39928e{-}08, A8 = -5.41088e{-}11$ 21th surface $k = 0.000$
$A4 = 4.56091e{-}05, A6 = -3.72661e{-}08, A8 = 2.01968e{-}10$ Various data

| | |
|---|---|
| f | 14.43 |
| FNO. | 1.29 |
| 2ω | 82.81 |
| IH | 11.15 |
| FB (in air) | 14.20 |
| LTL (in air) | 87.58 |

| | Infinity | Close distance |
|---|---|---|
| d17 | 2.10 | 4.61 |
| d19 | 7.58 | 4.10 |
| d21 | 2.10 | 3.07 |

Unit focal length f1 = −34.20   f2 = 21.41   f3 = −44.06   f4-1 = 21.31   f4-2 = −92.57

Example 19

Unit mm

Surface data

| Surface no. | r | d | nd | vd |
|---|---|---|---|---|
| Object plane | ∞ | ∞ | | |
| 1 | 45.008 | 1.50 | 1.48749 | 70.23 |
| 2 | 17.046 | 4.00 | | |
| 3* | 22.438 | 1.50 | 1.49700 | 81.61 |
| 4* | 13.681 | 4.48 | | |
| 5 | 34.466 | 4.65 | 2.00100 | 29.14 |
| 6 | −62.294 | 1.00 | 1.72916 | 54.68 |
| 7 | 19.420 | 6.87 | | |
| 8 | −14.340 | 1.20 | 1.85478 | 24.80 |
| 9 | 95.953 | 5.47 | 1.72916 | 54.68 |

-continued

Unit mm

| | | | | |
|---|---|---|---|---|
| 10 | −22.600 | 0.40 | | |
| 11 | 293.755 | 5.06 | 2.00100 | 29.14 |
| 12 | −29.371 | 0.40 | | |
| 13 | 39.907 | 7.06 | 1.72916 | 54.68 |
| 14 | −24.360 | 1.20 | 2.00100 | 29.14 |
| 15 | −106.741 | 1.00 | | |
| 16(Stop) | ∞ | Variable | | |
| 17* | 59.258 | 1.20 | 1.88202 | 37.22 |
| 18* | 22.886 | Variable | | |
| 19* | 33.671 | 6.24 | 1.49700 | 81.61 |
| 20* | −22.429 | Variable | | |
| 21 | 288.426 | 1.50 | 1.85478 | 24.80 |
| 22 | 42.487 | 3.57 | 1.72916 | 54.68 |
| 23 | −112.933 | 11.29 | | |
| 24 | ∞ | 2.66 | 1.51633 | 64.14 |
| 25 | ∞ | 1.00 | | |
| Image plane | ∞ | | | |

Aspherical surface data

3rd surface $k = 0.000$
$A4 = 5.55439e{-}05, A6 = -3.89810e{-}07, A8 = 7.66562e{-}10$ 4th surface $k = 0.000$
$A4 = 5.44310e{-}05, A6 = -4.20176e{-}07, A8 = -3.46582e{-}10$ 17th surface $k = 0.000$
$A4 = -4.48820e{-}06, A6 = 1.23396e{-}07, A8 = -3.36602e{-}10$ 18th surface $k = 0.000$
$A4 = -5.47399e{-}07, A6 = 1.13967e{-}07, A8 = -2.33908e{-}10$ 19th surface $k = 0.000$
$A4 = -9.41048e{-}06, A6 = 1.43643e{-}08, A8 = -5.00206e{-}11$ 20th surface $k = 0.000$
$A4 = 2.60519e{-}05, A6 = -2.74315e{-}08, A8 = 5.37828e{-}11$ Various data

| | |
|---|---|
| f | 14.43 |
| FNO. | 1.28 |
| 2ω | 82.68 |
| IH | 11.15 |
| FB (in air) | 14.04 |
| LTL (in air) | 87.19 |

| | Infinity | Close distance |
|---|---|---|
| d16 | 4.10 | 7.52 |
| d18 | 8.66 | 4.51 |
| d20 | 2.10 | 2.83 |

Unit focal length f1 = −27.14   f2 = 20.91   f3 = −42.94   f4-1 = 28.13   f4-2 = 154.92

Example 20

Unit mm

Surface data

| Surface no. | r | d | nd | νd |
|---|---|---|---|---|
| Object plane | ∞ | ∞ | | |
| 1 | 45.021 | 1.50 | 1.48749 | 70.23 |
| 2 | 17.089 | 4.00 | | |
| 3* | 25.009 | 1.50 | 1.49700 | 81.61 |
| 4* | 14.482 | 3.93 | | |
| 5 | 36.203 | 1.50 | 1.49700 | 81.61 |
| 6 | 29.038 | 5.10 | 2.00100 | 29.14 |
| 7 | −64.681 | 1.00 | 1.72916 | 54.68 |
| 8 | 18.777 | 8.10 | | |
| 9 | −15.448 | 1.20 | 1.85478 | 24.80 |
| 10 | 60.925 | 5.60 | 1.72916 | 54.68 |
| 11 | −24.189 | 0.40 | | |
| 12 | 161.297 | 5.43 | 2.00100 | 29.14 |
| 13 | −30.080 | 0.40 | | |
| 14 | 35.296 | 7.27 | 1.72916 | 54.68 |
| 15 | −23.379 | 1.20 | 2.00100 | 29.14 |
| 16 | −208.117 | 1.00 | | |
| 17(Stop) | ∞ | Variable | | |
| 18* | 58.508 | 1.20 | 1.88202 | 37.22 |
| 19* | 21.535 | Variable | | |
| 20* | 24.696 | 7.37 | 1.49700 | 81.61 |
| 21* | −18.101 | Variable | | |
| 22 | −362.491 | 1.50 | 1.85478 | 24.80 |
| 23 | 416.627 | 11.64 | | |
| 24 | ∞ | 2.66 | 1.51633 | 64.14 |
| 25 | ∞ | 1.00 | | |
| Image plane | ∞ | | | |

Aspherical surface data

3rd surface k = 0.000
A4 = 1.42673e−05, A6 = −2.24438e−07, A8 = 5.04218e−10

4th surface k = 0.000
A4 = 6.33957e−06, A6 = −3.06182e−07, A8 = −2.98886e−11

18th surface k = 0.000
A4 = −7.37564e−07, A6 = 9.60938e−08, A8 = −5.21069e−10

19th surface k = 0.000
A4 = 1.50414e−06, A6 = 1.34443e−07, A8 = −7.72431e−10

20th surface k = 0.000
A4 = −2.05785e−05, A6 = 3.65249e−08, A8 = −6.84573e−11

21th surface k = 0.000
A4 = 4.62016e−05, A6 = −5.24478e−08, A8 = 3.27114e−10

Various data

| | |
|---|---|
| f | 14.43 |
| FNO. | 1.29 |
| 2ω | 82.84 |
| IH | 11.15 |
| FB (in air) | 14.39 |
| LTL (in air) | 87.65 |

| | Infinity | Close distance |
|---|---|---|
| d17 | 4.10 | 7.40 |
| d19 | 7.87 | 4.21 |
| d21 | 2.10 | 2.46 |

Unit focal length f1 = −27.46   f2 = 20.87   f3 = −39.23   f4-1 = 22.29   f4-2 = −226.57

Next, values of conditional expressions (1) to (11) and (A) to (H) in each example are given below. '−' (hyphen) indicates that there is no corresponding value.

| Conditional expression | Example 1 | Example 2 | Example 3 |
|---|---|---|---|
| (1) $M_{4\#3G}/M_{4\#4G}$ | 4.929 | 5.930 | 8.469 |
| (2) $(R_{N1F} + R_{N1R})/(R_{N1F} - R_{N1R})$ | 1.814 | 1.662 | 1.751 |
| (3) $(R_{3GF} + R_{3GR})/(R_{3GF} - R_{3GR})$ | 1.828 | 0.785 | 1.403 |
| (4) $f_{3G}/f_{4G}$ | −1.421 | −1.865 | −1.189 |
| (5) $(R_{NGR} + R_{C2F})/(R_{NGR} - R_{C2F})$ | −0.408 | −0.310 | 0.791 |
| (6) $(R_{P1F} + R_{P1R})/(R_{P1F} - R_{P1R})$ | 0.389 | 0.215 | 0.210 |
| (7) $(R_{C2F} + R_{C2R})/(R_{C2F} - R_{C2R})$ | −8.853 | −11.817 | 2.112 |
| (8) $(R_{C1F} + R_{C1R})/(R_{C1F} - R_{C1R})$ | 3.288 | 2.511 | −1.101 |
| (9) $(R_{NGF} + R_{NGR})/(R_{NGF} - R_{NGR})$ | 1.982 | 1.440 | −1.080 |
| (10) $(R_{P2F} + R_{P2R})/(R_{P2F} - R_{P2R})$ | 0.430 | 0.426 | 0.489 |
| (11) $FB/f_R$ | 1.526 | 1.451 | 1.562 |
| (A) $f/e_{N1F}$ | 0.320 | 0.290 | 0.373 |
| (B) $(f/e_{AS})/Fno$ | 0.40 | 0.43 | 0.42 |
| (C) $T_{air\_max}/\Sigma d$ | 0.09 | 0.15 | 0.14 |
| (D) $(R_{F1F} + R_{F1R})/(R_{F1F} - R_{F1R})$ | — | — | — |
| (E) $M_{F1}/f$ | — | — | — |
| (F) $M_{F2}/M_{F1}$ | — | — | — |
| (G) $f_{F1}/f_{F2}$ | — | — | — |
| (H) $\beta_{F1}/\beta_{F2}$ | — | — | — |

| Conditional expression | Example 4 | Example 5 | Example 6 |
|---|---|---|---|
| (1) $M_{4\#3G}/M_{4\#4G}$ | 6.195 | 6.925 | 9.275 |
| (2) $(R_{N1F} + R_{N1R})/(R_{N1F} - R_{N1R})$ | 2.396 | 1.987 | 1.525 |
| (3) $(R_{3GF} + R_{3GR})/(R_{3GF} - R_{3GR})$ | 0.891 | 1.529 | 1.608 |
| (4) $f_{3G}/f_{4G}$ | −1.731 | −1.484 | −1.2941 |
| (5) $(R_{NGR} + R_{C2F})/(R_{NGR} - R_{C2F})$ | −0.272 | −0.164 | 0.878 |
| (6) $(R_{P1F} + R_{P1R})/(R_{P1F} - R_{P1R})$ | 0.301 | 0.503 | 0.438 |
| (7) $(R_{C2F} + R_{C2R})/(R_{C2F} - R_{C2R})$ | −12.376 | −4.037 | −17.643 |

-continued

| | | | |
|---|---|---|---|
| (8) $(R_{C1F} + R_{C1R})/(R_{C1F} - R_{C1R})$ | 2.087 | 2.222 | −1.1901 |
| (9) $(R_{NGF} + R_{NGR})/(R_{NGF} - R_{NGR})$ | 1.971 | 1.756 | −1.338 |
| (10) $(R_{P2F} + R_{P2R})/(R_{P2F} - R_{P2R})$ | 0.431 | 0.428 | 0.422 |
| (11) $FB/f_R$ | 1.375 | 1.455 | 1.499 |
| (A) $f/e_{N1F}$ | 0.329 | 0.378 | 0.508 |
| (B) $(f/e_{AS})/Fno$ | 0.45 | 0.49 | 0.49 |
| (C) $T_{air\_max}/\Sigma d$ | 0.12 | 0.10 | 0.10 |
| (D) $(R_{F1F} + R_{F1R})/(R_{F1F} - R_{F1R})$ | — | — | — |
| (E) $M_{F1}/f$ | — | — | — |
| (F) $M_{F2}/M_{F1}$ | — | — | — |
| (G) $f_{F1}/f_{F2}$ | — | — | — |
| (H) $\beta_{F1}/\beta_{F2}$ | — | — | — |

| Conditional expression | Example 7 | Example 8 | Example 9 |
|---|---|---|---|
| (1) $M_{4\#3G}/M_{4\#4G}$ | 8.271 | 5.945 | 6.042 |
| (2) $(R_{N1F} + R_{N1R})/(R_{N1F} - R_{N1R})$ | 1.007 | 2.011 | 1.568 |
| (3) $(R_{3GF} + R_{3GR})/(R_{3GF} - R_{3GR})$ | 2.141 | 2.710 | 2.050 |
| (4) $f_{3G}/f_{4G}$ | −1.741 | −1.341 | −1.228 |
| (5) $(R_{NGR} + R_{C2F})/(R_{NGR} - R_{C2F})$ | −0.059 | 0.212 | −0.035 |
| (6) $(R_{P1F} + R_{P1R})/(R_{P1F} - R_{P1R})$ | 0.417 | 0.571 | 0.500 |
| (7) $(R_{C2F} + R_{C2R})/(R_{C2F} - R_{C2R})$ | −7.823 | 29.563 | −6.993 |
| (8) $(R_{C1F} + R_{C1R})/(R_{C1F} - R_{C1R})$ | 3.669 | 13.081 | 3.970 |
| (9) $(R_{NGF} + R_{NGR})/(R_{NGF} - R_{NGR})$ | 1.005 | 8.516 | 1.305 |
| (10) $(R_{P2F} + R_{P2R})/(R_{P2F} - R_{P2R})$ | 0.370 | 0.389 | 0.572 |
| (11) $FB/f_R$ | 1.277 | 1.374 | 1.358 |
| (A) $f/e_{N1F}$ | 0.484 | 0.670 | 0.638 |
| (B) $(f/e_{AS})/Fno$ | 0.55 | 0.55 | 0.72 |
| (C) $T_{air\_max}/\Sigma d$ | 0.13 | 0.11 | 0.15 |
| (D) $(R_{F1F} + R_{F1R})/(R_{F1F} - R_{F1R})$ | — | — | — |
| (E) $M_{F1}/f$ | — | — | — |
| (F) $M_{F2}/M_{F1}$ | — | — | — |
| (G) $f_{F1}/f_{F2}$ | — | — | — |
| (H) $\beta_{F1}/\beta_{F2}$ | — | — | — |

| Conditional expression | Example 10 | Example 11 | Example 12 |
|---|---|---|---|
| (1) $M_{4\#3G}/M_{4\#4G}$ | 63.645 | 24.404 | 11.613 |
| (2) $(R_{N1F} + R_{N1R})/(R_{N1F} - R_{N1R})$ | 2.075 | 2.316 | 2.281 |
| (3) $(R_{3GF} + R_{3GR})/(R_{3GF} - R_{3GR})$ | 1.565 | 1.134 | 0.779 |
| (4) $f_{3G}/f_{4G}$ | −1.538 | −1.335 | −1.713 |
| (5) $(R_{NGR} + R_{C2F})/(R_{NGR} - R_{C2F})$ | −0.065 | −0.159 | −0.228 |
| (6) $(R_{P1F} + R_{P1R})/(R_{P1F} - R_{P1R})$ | 0.179 | 0.282 | 0.275 |
| (7) $(R_{C2F} + R_{C2R})/(R_{C2F} - R_{C2R})$ | −7.148 | −4.471 | −9.888 |
| (8) $(R_{C1F} + R_{C1R})/(R_{C1F} - R_{C1R})$ | 8.863 | 6.410 | 5.280 |
| (9) $(R_{NGF} + R_{NGR})/(R_{NGF} - R_{NGR})$ | 3.193 | 2.158 | 2.158 |
| (10) $(R_{P2F} + R_{P2R})/(R_{P2F} - R_{P2R})$ | 0.195 | 0.294 | 0.313 |
| (11) $FB/f_R$ | 1.593 | 1.389 | 1.483 |
| (A) $f/e_{N1F}$ | 0.535 | 0.292 | 0.294 |
| (B) $(f/e_{AS})/Fno$ | 0.63 | 0.43 | 0.44 |
| (C) $T_{air\_max}/\Sigma d$ | 0.13 | 0.10 | 0.10 |
| (D) $(R_{F1F} + R_{F1R})/(R_{F1F} - R_{F1R})$ | — | — | — |
| (E) $M_{F1}/f$ | — | — | — |
| (F) $M_{F2}/M_{F1}$ | — | — | — |
| (G) $f_{F1}/f_{F2}$ | — | — | — |
| (H) $\beta_{F1}/\beta_{F2}$ | — | — | — |

| Conditional expression | Example 13 | Example 14 | Example 15 |
|---|---|---|---|
| (1) $M_{4\#3G}/M_{4\#4G}$ | 18.221 | 14.28 | 12.75 |
| (2) $(R_{N1F} + R_{N1R})/(R_{N1F} - R_{N1R})$ | 1.630 | 1.441 | 2.528 |
| (3) $(R_{3GF} + R_{3GR})/(R_{3GF} - R_{3GR})$ | 0.362 | 1.906425 | 2.061199 |
| (4) $f_{3G}/f_{4G}$ | −1.318 | −1.66 | −1.70 |
| (5) $(R_{NGR} + R_{C2F})/(R_{NGR} - R_{C2F})$ | −0.085 | −0.142 | −0.142 |
| (6) $(R_{P1F} + R_{P1R})/(R_{P1F} - R_{P1R})$ | 0.503 | 0.493 | 0.521 |
| (7) $(R_{C2F} + R_{C2R})/(R_{C2F} - R_{C2R})$ | −20.450 | −4.352 | −4.072 |
| (8) $(R_{C1F} + R_{C1R})/(R_{C1F} - R_{C1R})$ | 1.429 | 2.969 | 3.854 |
| (9) $(R_{NGF} + R_{NGR})/(R_{NGF} - R_{NGR})$ | 1.862 | 1.357 | 2.263 |
| (10) $(R_{P2F} + R_{P2R})/(R_{P2F} - R_{P2R})$ | 0.333 | 0.227 | 0.256 |
| (11) $FB/f_R$ | 1.613 | 1.48548 | 1.473651 |
| (A) $f/e_{N1F}$ | 0.384 | 0.408 | 0.434 |
| (B) $(f/e_{AS})/Fno$ | 0.43 | 0.48 | 0.48 |
| (C) $T_{air\_max}/\Sigma d$ | 0.11 | 0.12 | 0.12 |
| (D) $(R_{F1F} + R_{F1R})/(R_{F1F} - R_{F1R})$ | — | — | — |
| (E) $M_{F1}/f$ | — | −0.10979 | −0.21327 |
| (F) $M_{F2}/M_{F1}$ | — | 0.67446 | 0.335847 |
| (G) $f_{F1}/f_{F2}$ | — | −1.93581 | −1.99379 |
| (H) $\beta_{F1}/\beta_{F2}$ | — | 15.99804 | 14.3338 |

-continued

| Conditional expression | Example 16 | Example 17 | Example 18 |
|---|---|---|---|
| (1) $M_{4\#3G}/M_{4\#4G}$ | 11.40 | 27.78 | 11.87 |
| (2) $(R_{N1F} + R_{N1R})/(R_{N1F} - R_{N1R})$ | 1.920 | 1.885 | 2.277 |
| (3) $(R_{3GF} + R_{3GR})/(R_{3GF} - R_{3GR})$ | 2.279022 | 0.925135 | 2.168831 |
| (4) $f_{3G}/f_{4G}$ | −1.65 | −1.58 | −1.67 |
| (5) $(R_{NGR} + R_{C2F})/(R_{NGR} - R_{C2F})$ | −0.032 | 0.038 | −0.102 |
| (6) $(R_{P1F} + R_{P1R})/(R_{P1F} - R_{P1R})$ | 0.476 | 0.350 | 0.521 |
| (7) $(R_{C2F} + R_{C2R})/(R_{C2F} - R_{C2R})$ | −4.342 | −4.754 | −4.363 |
| (8) $(R_{C1F} + R_{C1R})/(R_{C1F} - R_{C1R})$ | 2.195 | 2.808 | 1.809 |
| (9) $(R_{NGF} + R_{NGR})/(R_{NGF} - R_{NGR})$ | 1.970 | 1.878 | 1.983 |
| (10) $(R_{P2F} + R_{P2R})/(R_{P2F} - R_{P2R})$ | — | 0.158 | 0.261418 |
| (11) $FB/f_R$ | 1.526641 | 1.443658 | 1.430832 |
| (A) $f/e_{N1F}$ | 0.417 | 0.398 | 0.397 |
| (B) $(f/e_{AS})/Fno$ | 0.48 | 0.49 | 0.48 |
| (C) $T_{air\_max}/\Sigma d$ | 0.10 | 0.09 | 0.10 |
| (D) $(R_{F1F} + R_{F1R})/(R_{F1F} - R_{F1R})$ | — | — | — |
| (E) $M_{F1}/f$ | −0.15693 | −0.10074 | −0.17413 |
| (F) $M_{F2}/M_{F1}$ | 0.010212 | 0.817175 | 0.386393 |
| (G) $f_{F1}/f_{F2}$ | −1.89977 | −1.86532 | −2.06692 |
| (H) $\beta_{F1}/\beta_{F2}$ | 12.60128 | 31.81157 | 13.80481 |

| Conditional expression | Example 19 | Example 20 |
|---|---|---|
| (1) $M_{4\#3G}/M_{4\#4G}$ | 19.63 | 23.39 |
| (2) $(R_{N1F} + R_{N1R})/(R_{N1F} - R_{N1R})$ | 2.219 | 2.224 |
| (3) $(R_{3GF} + R_{3GR})/(R_{3GF} - R_{3GR})$ | 2.258439 | 2.164926 |
| (4) $f_{3G}/f_{4G}$ | −1.74 | −1.62 |
| (5) $(R_{NGR} + R_{C2F})/(R_{NGR} - R_{C2F})$ | 0.150 | 0.097 |
| (6) $(R_{P1F} + R_{P1R})/(R_{P1F} - R_{P1R})$ | 0.818 | 0.686 |
| (7) $(R_{C2F} + R_{C2R})/(R_{C2F} - R_{C2R})$ | −4.472 | −4.534 |
| (8) $(R_{C1F} + R_{C1R})/(R_{C1F} - R_{C1R})$ | 3.581 | 3.155 |
| (9) $(R_{NGF} + R_{NGR})/(R_{NGF} - R_{NGR})$ | 2.518 | 2.431 |
| (10) $(R_{P2F} + R_{P2R})/(R_{P2F} - R_{P2R})$ | 0.200 | 0.154096 |
| (11) $FB/f_R$ | 1.5411 | 1.488454 |
| (A) $f/e_{N1F}$ | 0.421 | 0.416 |
| (B) $(f/e_{AS})/Fno$ | 0.52 | 0.53 |
| (C) $T_{air\_max}/\Sigma d$ | 0.12 | 0.11 |
| (D) $(R_{F1F} + R_{F1R})/(R_{F1F} - R_{F1R})$ | — | — |
| (E) $M_{F1}/f$ | −0.23714 | −0.22889 |
| (F) $M_{F2}/M_{F1}$ | 0.212545 | 0.108066 |
| (G) $f_{F1}/f_{F2}$ | −1.52664 | −1.76011 |
| (H) $\beta_{F1}/\beta_{F2}$ | 17.80602 | 24.91853 |

The optical apparatus of the present embodiment includes an image pickup apparatus and a projection apparatus. Concrete examples of the image pickup apparatus and the projection apparatus will be described below.

Figure 21:
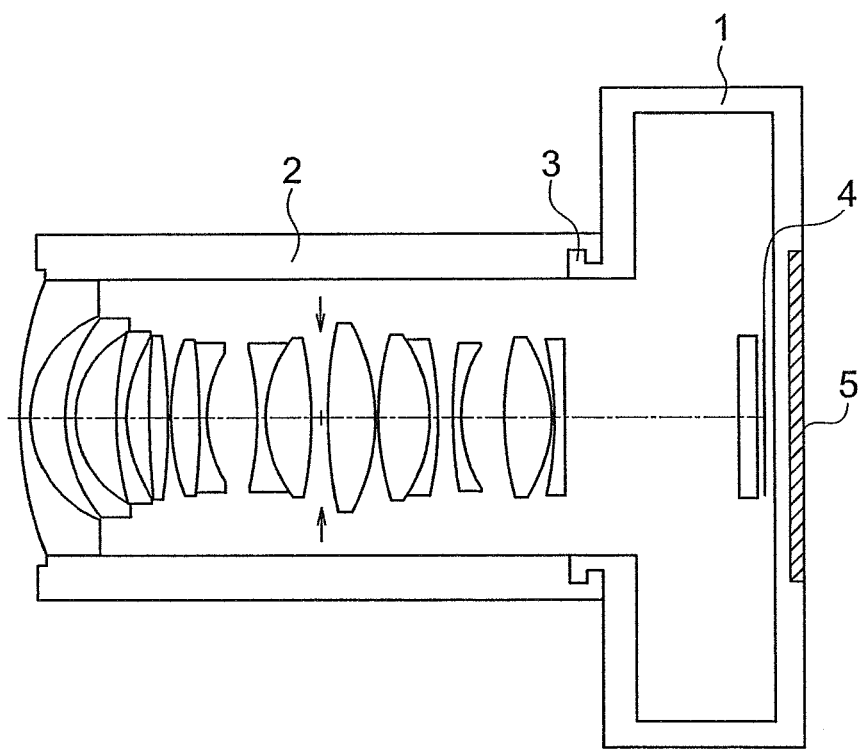
FIG. 21 is a cross-sectional view of an image pickup apparatus.

FIG. 21 is a cross-sectional view of a single-lens mirrorless camera as an electronic image pickup apparatus. In FIG. 21, a photographic optical system 2 is disposed inside a lens barrel of a single-lens mirrorless camera 1. A mount portion 3 enables the photographic optical system 2 to be detachable from a body of the single-lens mirrorless camera 1. As the mount portion 3, a mount such as a screw-type mount and a bayonet-type mount is to be used. In this example, a bayonet-type mount is used. Moreover, an image pickup element surface 4 and a back monitor 5 are disposed in the body of the single-lens mirrorless camera 1. As an image pickup element, an element such as a small-size CCD (charge coupled device) or a CMOS (complementary metal-oxide semiconductor) is to be used.

Moreover, as the photographic optical system 2 of the single-lens mirrorless camera 1, the imaging optical system described in any one of the examples from the first example to the twentieth example is to be used.

Figure 22:
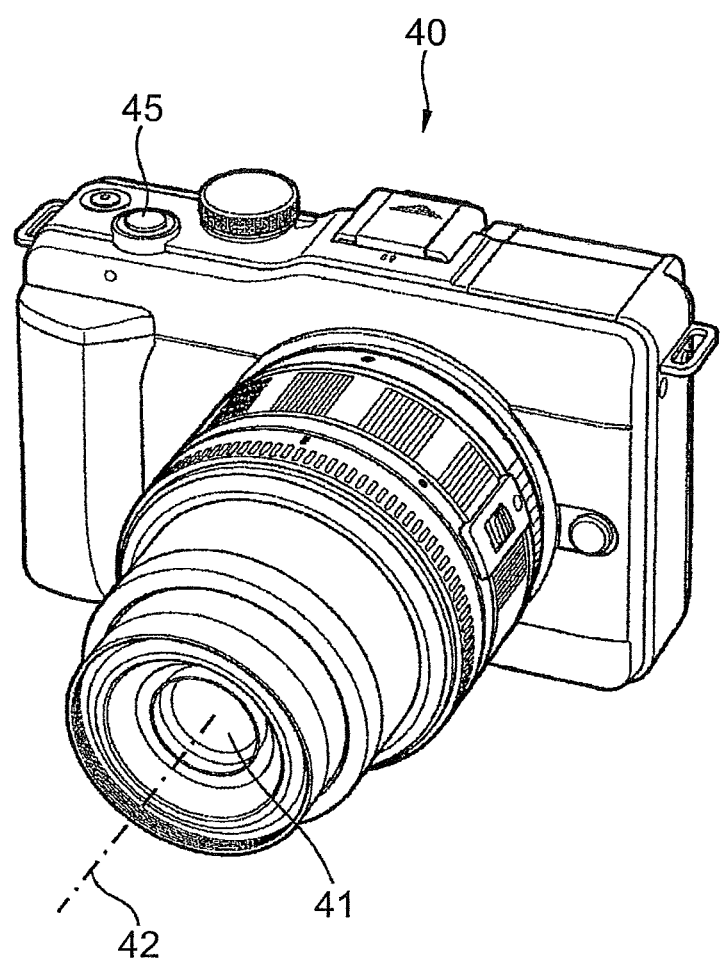
FIG. 22 is a front perspective view illustrating the appearance of the image pickup apparatus.
Figure 23:
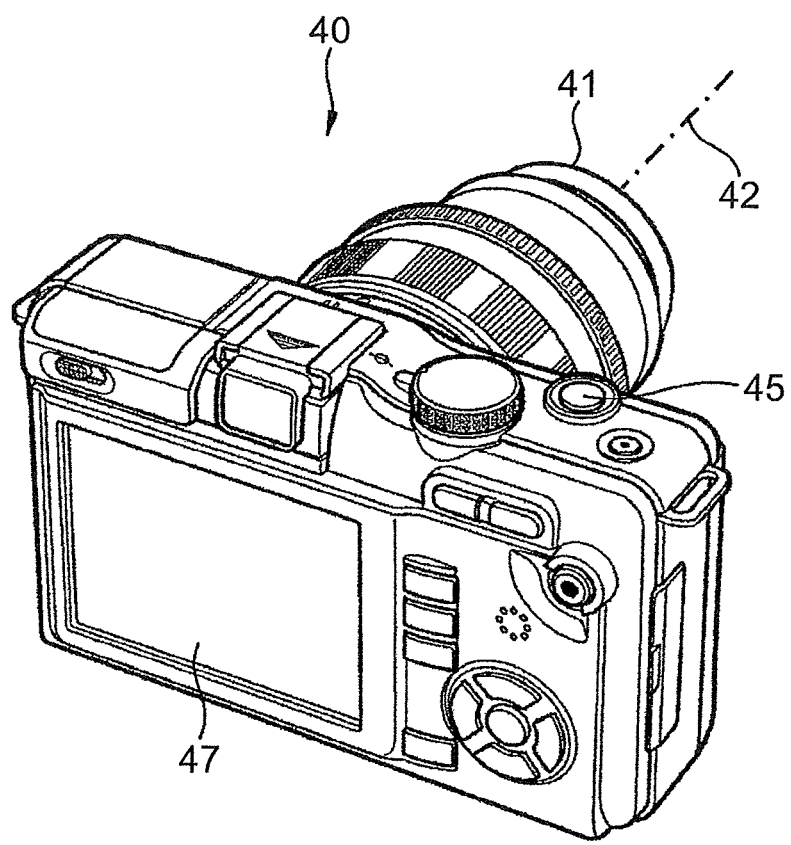
FIG. 23 is a rear perspective view of the image pickup apparatus.

FIG. 22 and FIG. 23 are conceptual diagrams of an arrangement of the image pickup apparatus. FIG. 22 is a front perspective view of a digital camera 40 as the image pickup apparatus, and FIG. 23 is a rear perspective view of the digital camera 40. The imaging optical system shown in any one of the examples from the first example to the twentieth example is used in a photographic optical system 41 of the digital camera 40.

The digital camera 40 according to the present embodiment includes the photographic optical system 41 which is positioned in a photographic optical path 42, a shutter button 45, and a liquid-crystal display monitor 47. As the shutter button 45 disposed on an upper portion of the digital camera 40 is pressed, in conjunction with the pressing of the shutter button 45, photography is carried out by the photographic optical system 41 such as the imaging optical system according to the first example. An object image which is formed by the photographic optical system 41 is formed on an image pickup element (photoelectric conversion surface) which is provided near an image forming surface. The object image which has been received optically by the image pickup element is displayed on the liquid-crystal display monitor 47 which is provided to a rear surface of the camera, as an electronic image by a processing means. Moreover, it is possible to record the electronic image which has been photographed, in a storage means.

Figure 24:
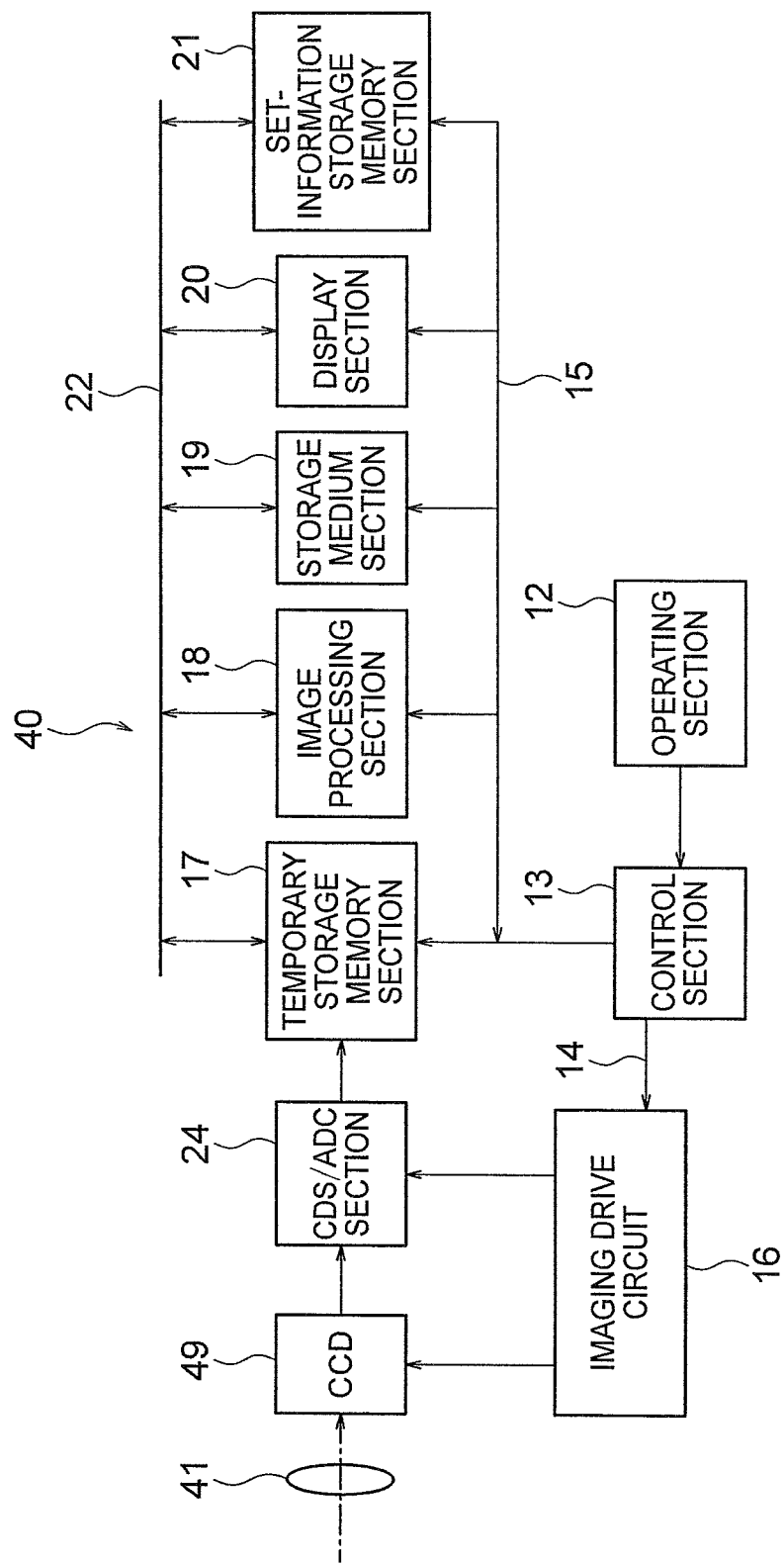
FIG. 24 is a structural block diagram showing an internal circuit of main components of the image pickup apparatus.

FIG. 24 is a structural block diagram of an internal circuit of main components of the digital camera 40. In the following description, the processing means described above includes for instance, a CDS/ADC section 24, a temporary storage memory 117, and an image processing section 18, and a storage means consists of a storage medium section 19 for example.

As shown in FIG. 24, the digital camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and informs the control section 13 of event information which is input from outside (by a user of the digital camera) via these input buttons and switches. The control section 13 is a central processing unit (CPU), and has a built-in computer program memory which is not shown in the diagram. The control section 13 controls the entire digital camera 40 according to a computer program stored in this computer program memory.

The CCD 49 is driven and controlled by the imaging drive circuit 16, and which converts an amount of light for each pixel of the object image formed by the photographic optical system 41 to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as '° RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 records and maintains the RAW data transferred from the temporary storage memory 17 and image data subjected to image processing in the image processing section 18 in the card flash memory and the stick flash memory.

The display section 20 includes the liquid-crystal display monitor, and displays photographed RAW data, image data and operation menu on the liquid-crystal display monitor. The set-information storage memory section 21 includes a ROM section in which various image quality parameters are stored in advance, and a RAM section which stores image quality parameters which are selected by an input operation on the operating section 12, from among the image quality parameters which are read from the ROM section.

In the single-lens mirrorless camera 40 in which such an arrangement is made, by adopting the imaging optical system according to the present invention as the photographing optical system 41, it is possible to capture an image in a wide photography range with low noise at high resolution. Moreover, it is possible to use the imaging optical system according to the present invention in an image pickup apparatus of a type having a quick-return mirror.

Figure 25:
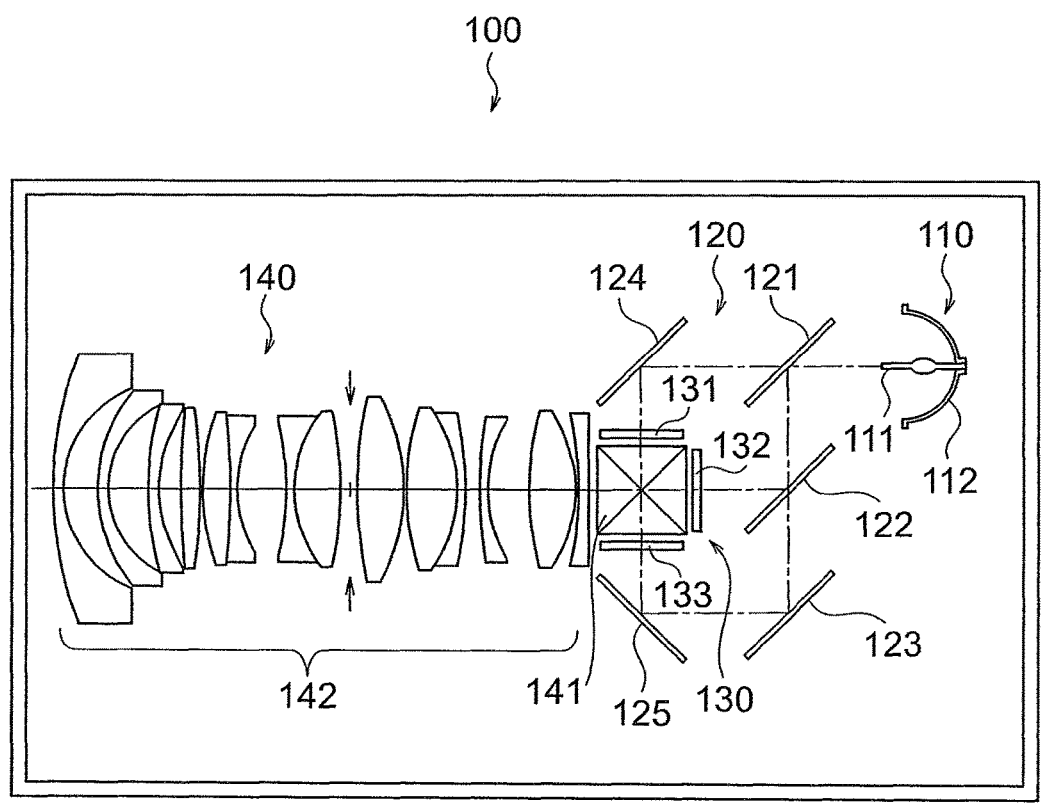
FIG. 25 is a sectional view of a projection apparatus.

FIG. 25 is a sectional view of a projector as a projection apparatus. As illustrated in FIG. 25, a projector 100 includes a light source unit 110, an illumination unit 120, an image forming unit 130, and a projection unit 140.

The light source unit 110 includes a light source 111 and a reflective member 112. Illumination light is emitted from the light source 111. The illumination light is white light. The illumination light is reflected by the reflective member 112 and enters the illumination unit 120.

The illumination unit 120 includes a first dichroic mirror 121, a second dichroic mirror 122, a third dichroic mirror 123, a first reflective member 124, and a second reflective member 125.

In the first dichroic mirror 121, light in the red wavelength range (hereinafter referred to as "red light") is transmitted, and light in the other wavelength ranges is reflected. In the second dichroic mirror 122, light in the green wavelength range (hereinafter referred to as "green light") is reflected, and light in the other wavelength ranges is transmitted. In the third dichroic mirror 123, light in the blue wavelength range (hereinafter referred to as "blue light") is reflected, and light in the other wavelength ranges is transmitted. The red light, the green light, and the blue light enter the image forming unit 130. A general plane reflector may be used instead of the third dichroic mirror 123.

The image forming unit 130 has a first display element 131, a second display element 132, and a third display element 133.

The first display element 131 is irradiated with red light through the first reflective member 124. The second display element 132 is irradiated with green light. The third display element 133 is irradiated with blue light through the second reflective member 125.

Here, an identical image is displayed on the first display element 131, the second display element 132, and the third display element 133. Thus, a red image is displayed on the first display element 131, a green image is displayed on the second display element 132, and a blue image is displayed on the third display element 133.

Lights emitted from the first display element 131, the second display element 132, and the third display element 133 enter the projection unit 140.

The projection unit 140 includes a dichroic prism 141 and a projection optical system 142.

Lights emitted from the first display element 131, the second display element 132, and the third display element 133 are combined in the dichroic prism 141. As described above, a red image, a green image, and a blue image are displayed in the image forming unit 130. The three images are combined by the dichroic prism 141.

The projection optical system 142 projects the combined three images to a predetermined position. For example, the imaging optical system illustrated in any one of examples from first example to twentieth example above is used for this projection optical system 142.

The image forming unit 130 may be a light valve such as a digital micromirror device (DMD). In this case, light from the light source unit 110 is reflected by the light valve, and the image from the light valve is magnified and projected by the projection unit 140.

In the projector 100 thus configured, the imaging optical system of the present invention is employed as the projection optical system 142, whereby it is possible to project an image in a wide projection range with low noise at high resolution.

According to the present invention, it is possible to provide an imaging optical system in which various aberrations are corrected favorably while having a wide angle of view and a small F-number yet satisfactorily, and an optical apparatus including the same.

As described above, the imaging optical system according to the present invention is suitable for an imaging optical system in which various aberrations are corrected favorably while having a wide angle of view and a small F-number yet satisfactorily. Furthermore, the optical apparatus according to the present invention is suitable for an image pickup apparatus for capturing an image in a wide photography range with low noise at high resolution and for a projection apparatus for projecting an image in a wide projection range with low noise at high resolution.

What is claimed is:

1. An imaging optical system configured to form a conjugate relation between a conjugate point on an enlargement side having a long distance and a conjugate point on a reduction side having a short distance, the imaging optical system comprising:
in order from the enlargement side,
a first lens unit having a negative refractive power;
a second lens unit having a positive refractive power;
a third lens unit having a negative refractive power; and
a fourth lens unit having a positive refractive power, wherein
the first lens unit includes a first negative lens positioned closest to the enlargement side and a first cemented lens positioned closest to the reduction side,
the second lens unit includes, in order from the enlargement side, a second cemented lens, one or more positive lens components, and a third cemented lens,
the lens components form a lens block in which only an enlargement-side surface and a reduction-side surface are in contact with air in an optical path,
the first cemented lens includes a negative lens closest to the reduction side and has a surface closest to the reduction side having a concave surface facing toward the reduction side,
the second cemented lens has a positive refractive power and has a surface closest to the enlargement side having a concave surface facing toward the enlargement side, and
the third cemented lens has a positive refractive power and includes a negative lens on the reduction side.

2. The imaging optical system according to claim 1, wherein
following Conditional Expression (1) is satisfied:

$$1 < M_{4\_3G}/M_{4\_4G} < 100 \quad (1),$$

where
$M_{4\_3G}$ is a lateral magnification of the third lens unit at a time of focusing to an object at infinity; and
$M_{4\_4G}$ is a lateral magnification of the fourth lens unit at a time of focusing to an object at infinity.

3. The imaging optical system according to claim 1, wherein the first negative lens is a meniscus lens.

4. The imaging optical system according to claim 1, wherein
following Conditional Expression (2) is satisfied:

$$0.1 < (R_{N1F} + R_{N1R})/(R_{N1F} - R_{N1R}) < 10 \quad (2),$$

where
$R_{N1F}$ is a paraxial radius of curvature of an enlargement-side surface of the first negative lens; and
$R_{N1R}$ is a paraxial radius of curvature of a reduction-side surface of the first negative lens.

5. The imaging optical system according to claim 1, wherein
following Conditional Expression (3) is satisfied:

$$0.1 < (R_{3GF} + R_{3GR})/(R_{3GF} - R_{3GR}) < 10 \quad (3),$$

where
$R_{3GF}$ is a paraxial radius of curvature of a surface positioned closest to the enlargement side in the third lens unit; and
$R_{3GR}$ is a paraxial radius of curvature of a surface positioned closest to the reduction side in the third lens unit.

6. The imaging optical system according to claim 1, wherein the fourth lens unit includes a positive lens and includes two or more lenses.

7. The imaging optical system according to claim 1, wherein the imaging optical system further comprises an aperture stop in the second lens unit.

8. The imaging optical system according to claim 1, wherein the third lens unit moves at a time of focusing.

9. The imaging optical system according to claim 1, wherein
following Conditional Expression (4) is satisfied:

$$-10 < f_{3G}/f_{4G} < -0.1 \quad (4),$$

where
$f_{3G}$ is a focal length of the third lens unit; and
$f_{4G}$ is a focal length of the fourth lens unit.

10. The imaging optical system according to claim 1, wherein
the first lens unit is a predetermined lens unit,
the second cemented lens is positioned closer to the reduction side than the predetermined lens unit is, and adjacent to the predetermined lens unit, and
following Conditional Expression (5) is satisfied:

$$-2 < (R_{NGR} + R_{C2F})/(R_{NGR} - R_{C2F}) < 8 \quad (5)$$

where
$R_{NGR}$ is a paraxial radius of curvature of a surface positioned closest to the reduction side in the predetermined lens unit; and
$R_{C2F}$ is a paraxial radius of curvature of a surface positioned closest to the enlargement side in the second cemented lens.

11. The imaging optical system according to claim 1, wherein
first positive lens positioned closest to the second cemented lens is further included, and
following Conditional Expression (6) is satisfied:

$$0.01 < (R_{P1F} + R_{P1R})/(R_{P1F} - R_{P1R}) < 5 \quad (6),$$

where
$R_{P1F}$ is a paraxial radius of curvature of an enlargement-side surface of the first positive lens; and
$R_{P1R}$ is a paraxial radius of curvature of a reduction-side surface of the first positive lens.

12. The imaging optical system according to claim 1, wherein
a cemented lens positioned closest to the enlargement side in the second lens unit is the second cemented lens, and
following Conditional Expression (7) is satisfied:

$$-45 < (R_{C2F} + R_{C2R})/(R_{C2F} - R_{C2R}) < 65 \quad (7),$$

where $R_{C2F}$ is a paraxial radius of curvature of a surface positioned closest to the enlargement side in the second cemented lens; and $R_{C2R}$ is a paraxial radius of curvature of a surface positioned closest to the reduction side in the second cemented lens.

13. The imaging optical system according to claim 1, wherein a cemented lens positioned closest to the reduction side in the first lens unit is the first cemented lens, and following Conditional Expression (8) is satisfied:

$$-10<(R_{C1F}+R_{C1R})/(R_{C1F}-R_{C1R})<45 \qquad (8),$$

where $R_{C1F}$ is a paraxial radius of curvature of a surface positioned closest to the enlargement side in the first cemented lens; and $R_{C1R}$ is a paraxial radius of curvature of a surface positioned closest to the reduction side in the first cemented lens.

14. The imaging optical system according to claim 1, wherein Conditional Expression (9) below is satisfied:

$$-5<(R_{NGF}+R_{NGR})/(R_{NGF}-R_{NGR})<17 \qquad (9),$$

where $R_{NGF}$ is a paraxial radius of curvature of a surface positioned closest to the enlargement side in the predetermined lens unit; and $R_{NGR}$ is a paraxial radius of curvature of a surface positioned closest to the reduction side in the predetermined lens unit.

15. The imaging optical system according to claim 1, wherein the first cemented lens includes, in order from the enlargement side, a positive lens and a negative lens, the second cemented lens, the one or more positive lens components, and the third cemented lens are disposed in this order from the enlargement side, the third lens unit includes one or more negative lens components, and the fourth lens unit includes a positive lens closest to the enlargement side.

16. The imaging optical system according to claim 1, wherein the fourth lens unit includes a second positive lens closest to the enlargement side, and following Conditional Expression (10) is satisfied:

$$0<(R_{P2F}-R_{P2R})/(R_{P2F}-R_{P2R})<1 \qquad (10),$$

where $R_{P2F}$ is a paraxial radius of curvature of an enlargement-side surface of the second positive lens; and $R_{P2R}$ is a paraxial radius of curvature of a reduction-side surface of the second positive lens.

17. The imaging optical system according to claim 1, wherein following Conditional Expression (11) is satisfied:

$$0.8<FB/f_R<1.8 \qquad (11),$$

where

FB is a back focus in the imaging optical system; and $f_R$ is a combined focal length of lens units from the second lens unit to the fourth lens unit.

18. The imaging optical system according to claim 1, wherein following Conditional Expression (A) is satisfied:

$$0<f/e_{N1F}<2 \qquad (A),$$

where f is a focal length of the imaging optical system as a whole at a time of focusing to an object at infinity; and $e_{N1F}$ is a maximum effective aperture of an enlargement-side surface of the first negative lens.

19. The imaging optical system according to claim 1, wherein following Conditional Expression (B) is satisfied:

$$0<(f/e_{AS})/Fno<2 \qquad (B),$$

where f is a focal length of the imaging optical system as a whole at a time of focusing to an object focusing at infinity;

$e_{AS}$ is a maximum diameter of the aperture stop; and

Fno is an F-number of the imaging optical system as a whole at the time of focusing to the object focusing at infinity.

20. The imaging optical system according to claim 1, wherein following Conditional Expression (C) is satisfied:

$$0<T_{air\_max}/\Sigma d \le 0.27 \qquad (C),$$

where $T_{air\_max}$ is a largest axial air space in a range from a surface positioned closest to the enlargement side to a surface positioned closest to the reduction side in the imaging optical system; and $\Sigma d$ is an axial distance from the surface positioned closest to the enlargement side to the surface positioned closest to the reduction side in the imaging optical system.

21. The imaging optical system according to claim 8, wherein the third lens unit is set as a first focusing lens unit, a partial lens unit in the fourth lens unit is set as a second focusing lens unit, and at the time of focusing, in addition to movement of the first focusing lens unit, the second focusing lens unit moves while changing a distance to the first focusing lens unit.

22. The imaging optical system according to claim 1, wherein the imaging optical system further comprises a first focusing lens unit, and the first focusing lens unit is disposed closer to the reduction side than the third cemented lens is, moves along an optical axis of the imaging optical system at a time of the focusing, and has a negative refractive power.

23. The imaging optical system according to claim 22, wherein the first focusing lens unit satisfies following Conditional Expression (D):

$$0<(R_{F1F}+R_{F1R})/(R_{F1F}-R_{F1R})<5 \qquad (D)$$

where $R_{F1F}$ is a paraxial radius of curvature of a surface positioned closest to the enlargement side in the first focusing lens unit; and $R_{F1R}$ is a paraxial radius of curvature of a surface positioned closest to the reduction side in the first focusing lens unit.

24. The imaging optical system according to claim 21, wherein the first focusing lens unit moves toward the reduction side at a time of focusing to an object at a close distance from a state of focusing on an object at infinity which positions on the enlargement side, and Conditional Expression (E) below is satisfied:

$$-1 < M_{F1}/f < 0 \tag{E}$$

where $M_{F1}$ is a maximum amount of movement along the optical axis direction at the time of focusing in the first focusing lens unit; and f is a focal length of the imaging optical system as a whole at the time of focusing to the object at infinity.

25. The imaging optical system according to claim 22, wherein the first focusing lens unit moves toward the reduction side at a time of focusing to an object at a close distance from a state of focusing on an object at infinity which positions on the enlargement side, and Conditional Expression (E) below is satisfied:

$$-1 < M_{F1}/f < 0 \tag{E}$$

where $M_{F1}$ is a maximum amount of movement along the optical axis direction at the time of focusing in the first focusing lens unit; and f is a focal length of the imaging optical system as a whole at the time of focusing to the object at infinity.

26. The imaging optical system according to claim 22, wherein the imaging optical system further comprises a second focusing lens unit, and the second focusing lens unit is disposed closer to the reduction side than the first focusing lens unit is, moves along the optical axis of the imaging optical system while changing a distance to the first focusing lens unit at the time of focusing, and has a positive refractive power.

27. The imaging optical system according to claim 26, wherein the first focusing lens unit and the second focusing lens unit each include at most two lenses.

28. The imaging optical system according to claim 26, wherein the first focusing lens unit moves toward the reduction side at the time of focusing to an object at a close distance from a state of focusing on an object at infinity which positions on the enlargement side, the second focusing lens unit moves toward the enlargement side at the time of focusing to the object at a close distance from the state of focusing on the object at infinity which positions on the enlargement side, and the first focusing lens unit and the second focusing lens unit satisfy following Conditional Expression (F) at the time of focusing:

$$0 < M_{F2}/M_{F1} < 1.5 \tag{F}$$

where $M_{F1}$ is a maximum amount of movement along the optical axis direction at the time of the focusing in the first focusing lens unit; and $M_{F2}$ is a maximum amount of movement along the optical axis direction at the time of the focusing in the second focusing lens unit.

29. The imaging optical system according to claim 26, wherein the first focusing lens unit and the second focusing lens unit satisfy following Conditional Expression (G):

$$-3 < f_{F1}/f_{F2} < -0.5 \tag{G}$$

where $f_{F1}$ is a focal length of the first focusing lens unit; and $f_{F2}$ is a focal length of the second focusing lens unit.

30. The imaging optical system according to claim 26, wherein the first focusing lens unit and the second focusing lens unit satisfy following Conditional Expression (H):

$$5 < \beta_{F1}/\beta_{F2} < 50 \tag{H}$$

where $\beta_{F1}$ is a lateral magnification of the first focusing lens unit at the time of focusing to an object at infinity; and $\beta_{F2}$ is a lateral magnification of the second focusing lens unit at the time of focusing to the object at infinity.

31. The imaging optical system according to claim 1, wherein the first cemented lens is a cemented lens including three lenses.

32. The imaging optical system according to claim 1, wherein the third lens unit includes a plurality of lenses.

33. The imaging optical system according to claim 32, wherein the third lens unit includes a cemented lens.

34. The imaging optical system according to claim 1, wherein the fourth lens unit includes a cemented lens including a positive lens.

35. The imaging optical system according to claim 34, wherein the cemented lens including a positive lens in the fourth lens unit moves while changing a distance to another focusing lens unit at a time of focusing.

36. An optical apparatus comprising:

an optical system; and an image pickup element arranged on a reduction side, wherein the image pickup element has an image pickup surface and converts an image formed on the image pickup surface by the optical system into an electrical signal, and the optical system is the imaging optical system of claim 1.

37. An optical apparatus comprising:

an optical system; and a display element arranged on a reduction side, wherein the display element has a display surface, an image displayed on the display surface is projected toward an enlargement side by the optical system, and the optical system is the imaging optical system of claim 1.

* * * * *

UNITED STATES PATENT AND TRADEMARK OFFICE
CERTIFICATE OF CORRECTION

PATENT NO. : 9,958,653 B2
APPLICATION NO. : 15/391941
DATED : May 1, 2018
INVENTOR(S) : Keisuke Ichikawa It is certified that error appears in the above-identified patent and that said Letters Patent is hereby corrected as shown below:

On the Title Page

Column 1, Line 3, after "0 days." delete "days.".

In the Specification

Column 7, Line 31, delete "N4_4G" and insert --M4_4G--.

Column 8, Line 3, delete "(1')" and insert --(1').--.

Column 8, Line 7, delete "(1)" and insert --(1")--.

Column 11, Line 40, delete "(4')" and insert --(4').--.

Column 12, Line 57, delete "(7)" and insert --(7),--.

Column 14, Line 14, delete "(9")" and insert --(9").--.

Column 16, Line 15, delete "(B")" and insert --(B").--.

Column 17, Line 15, delete "(D)" and insert --(D),--.

Column 17, Line 45, delete "(E)" and insert --(E),--.

Column 17, Line 56, delete "(E)" and insert --(E).--.

Column 17, Line 64, delete "(E)" and insert --(E):--.

Column 17, Line 65, delete "(E')." and insert --(E").--.

Signed and Sealed this
Fourth Day of September, 2018

Andrei Iancu
*Director of the United States Patent and Trademark Office*

CERTIFICATE OF CORRECTION (continued)
U.S. Pat. No. 9,958,653 B2

Column 18, Line 37, delete "(F)" and insert --(F),--.

Column 19, Line 19, delete "(G)" and insert --(G):--.

Column 19, Line 30, delete "(H)" and insert --(H):--.

Column 49, Line 47, delete "A6-2.87051e" and insert --A6=2.87051e--.

In the Claims

Column 66, Line 41, Claim 10, Line 8, delete "(5)" and insert --(5),--.

Column 67, Line 51, Claim 16, Line 6, delete "0<(RP2F-RP2R)/(RP2F-RP2R)<1" and insert --0<(RP2F+RP2R)/(RP2F-RP2R)<1--.

Column 68, Line 54, Claim 23, Line 4, delete "(D)" and insert --(D),--.